United States Patent
Tanaka et al.

(10) Patent No.: US 8,489,141 B2
(45) Date of Patent: Jul. 16, 2013

(54) PORTABLE ELECTRONIC APPARATUS

(75) Inventors: Kensaku Tanaka, Kanagawa (JP); Takashi Ito, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 13/001,486

(22) PCT Filed: Jun. 26, 2009

(86) PCT No.: PCT/JP2009/061786
§ 371 (c)(1),
(2), (4) Date: Dec. 27, 2010

(87) PCT Pub. No.: WO2009/157568
PCT Pub. Date: Dec. 30, 2009

(65) Prior Publication Data
US 2011/0105100 A1    May 5, 2011

(30) Foreign Application Priority Data

Jun. 27, 2008 (JP) ................... 2008-169659
Jun. 27, 2008 (JP) ................... 2008-169660
Jun. 27, 2008 (JP) ................... 2008-169661
Jun. 27, 2008 (JP) ................... 2008-169662
Jul. 30, 2008 (JP) ................... 2008-196934
Jul. 30, 2008 (JP) ................... 2008-197055
Jul. 30, 2008 (JP) ................... 2008-197056

(51) Int. Cl.
*H04M 1/00* (2006.01)

(52) U.S. Cl.
USPC ..... 455/550.1; 455/418; 455/419; 455/575.1; 455/575.3; 455/575.4

(58) Field of Classification Search
USPC ............... 455/418–419, 575.1–575.4, 575.8, 455/90.3, 128, 347, 550.1, 556.1–556.2
See application file for complete search history.

(56) References Cited

U.S. PATENT DOCUMENTS

| | | | |
|---|---|---|---|
| 8,190,219 B2 * | 5/2012 | Park et al. | 455/575.4 |
| 8,204,559 B2 * | 6/2012 | Honma | 455/575.3 |
| 2007/0254697 A1 * | 11/2007 | Sugio et al. | 455/556.2 |
| 2009/0227300 A1 * | 9/2009 | Lee et al. | 455/575.4 |

FOREIGN PATENT DOCUMENTS

| | | |
|---|---|---|
| JP | H07-218662 A | 8/1995 |
| JP | H09-197501 A | 7/1997 |
| JP | 2001-100270 A | 4/2001 |
| JP | 2004-235724 A | 8/2004 |
| JP | 2007-184796 A | 7/2007 |

OTHER PUBLICATIONS

Notice of Reasons for Rejection issued to JP Application No. 2008-169660, mailed Jul. 24, 2012.

* cited by examiner

*Primary Examiner* — Wayne Cai
(74) *Attorney, Agent, or Firm* — Hoffman & Baron, LLP

(57) ABSTRACT

A portable electronic apparatus capable of reliably determining whether a load detected by detecting units is caused by water pressure or by some other pressure and performing predetermined control according to the determination. A portable telephone apparatus is provided with operation detecting units and a control unit. The operation detecting units are detecting units for detecting pressure caused by a pressing operation. When a pressure is detected by at least one of the operation detecting units, the control unit performs first control (for example, control caused by detection of pressure other than water pressure). When even pressures are simultaneously detected by the operation detecting units, the control unit performs second control (for example, control caused by detection of water pressure) different from the first control.

7 Claims, 23 Drawing Sheets

FIG. 6

| WATER DEPTH | LED POWER CONSUMPTION (ANOTHER ONE LED LIGHTS AT EACH DEPTH) | DISPLAY 21 BACKLIGHT POWER CONSUMPTION |
|---|---|---|
| 2m | 2mA | 50mA |
| 4m | 4mA | 50mA |
| . | . | . |
| . | . | . |
| . | . | . |
| 20m | 20mA | 50mA |

PORTABLE ELECTRONIC APPARATUS

CROSS-REFERENCE TO RELATED APPLICATIONS

The present application is the national stage of International Application No. PCT/JP2009/061786, filed Jun. 26, 2009, which claims priority to Japanese Application No. 2008-169659, filed Jun. 27, 2008, and to Japanese Application No. 2008-169660, filed Jun. 27, 2008, and to Japanese Application No. 2008-169661, filed Jun. 27, 2008, and to Japanese Application No. 2008-169662, filed Jun. 27, 2008, and to Japanese Application No. 2008-196934, filed Jul. 30, 2008, and to Japanese Application No. 2008-197055, filed Jul. 30, 2008, and to Japanese Application No. 2008-197056, filed Jul. 30, 2008, the entire contents of each of which are incorporated by reference herein.

TECHNICAL FIELD

The present invention relates portable electronic apparatuses having a plurality of operation detection units that detect pressure from pressing operations.

BACKGROUND ART

In recent years, portable electronic apparatuses equipped with waterproofing functions have been introduced to the market to mitigate the effects of rain, dust and the like. For example, a portable electronic apparatus has been proposed having a detection unit that detects a load and a control unit that performs a first control (various functions of incoming calls and data that normal portable electronic apparatuses provide) when a load is detected by the detection unit (see patent publication 1).
[Patent Document 1] Japanese Unexamined Patent Application, Publication No. H7-218662

DISCLOSURE OF THE INVENTION

Problems to be Solved by the Invention

However, in the device described in patent publication 1, it is difficult to judge whether the load detected by the detection unit is caused by water pressure or other pressure.

An object of the present invention is to provide a portable electronic apparatus that surely judges whether a load detected by a detection unit is caused by water pressure or other pressure, and performs a predetermined control that corresponds to that judgment.

Means for Solving the Problems (1) In order to solve the aforementioned problem, the portable electronic apparatus of the present invention has a plurality of operation detection units that detects pressure of a pressing operation, and a control unit that performs a first control (for example a control performed by detection of pressure other than water pressure) when pressure is detected from at least one of the plurality of detection units, in which the control unit performs a second control (for example, a control performed with water pressure is detected) when an even pressure is simultaneously detected by the plurality of operation detection units.

(2) With the present invention, it is preferable that in the portable electronic apparatus of (1), the control unit performs the second control when an even pressure is detected simultaneously by the plurality of operation detection units longer than a predetermined amount of time.

(3) With the present invention, it is preferable that in the portable electronic apparatus of (1) or (2), the control unit varies the second control to correspond to a length of time that an even pressure is detected simultaneously by the plurality of operation detection units.

(4) With the present invention, it is preferable that in the portable electronic apparatus of (1) to (3), the control unit varies the second control to correspond to pressure detected by the plurality of operation detection units.

(5) With the present invention, it is preferable that the portable electronic apparatus of (1) to (3) further includes a plurality of pressure detection units disposed adjacent to the plurality of operation detection units to detect varied pressure of each, in which the control unit varies the second control to correspond to pressure detected by the plurality of operation detection units or pressure detected by the plurality of pressure detection units.

(6) With the present invention, it is preferable that the portable electronic apparatus of (1) to (5) further includes a function execution unit that executes a predetermined function, in which the control unit restrains execution of the function as the second control when an even pressure is detected simultaneously by the plurality of operation detection units in a state where the predetermined function is executed by the function execution unit.

(7) With the present invention, it is preferable that the portable electronic apparatus of (1) to (5), further includes an alarm unit, in which the control unit issues an alarm using the alarm unit as the second control when an even pressure is detected simultaneously by the plurality of operation detection units.

(8) With the present invention, it is preferable that in the portable electronic apparatus of (1) to (5), the control unit performs as the second control a power restraining operation when an even pressure is detected simultaneously by the plurality of operation detection units.

(9) With the present invention, it is preferable that the portable electronic apparatus of (1) to (8) further includes a housing, in which the plurality of operation detection units have a first section disposed on a first surface of the housing, and a second section disposed on a second surface of the housing.

(10) With the present invention, it is preferable that the portable electronic apparatus of (1) to (8) further includes a first housing having the plurality of operation detection units, and a second housing coupled to the first housing and movable between a closed state that covers the plurality of operation detection units and an opened state that exposes the plurality of operation detection units, in which the control unit performs a second control that is different from the first control when an even pressure is detected simultaneously by the plurality of operation detection units when the apparatus is in a closed state.

(11) With the present invention, it is preferable that the portable electronic apparatus of (1) to (10) further includes a recording unit, in which the control unit records to the recording unit an instance when a value of an even pressure detected simultaneously by the plurality of operation detection units exceeds a predetermined value.

(12) In order to solve the aforementioned problem, the portable electronic apparatus of the present invention includes an operation detection unit that detects pressure by a pressing operation, and a control unit that performs a first control that corresponds to a detection result of the operation detection unit, the control unit performing a second control that is different from the first control when pressure higher than a predetermined value is detected by the operation detection unit for longer than a predetermined amount of time.

(13) With the present invention, it is preferable that in the portable electronic apparatus of (12), a plurality of operation detection units are disposed, in which the control unit performs the second control when pressure higher than a predetermined value is detected by the plurality of operation detection units longer than a predetermined amount of time.

(14) With the present invention, it is preferable that in the portable electronic apparatus of (12) or (13), the control unit varies the second control to correspond to a length of time that pressure higher than the predetermined value is detected by the operation detection unit.

(15) With the present invention, it is preferable that in the portable electronic apparatus of (12) to (14), the control unit varies the second control according to pressure detected by the operation detection unit.

(16) With the present invention, it is preferable that the portable electronic apparatus of (13) further includes a plurality of pressure detection units disposed adjacent to each of the plurality of operation detection units, that detects each varied pressure, in which the control unit varies the second control to correspond to pressure detected by the plurality of operation detection units or pressure detected by the plurality of pressure detection units.

(17) With the present invention, it is preferable that the portable electronic apparatus of (12) to (16) includes a function execution unit that executes a predetermined function, in which the control unit restrains an execution of the function as the second control when pressure higher than a predetermined value is detected by the plurality of operation detection units longer than a predetermined amount of time in a state where a predetermined function is executed by the function execution unit.

(18) With the present invention, it is preferable that the portable electronic apparatus of (12) to (16) includes an alarm unit, in which the control unit issues an alarm using the alarm unit as the second control when pressure higher than a predetermined value is detected by the operation detection unit longer than a predetermined amount of time.

(19) With the present invention, it is preferable that in the portable electronic apparatus of (12) to (16), the control unit performs as a second control a power restraining operation when pressure higher than a predetermined value is detected by the operation detection unit longer than a predetermined amount of time.

(20) With the present invention, it is preferable that the portable electronic apparatus of (12) to (16) further includes a recording unit, in which the control unit records to the recording unit a detected instance when pressure higher than a predetermined value is detected by the operation detection unit longer than a predetermined amount of time.

(21) With the present invention, it is preferable that the portable electronic apparatus of (12) to (20) includes a first housing having the operation detection units, and a second housing coupled to the first housing and movable between a closed state that covers the operation detection units and an opened state that exposes the operation detection units, in which the control unit performs a second control that is different from the first control when pressure higher than a predetermined value is detected by the operation detection units longer than a predetermined amount of time, when the apparatus is in a closed state.

(22) In order to solve the aforementioned problem, the portable electronic apparatus of the present invention includes an operation unit; an operation detection unit that detects a pressing operation on the operation unit; a control unit that controls a predetermined operation when a pressing operation is detected by the operation detection unit; and a water pressure measuring unit that measures water pressure, the control unit restraining the predetermined operation when water pressure higher than a predetermined value is measured by the water pressure measuring unit.

(23) With the present invention, it is preferable that in the portable electronic apparatus of (22), the operation detection unit detects the pressing operation by a pressing operation that was performed by pressure of a value higher than the predetermined value.

(24) With the present invention, it is preferable that the portable electronic apparatus of (22) or (23) includes an alarm unit, in which the control unit issues a predetermined alarm using the alarm unit when water pressure higher than a predetermined value is measured by the water pressure measuring unit.

(25) With the present invention, it is preferable that in the portable electronic apparatus of (22) to (24), the operation detection unit is configured to have a first section and a second section, in which the control unit restrains control of a predetermined operation when a pressing operation is detected by the first section, and permits control of a predetermined operation when a pressing operation is detected by the second section, when water pressure higher than a predetermined value is measured by the water pressure measuring unit.

(26) With the present invention, it is preferable that in the portable electronic apparatus of (25), the second section detects the pressing operation by a pressing operation that was performed by pressure of a value higher than the first section.

(27) With the present invention, it is preferable that the portable electronic apparatus of (25) or (26) includes an imaging unit, in which the control unit issues imaging as the predetermined operation using the imaging unit, when a pressing operation is detected by the second section in the operation detection unit.

(28) With the present invention, it is preferable that in the portable electronic apparatus of (25) to (27), the control unit controls power as the predetermined operation when a pressing operation is detected by the first section.

(29) With the present invention, it is preferable that the portable electronic apparatus of (22) to (28) includes a recording unit, in which the control unit records a measuring instance in the recording unit when water pressure higher than a predetermined value is measured by the water pressure measuring unit.

(30) In order to solve the aforementioned problem, the portable electronic apparatus of the present invention includes a housing; an operation unit which is disposed on the housing and receives a pressing operation; a first detection unit which is disposed on the housing corresponding to the operation unit, and detects a pressed state of the operation unit; a second detection unit which is disposed on the housing corresponding to the operation unit, and detects a pressing force in a pressed state of the operation unit; and a control unit which performs a first control that corresponds to a detection result of the first detection unit, and a second control that corresponds to a detection result of the second detection unit.

(31) With the present invention, it is preferable that in the portable electronic apparatus of (30), the second detection unit includes a switch for receiving a pressing force higher than a predetermined force, and detects the predetermined force as the pressing force when the switch is pressed.

(32) With the present invention, it is preferable that the portable electronic apparatus of (31) includes a plurality of the operation units, in which the second detection unit includes a plurality of the switches disposed on the housing corresponding to each of the plurality of operation units, that receives a pressing force higher than each different predetermined force.

(33) With the present invention, it is preferable that the portable electronic apparatus of (30) to (32) includes an alarm unit, and a recording unit that records a first information associated with force and water depth, in which the recording unit determines water depth by comparing a pressing force detected by the second detected unit with a force associated with the first information recorded in the recording unit, and performs the second control by issuing an alarm of the determined water depth result using the alarm unit, when the pressing force is detected by the second detection unit.

(34) With the present invention, it is preferable that in the portable electronic apparatus of (33), the alarm unit has a light emitting unit that radiates light on the operation unit, in which the control unit issues an alarm of the determined water depth results by radiating light on the operation unit using the light emitting unit.

(35) With the present invention, it is preferable that in the portable electronic apparatus of (34), the operation unit includes a numerical keypad, in which the light emitting unit radiates light on each key of the numerical keypad, in which the recording unit records the second information that associates water depth and a number assigned to a key of the numerical keypad, and in which the control unit determines a number assigned to a key by comparing the determined water depth with water depth according to the second information recorded in the recording unit, and radiates light using the light emitting unit on each key of the numerical keypad that corresponds to that determined number.

(36) With the present invention, it is preferable that in the portable electronic apparatus of (35), the recording unit records a water depth reference value and a key assigned with the number 1 in the numerical keypad, the water depth reference value and the key that correspond to each other, and records a value obtained by multiplying the water depth reference value with a natural number and a key assigned the natural number in the numerical keypad, the value obtained by multiplying the water depth reference value with a natural number and a key assigned the natural number that correspond to each other.

(37) With the present invention, it is preferable that in the portable electronic apparatus of (30) to (36), the control unit varies the second control to correspond to a magnitude of the force detected by the second detection unit.

(38) In order to solve the aforementioned problem, the portable electronic apparatus according to the present invention includes a first housing having an operation unit and an operation detection unit that detects pressing of the operation unit; a second housing coupled to the first housing and movable between an opened state exposing the operation unit to the outside, and a closed state covering the operation unit forming a gap with the first housing linking to the outside; and a control unit that performs a first control that corresponds to pressing detected by the operation detection unit in the opened state, and a second control when pressing is detected by the operation detection unit in the closed state.

(39) With the present invention, it is preferable that in the portable electronic apparatus of (38) includes a plurality of the operation detection units, in which the control unit performs the second control when an even pressure is detected simultaneously by the plurality of operation detection units.

(40) With the present invention, it is preferable that in the portable electronic apparatus of (39), the control unit performs the second control when an even pressure is detected simultaneously by a plurality of the operation detection units for a fixed amount of time.

(41) With the present invention, it is preferable that in the portable electronic apparatus of (39) or (40), the control unit varies the second control according to a length of time that an even pressure is detected simultaneously by a plurality of the operation detection units.

(42) With the present invention, it is preferable that in the portable electronic apparatus of (38) to (41), the control unit varies the second control according to a degree of pressure detected by the operation detection unit.

(43) With the present invention, it is preferable that the portable electronic apparatus of (39) to (41) further includes a plurality of pressure detection units which are disposed adjacent to a plurality of the operation detection units, and detects varied pressure respectively, in which the control unit varies the second control according to pressing force detected by a plurality of the operation detection units or a plurality of the pressure detection units.

(44) With the present invention, it is preferable that the portable electronic apparatus of (38) to (43) includes a function execution unit that executes a predetermined function, in which the control unit restrains execution of the function as the second control when pressing force is detected by the operation detection units in the closed state while the predetermined function is executed by the function execution unit.

(45) With the present invention, it is preferable that the portable electronic apparatus of (38) to (43) includes an alarm unit, in which the control unit issues an alarm using the alarm unit, as the second control.

(46) With the present invention, it is preferable that the portable electronic apparatus of (45) includes a recording unit that records a corresponding information associating pressure force and water depth, in which the control unit determines water depth based on pressure of a pressing force and the corresponding information recorded in the recording unit, and issues an alarm of the determined water depth result using the alarm unit as the second control when the pressing force is detected by the operation detection unit in the closed state.

(47) With the present invention, it is preferable that in the portable electronic apparatus of (38) to (43), the control unit performs a power restraining operation as the second control.

(48) In order to solve the aforementioned problem, the portable electronic apparatus of the present invention includes an operation unit; an operation detection unit that detects pressure by a pressing operation on the operation unit; a temperature measuring unit that measures a temperature of the operation unit; and a control unit that performs a first control according to a detection result of the operation detection unit, in which the control unit performs a second control that is different from the first control, when pressure detected by the operation detection unit is higher than a predetermined value, and a temperature measured by the temperature measuring unit is at a predetermined range.

(49) With the present invention, it is preferable that in the portable electronic apparatus of (48), a plurality of the operation detection units are disposed, in which the control unit performs the second control that is different from the first control, when pressure detected simultaneously by a plurality of the operation detection units is higher than a predetermined value, and a temperature measured by the temperature measuring unit is at a predetermined range.

(50) With the present invention, it is preferable that the portable electronic apparatus of (49) includes a housing, in which a plurality of the operation detection units have a first section disposed on a first surface of the housing, and a second section disposed on a second surface of the housing.

(51) With the present invention, it is preferable that in the portable electronic apparatus of (48) to (50), the control unit performs the second control when a detection time of pressure detected by the operation detection unit is longer than a predetermined amount of time.

(52) With the present invention, it is preferable that in the portable electronic apparatus of (48) to (51), the control unit varies the second control according to a length of time that pressure higher than the predetermined value is detected by the operation detection unit.

(53) With the present invention, it is preferable that in the portable electronic apparatus of (48) to (52), the control unit varies the second control according to pressure detected by the operation detection unit.

(54) With the present invention, it is preferable that the portable electronic apparatus of (49) to (50) includes a plurality of pressure detection units which are disposed adjacent to each of a plurality of the operation detection units, and detect varied pressure respectively, in which the control unit varies the second control according to pressure detected by a plurality of the operation detection units or to pressure detected by a plurality of the pressure detection units.

(55) With the present invention, it is preferable that the portable electronic apparatus of (48) to (54) includes a function execution unit that executes a predetermined function, in which the control unit restrains execution of the function as the second control when pressure detected by the operation detection unit is higher than a predetermined value, in a state where the predetermined function is executed by the function execution unit, and a temperature measured by the temperature measuring unit is at a predetermined range.

(56) With the present invention, it is preferable that the portable electronic apparatus of (48) to (54) includes an alarm unit, in which the control unit issues an alarm using the alarm unit as the second control, when pressure detected by the operation detection unit is higher than a predetermined value, and a temperature measured by the temperature measuring unit is at a predetermined range.

(57) With the present invention, it is preferable that in the portable electronic apparatus of (48) to (54) the control unit implements a power restraining operation as the second control when pressure detected by the operation detection unit is higher than a predetermined value, and a temperature measured by the temperature measuring unit is at a predetermined range.

(58) With the present invention, it is preferable that the portable electronic apparatus of (48) to (57) includes a recording unit, in which the control unit records a detected instance and a measured instance in the recording unit, when pressure higher than a predetermined value is detected by the operation detection unit, and a temperature of a predetermined range is measured by the temperature measuring unit.

(59) In order to solve the aforementioned problem, the portable electronic apparatus according to the present invention includes an operation detection unit that detects a pressing operation of a predetermined pressing force; a water-submerged state detection unit that detects a water-submerged state; a recording unit that records a first information associating pressing force and water depth; an alarm unit; and a control unit that performs a first control corresponding to a pressing operation when the pressing operation is detected by the operation detection unit in a state where a water-submerged state is not detected by the water-submerged state detection unit, and a second control that determines water depth based on a pressing force associated with the pressing operation and the first information, and issues an alarm of the determined water depth result using the alarm unit, when a pressing operation is detected by the operation detection unit in a state where a water-submerged state is detected by the water-submerged state detection unit.

(60) With the present invention, it is preferable that in the portable electronic apparatus of (59), the operation detection unit has a first operation detection unit that detects a pressing operation of a first pressing force and a second operation detection unit that detects a pressing operation of a second pressing force, in which the control unit determines water depth based on the first pressing force and the first information when a pressing operation is detected by the first operation detection unit in a state where a water-submerged state is detected by the water-submerged state detection unit, and determines water depth based on the second pressing force and the first information when a pressing operation is detected by the second operation detection unit.

(61) With the present invention, it is preferable that in the portable electronic apparatus of (59) or (60) the control unit restrains the first control when performing the second control.

(62) With the present invention, it is preferable that in the portable electronic apparatus of (59) to (61), the alarm unit has a light emitting unit that radiates light, in which the control unit issues an alarm of the determined water depth result by radiating light using the light emitting unit.

(63) With the present invention, it is preferable that the portable electronic apparatus of (62) has a numerical keypad composed of a plurality of keys; in which the operation detection unit is configured to detect pressing operations of each of the plurality of keys that compose the numerical keypad; in which the light emitting unit is configured to illuminate each of the plurality of keys that compose the numerical keypad; in which the recording unit records the second information that associates water depth and a number assigned to each of the plurality of keys that compose the numerical keypad; and in which the control unit determines a number that corresponds to the determined water depth based on the determined water depth and the second information, and radiates a light on each key assigned a determined number using the light emitting unit.

(64) With the present invention, it is preferable that in the portable electronic apparatus of (63), the recording unit records a water depth reference value and a key assigned with the number 1 of the plurality of keys that compose the numerical keypad, the water depth reference value and the key that correspond each other, and records a value obtained by multiplying the water depth reference value with a natural number and a key assigned the natural number of the plurality of keys that compose the numerical keypad, the value obtained by multiplying the water depth reference value with a natural number and the key assigned the natural number of the plurality of keys that correspond to each other.

Effects of the Invention

According to the present invention, it is possible to reliably determine whether a load detected by a detection unit is caused by water pressure or another pressure.

BRIEF DESCRIPTION OF THE DRAWINGS

FIG. 6 is a diagram contrasting LED power consumption and display backlight power consumption;

EXPLANATION OF REFERENCE NUMERALS

Figure 1:
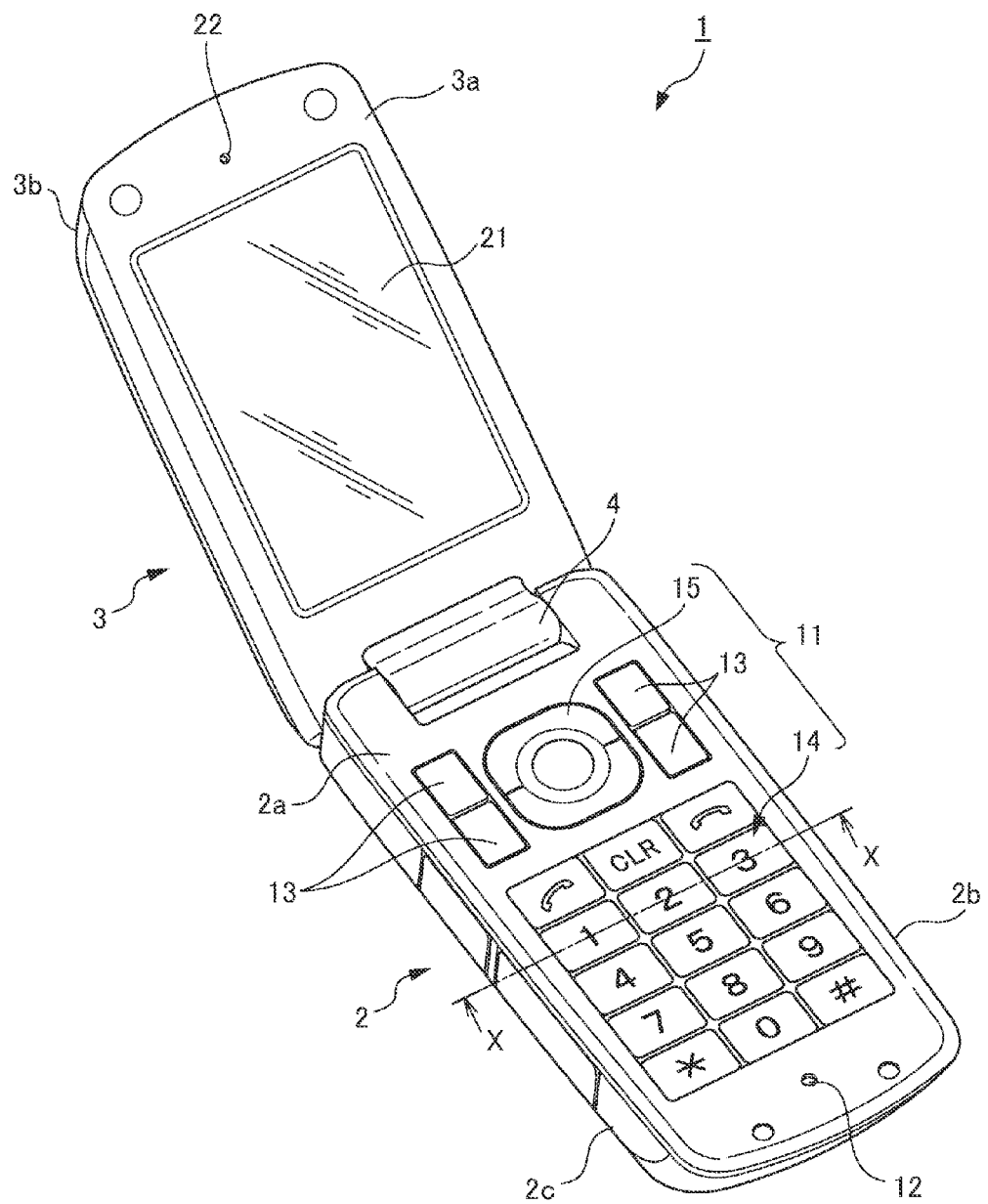
FIG. 1 is an external perspective view of a cellular telephone of the present invention.

1 Cellular Telephone
2 Operation-unit Side Housing Unit
3 Display-unit Side Housing Unit
101 operation detection unit
102 pressure detection unit
103 control unit
104 function execution unit
105 alarm unit
106 recording unit

PREFERRED MODE FOR CARRYING OUT THE INVENTION

Preferred embodiments of the present invention will now be explained with reference to the drawings. The explanation of the cellular telephone below is one example of a portable electronic apparatus. The present invention is not to be construed as being limited thereto, and can be applied in a PHS (an initialism for Personal Handy phone System), a PDA (an initialism for Personal Digital Assistant), a portable navigation system, or another communication device.

FIG. 1 is an external perspective view of a cellular telephone 1 of the first embodiment. This is one example of the portable electronic apparatus according to the present invention, which performs communication with a host device. Also, FIG. 2 is a perspective view of the cellular telephone 1 in a folded state.

Figure 2:
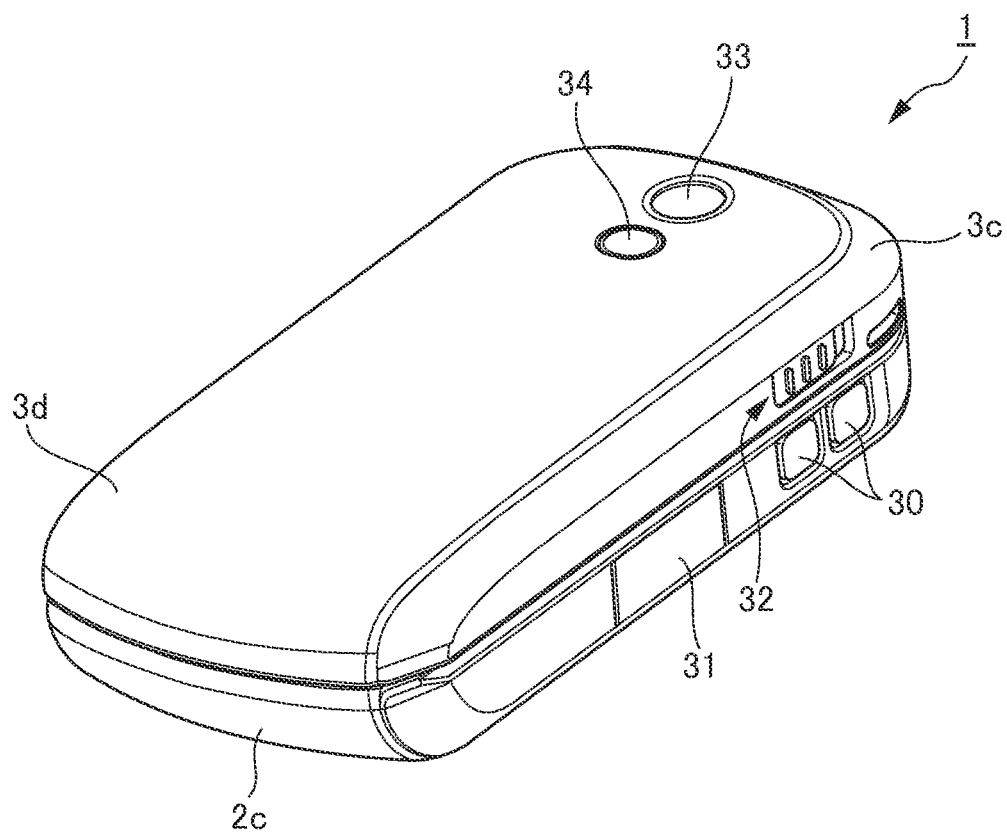
FIG. 2 is a perspective view of the cellular telephone in a folded state.

As shown in FIGS. 1 and 2, the cellular telephone 1 is equipped with an operation-unit side housing unit 2 (a second housing) a front surface thereof composed of a front panel 2a, a front case 2b, a rear case 2c, and a rear panel, not shown; and a display-unit side housing unit 3 (a first housing) a front surface thereof composed of a front panel 3a, a front case 3b, a rear case 3c, and a rear panel 3d.

The operation-unit side housing unit 2 is configured to expose the operation unit 11, and an audio input unit 12 that inputs audio of a user of the cellular telephone 1 when communicating, on a surface of the front panel 2a. Also, the operation unit 11 is composed of a plurality of keys, including function setting operation keys 13 that make various settings and operate various functions such as a telephone directory function or mailing function and the like; input operation keys 14 for inputting the numbers of a telephone number and characters for the mailing function; and determining operation keys 15 that determine various operations and scroll. Also, a cap that covers an interface for performing communication with an external device (for example a host device) is established on a side of the operation-unit side housing unit 2.

The display-unit side housing unit 3 is configured to expose the display 21 for displaying a variety of information and a receiver 22 that outputs audio of another party of a conversation, on the front panel 3.

As shown in FIG. 1, the upper-end portion of the operation-unit side housing unit 2 and the lower-end portion of the display-unit side housing unit 3 are coupled via a hinge mechanism 4 (a linking unit). Also, the cellular telephone 1 is configured to be able to move between an opened and a closed state by relatively moving the operation-unit side housing unit 2 and display-unit side housing unit 3 that are coupled by the hinge mechanism 4. Here, the opened state of the cellular telephone 1 means that the operation unit 11 is exposed by opening to mutually expose the surfaces of the operation-unit side housing unit 2 (the operation unit 11) and the display-unit side housing unit 3 (the display unit) to the outside. Furthermore, the closed state of the cellular telephone 1 means that the operation unit 11 is not exposed by folding the operation unit 11 of the operation-unit side housing unit 2 and the display unit of the display-unit side housing unit 3 mutually to face each other. When the cellular telephone 1 is in a closed state, the operation unit 11 of the operation-unit side housing unit 2 is covered by the display-unit side housing unit 3. However, a gap is formed at the front surface side of the operation unit 11 with the display-unit side housing unit 3 that communicates with the outside.

The opened and closed states of the cellular telephone 1 are detected by an opening and closing sensor composed of a magnet, not shown, disposed on the operation-unit side housing unit 2, and a Hall element, not shown, disposed on the display-unit side housing unit 3. Specifically, the opening and closing sensor determines the open or closed state of the cellular telephone 1 by detecting the strength of the magnet along with the difference in the positional relationship of the operation-unit side housing unit 2 and the display-unit side housing unit 3, based on the detected results.

In this embodiment of the present invention, a cellular telephone 1 that folds using a hinge mechanism 4 is explained. However, rather than a folding method, it is also acceptable to adopt a sliding method where one housing moves by sliding in one direction from a closed state when both housings 2 and 3 are overlapped, in order to change the cellular telephone 1 to an opened state. Another possibility is to adopt a rotating method where one housing moves by rotating around an axis line in an overlapping direction to open and close the cellular telephone 1, or to couple the housings 2 and 3 using a two-shaft hinge. It is also acceptable to adopt a straight shape in which the form does not change. However, in either case (excluding the straight type), a gap that communicates to the outside is formed between the operation-unit side housing unit 2 and the display-unit side housing unit 3 when the cellular telephone 1 is in a closed state.

As shown in FIG. 2, the operation-unit side housing unit 2 is equipped on one side surface with a side key 30 that is assigned a predetermined function, and a cap 31 for an interface where an external memory is inserted and removed. Also, the display-unit side housing unit 3 is equipped on one side surface with a slide key 32. A camera 33 for capturing images of a subject and a light 34 that radiates light on a subject are disposed on the rear panel 3d surface of the display-unit side housing unit 3. The camera 33 and the light 34 compose a camera module.

Figure 3:
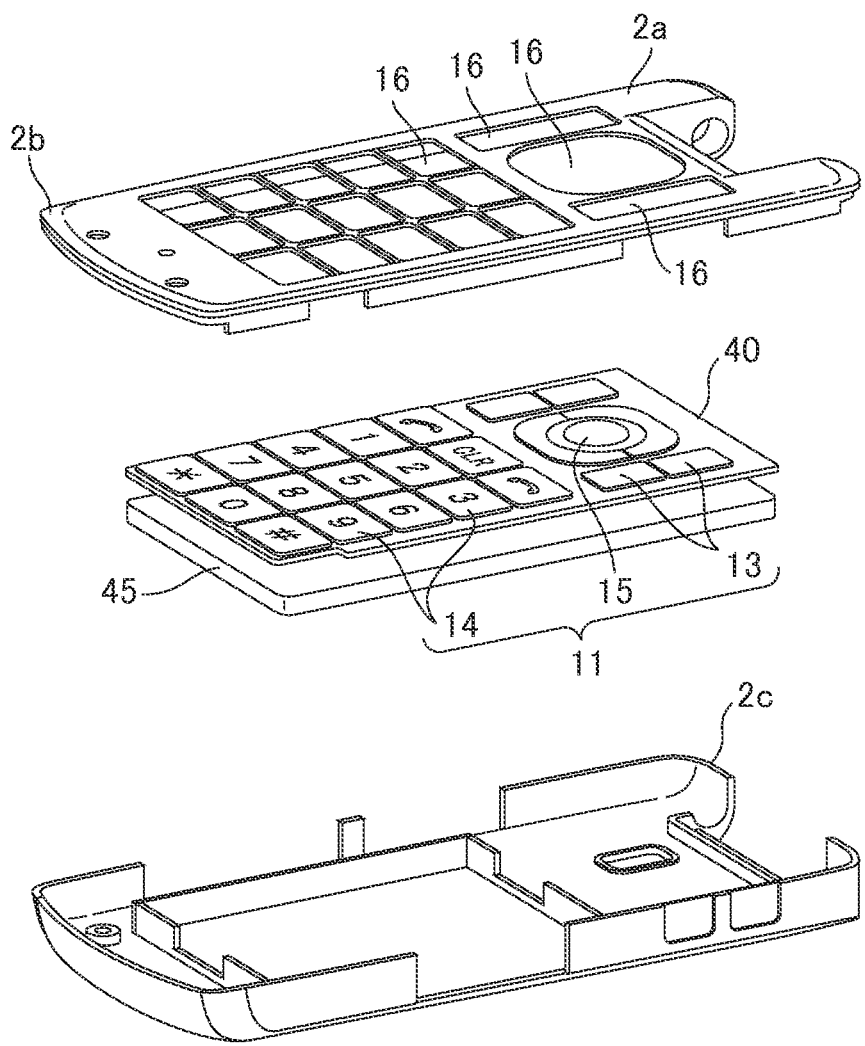
FIG. 3 is an exploded perspective view of components built into the operation-side housing unit.

As shown in FIG. 3, the operation-unit side housing unit 2 is equipped with the front panel 2a, the front case 2b (in FIG. 3, the front panel 2a and the front case 2b are joined), and a key sheet 40 equipped with the operation unit 11, a wiring board 45, and a rear case 2c. The entire key sheet 40 is composed of rubber; a plurality of keys (for pressing) is formed on the surface.

The wiring board 45 has a plurality of key switches A (see FIG. 7) on a surface of the front panel 2a side; each of the key switches A is structured to have a metal dome made of a metal plate bent into a bowl-shape having a solid form. When the bowl-shaped apex is pressed, the metal dome establishes electrical continuity by coming into contact with a switch terminal formed on the electrical circuit, not shown, printed on the surface of the wiring board 45. The wiring board 45 sandwiches wires between a plurality of insulative film.

Also, a plurality of key holes 16 is formed in the front panel 2a. Pressing surfaces of the function setting operation keys 13 formed on the key sheet 40, the input operation keys 14, and the determining operation keys 15 are exposed through the plurality of key holes 16. By pressing downward on pressing surfaces of the function setting operation keys 13, the input operation key 14, and the determining operation keys 15 that compose the exposed operation unit 11, the apex of a metal dome (bowl-shaped) of each of the corresponding key switches A is pressed, and the metal dome establishes electrical continuity by touching the switch terminal.

Figure 4:
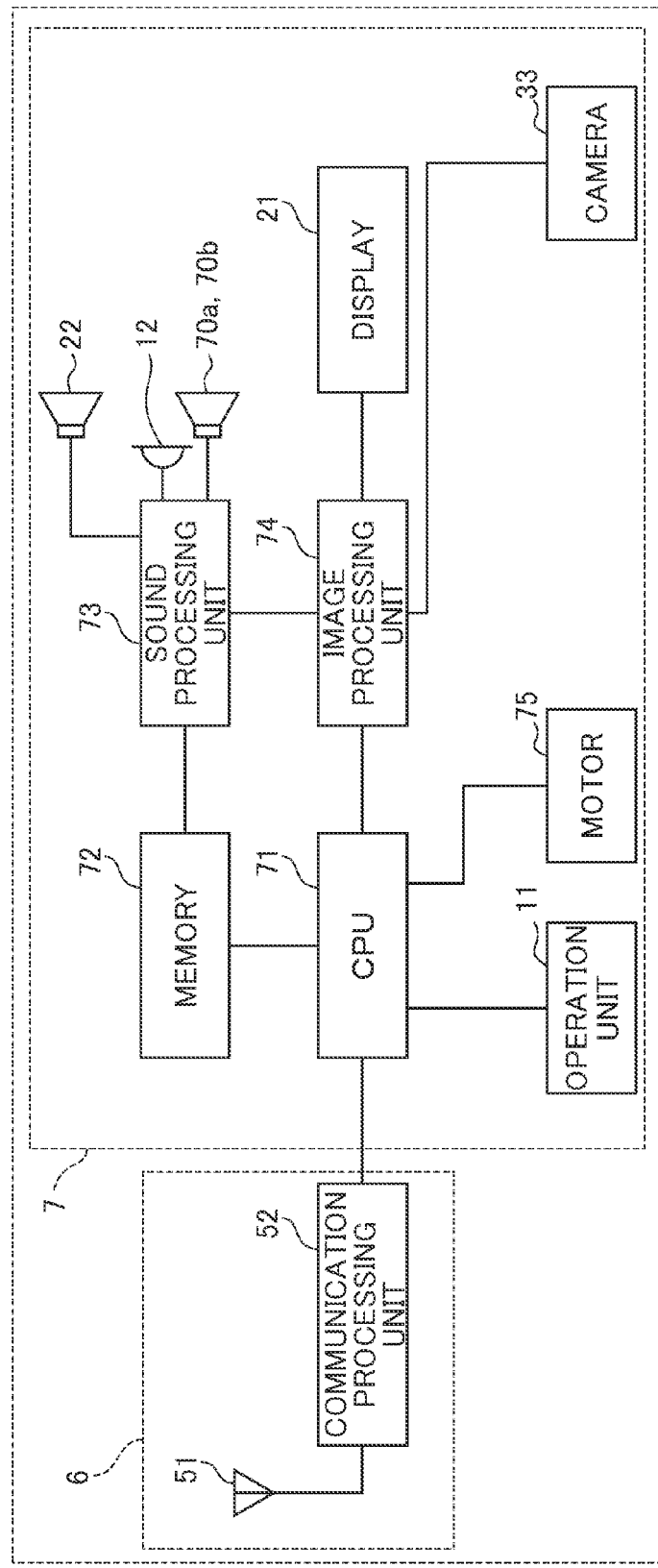
FIG. 4 is a block diagram showing functions of the cellular telephone of the present invention.

FIG. 4 is a block diagram that shows functions of the cellular telephone 1. As shown in FIG. 4, the cellular telephone 1 is equipped with a communication unit 6 that communicates with an external terminal, and a processing unit 7 that processes information communicated by the communication unit 6.

As shown in FIG. 4, the communication unit 6 is equipped with a main antenna 51 that communicates with an external device using a first frequency band, and a communication processing unit 52 that includes an RF circuit and processes signals such as by modulating and demodulating the signals. Also, the communication unit 6 receives power supplied from a charged battery (not shown).

The main antenna 51 performs communication with an external device at the first frequency band (for example 800 MHz). In this embodiment, 800 MHz is used as the first frequency band, but it is also acceptable to use another frequency band. Also, the main antenna 51 can also be configured with a so-called dual-band type antenna that also supports a second frequency band (for example 2 GHz) in addition to the first frequency band. Still further, the main antenna 51 can be configured with a plurality-bands type antenna that can also support a third frequency band.

The communication processing unit 52 demodulates signals received by the main antenna 51, supplies the signal to the processing unit 7 after demodulation, modulates signal supplied from the processing unit 7, and sends them to an external device via the main antenna 51.

As shown in FIG. 4, the processing unit 7 is equipped with the operation unit 11, a audio input unit 12, a display 21, a receiver 22, a CPU 71 that performs predetermined computations, a memory 72 that stores predetermined data, a sound processing unit 73 that performs predetermined audio processing, a image processing unit 74 that performs predetermined image processing, a motor 75 that oscillates at a fixed cycle, the camera 33 that captures images of a subject, and a speakers 70a, 70b that output incoming signal sounds and the like. Also, the processing unit 7 receives power supplied from a charged battery, not shown.

The cellular telephone 1 of the first embodiment configured in this way has a waterproofing function to enable it to be used by divers underwater, for example, such as when driving in the ocean. Furthermore, the cellular telephone 1 of the first embodiment has a function that detects water pressure as a load. And, it is also possible for this cellular telephone 1 reliably to determine whether the load is caused by water pressure or another pressure (such as human-induced pressure). Configurations and operations of this function of the cellular telephone 1 of the first embodiment will now be explained.

Figure 5:
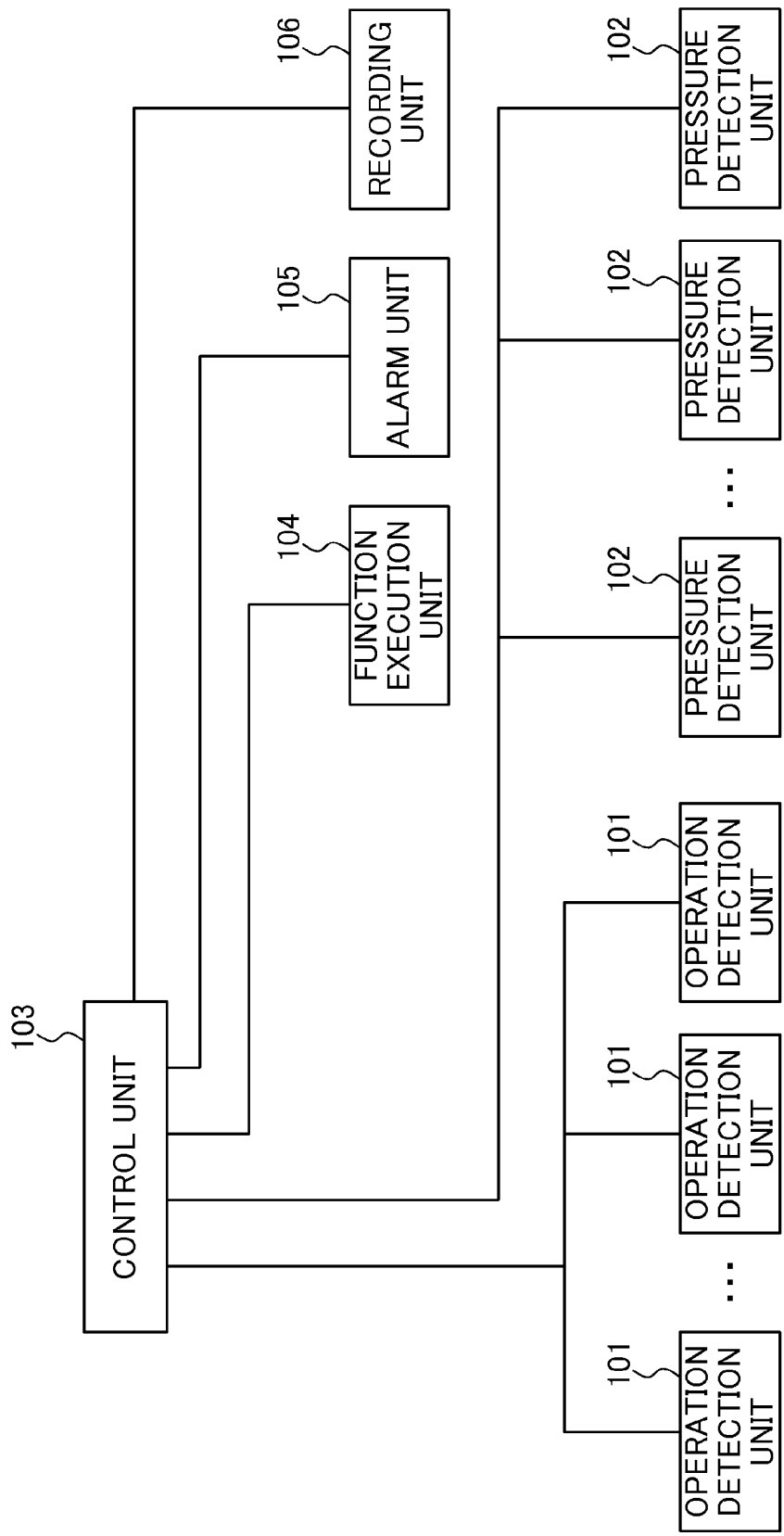
FIG. 5 is a block diagram of a configuration that achieves a diver function of the cellular telephone according to a first embodiment.

As shown in FIG. 5, the cellular telephone 1 of the first embodiment is equipped with a plurality of operation detection units 101, and a control unit 103. The plurality of operation detection units 101 detects pressure caused by a pressing operation. The control unit 103 implements a first control (for example, a control implemented by the detection of pressure other than water pressure) when pressure is detected by at least one of the plurality of operation detection units 101. The control unit 103 implements a second control (for example, a control implemented by the detection of water pressure) that is different from the first control when an even pressure is detected simultaneously by the plurality of operation detection units 101.

Detection of water pressure by the operation detection units 101 and the control unit 103 will now be explained. Each of the plurality of operation detection units 101 corresponds to a plurality of key switches A (see FIG. 7) disposed to correspond to each of the operation units 11; the control unit 103 corresponds to the CPU 71.

When the cellular telephone 1 is used in a normal situation (such as in a location other than underwater, as when used on land), the plurality of keys that compose the operation unit 11 are operated in sequence by a user. When the cellular telephone 1 is used in a special situation (for example, underwater), all of the plurality of keys that compose the operation unit 11 are pressed simultaneously by an even pressure by water pressure that corresponds to water depth.

The control unit 103 (CPU 71) determines whether the plurality of operation detection units 101 (plurality of key switches A) are pressed simultaneously by a constant pressure. Also, if it is determined that the plurality of key switches A is being pressed simultaneously by a constant pressure, it is determined that the cellular telephone 1 is being used in a special manner and the second control is implemented. Also, if it is determined that the plurality of key switches A is not being pressed simultaneously by a constant pressure, it is determined that the cellular telephone 1 is being used in a normal manner and the first control is implemented. The first control is implemented when pressure other than water pressure is detected. This control (control for conversations and for sending and receiving mail messages) relates to normal cell phone usage. The second control is implemented when water pressure is detected. This control (control for emitting light such as the LED as a warning, or to turn the power off, and the like) relates to special cell phone usage.

In this way, the cellular telephone 1 easily determines whether pressure detected by the operation detection units 101 is caused by user operation, or water pressure. Therefore, this reduces the number of components, and makes it possible to implement a proper control according to the status of the device, improving convenience.

With this embodiment of the present invention, it was explained that the plurality of operation detection units 101 corresponds to the plurality of keys that compose the operation unit 11. However, the present invention is not to be construed to be limited thereto. It is possible to adopt another configuration as long as it is possible to detect water pressure.

Also, the control unit 103 can be configured to implement the second control when an even pressure is simultaneously detected by the plurality of operation detection units 101 longer than a predetermined amount of time.

When the cellular telephone 1 is underwater, it is assumed with a high probability that an even pressure will be detected simultaneously longer than a predetermined amount of time by the operation detection units 101. However, even if the plurality of operation detection units 101 is simultaneously pressed by a constant pressure, if the pressure detection time is not continued a given amount of time (for example, 10 seconds), the cellular telephone 1 will not implement the second control because there is a low possibility that the apparatus is underwater. If the pressure detection time continues for a given amount of time (for example, 10 seconds), there is a high possibility that the apparatus is underwater, so the second control will be implemented.

Therefore, even if the plurality of operation detection units 101 has simultaneously detected an even pressure by accident, possibility that the cellular telephone 1 will erroneously implement the second control is reduced, and convenience is improved.

Also, it is acceptable to configure the control unit 103 to vary the second control according to a length of time an even pressure is simultaneously detected by the plurality of operation detection units 101.

For example, if the time an even pressure is detected simultaneously by the plurality of operation detection units 101 is one minute, the control unit 103 controls to emit light such as an LED as the second control; if the time is 10 minutes, the control unit 103 controls to vibrate the cellular telephone 1 using a motor 75 in addition to controlling to emit light such as the LED as the second control. By implementing such controls, it is possible to properly notify the user of the status underwater, and to favorably avoid damaging the cellular telephone 1.

Also, for example, if the time an even pressure is detected simultaneously by the plurality of operation detection units 101 is one minute, the control unit 103 shifts to a sleep mode by controlling the power circuit; if the time is 10 minutes, it controls the power circuit to turn off the power. By implementing such controls, it is possible to avoid cellular telephone 1 damage that can occur by changes in status underwater, and to conserve power.

In this way, it is possible to consider the time an even pressure is detected simultaneously by the plurality of operation detection units 101 as the time that the portable cell phone device is underwater, so by varying the second control according to the detection time, it is possible to further improve convenience of the cellular telephone 1 underwater.

Furthermore, it is acceptable to configure the control unit 103 to vary the second control according to the degree of pressure detected by the plurality of operation detection units 101.

For example, if the pressure detected by the plurality of operation detection units 101 is below a given threshold value (a weak pressure), the control unit 103 controls to emit light such as an LED; if the pressure is above a given threshold value (a strong pressure), the control unit 103 controls to vibrate the cellular telephone 1 using a motor 75 in addition to controlling to emit light, such as the LED. By implementing such controls, it is possible to properly notify the user of changes in the water pressure, and to avoid damaging the cellular telephone 1.

Also, for example, if pressure detected by the plurality of operation detection units 101 is below a given threshold value (a weak pressure), the control unit 103 shifts to a sleep mode by controlling the power circuit; if the pressure is higher than a given threshold value (a strong pressure), the control unit 103 controls the power circuit to turn off the power. By implementing such controls, it is possible to avoid cellular telephone 1 damage that can occur by changes in water pressure, and to conserve power.

In this way, it is considered that pressure detected by the plurality of operation detection units 101 increases in proportion to water depth. For that reason, by varying the second control according to pressure, it is possible to further improve convenience of the cellular telephone 1 underwater.

Also, the cellular telephone is further equipped with a plurality of pressure detection units 102 disposed adjacent to each of the plurality of operation detection units 101 to detect varied pressure of each; the control unit 103 can be configured to vary the second control according to pressure detected by the plurality of operation detection units 101 or to pressure detected by the plurality of pressure detection units.

The plurality of pressure detection units 102 corresponds to a plurality of pressure detection switches B (see FIG. 7) disposed adjacent to each of the plurality of key switches A. The plurality of pressure detection units 102 detects pressure sequentially from pressure detection units 102 with low detected pressures that correspond to water depth. For example, if pressure is detected by one pressure detection unit 102 of the plurality of pressure detection units 102, the control unit 103 controls to emit light of one LED of a plurality of LEDs; if pressure is detected by two pressure detection units 102 of the plurality of pressure detection units 102, the control unit 103 controls to emit two LEDs of the plurality of LEDs.

In this way, the number of pressure detection units 102 that detect pressure increases in proportion to water depth. Therefore, by varying the second control according to pressure, it is possible to further improve convenience of the cellular telephone 1 underwater.

Also, as shown in FIG. 5, the cellular telephone 1 can also be configured to have a function execution unit 104 that executes predetermined functions. In such a configuration, the control unit 103 restrains execution of a function as a second control when an even pressure is detected simultaneously by the plurality of operation detection units 101, in a state where a predetermined function is executed by the function execution unit 104.

For example, when a function that is difficult to use underwater (particularly, a function that involves emitting audio (excluding when using a headphone), because sound does not travel easily through the medium of water) is executed, execution of that function would be meaningless if the cellular telephone 1 is submerged in water, and would wastefully consume power.

For that reason, the cellular telephone 1 conserves power consumption by restraining that function using the second control when the apparatus is in such an environment.

Furthermore, as shown in FIG. 5, it is acceptable to configure the cellular telephone 1 to have an alarm unit 105. With such a configuration, the control unit 103 issues an alarm using the alarm unit 105 as a second control when an even pressure is detected simultaneously by the plurality of operation detection units 101.

For example, if an even pressure is detected simultaneously by the plurality of operation detection units 101, the cellular telephone 1 emits light with the LED or a backlight of the display 21 as the alarm unit 105, or drives the motor 75 as the alarm unit 105.

With such a configuration, the cellular telephone 1 issues the predetermined alarm if water depth beyond a given level is reached to avoid cellular telephone 1 damage and to improve convenience.

The control unit 103 can also be configured to implement a power restraining operation as a second control when an even pressure is detected simultaneously by the plurality of operation detection units 101.

With such a configuration, the cellular telephone 1 restrains power (for example, the power is turned off) when water depth beyond a given level is reached, to avoid damaging the cellular telephone 1 and to conserve power.

With the cellular telephone 1, the plurality of operation detection units 101 can also be configured to have a first section disposed on a first surface of the housing, and a second section disposed on a second surface of the housing.

If the plurality of operation detection units 101 is disposed on one surface, for example if all of the plurality of operation detection units 101 are composed by the side key 30, there could be instances in which an even pressure is simultaneously applied to the side key 30, such as when the cellular telephone 1 is held in a pocket, or the like. This can cause the second control to be implemented erroneously.

For that reason, with the cellular telephone 1, the plurality of operation detection units 101 is composed of the operation unit 11 disposed on a surface of the front panel 2a as the first surface of the operation-unit side housing unit 2, which is a housing, and the side key 30 disposed on a side surface as the second surface of the operation-unit side housing unit 2.

With such a configuration, the possibility that the second control will be erroneously implemented is reduced because the first and second sections are disposed on different surfaces of the housing.

Furthermore, as shown in FIG. 5, it is acceptable to configure the cellular telephone 1 to have a recording unit 106. With such a configuration, when a value of an even pressure detected simultaneously by the plurality of operation detection units 101 exceeds a predetermined value, the control unit 103 records in the recording unit 106 the instance that that value exceeded the predetermined value.

For example, if the cellular telephone 1 specification guarantees use in water up to 10 m deep, a predetermined value is set at 10 m. In such a case, if water pressure is detected that exceeds 10 m, that usage that is outside of the specifications is recorded in the recording unit 106. For that reason, it is possible easily to determine whether the cellular telephone 1 has experienced a normal malfunction or a malfunction caused by being used outside of normal specifications by referencing data saved in the recording unit 106, and can be a lead to finding the cause of the malfunction.

<Water Submersion Detection Method>

Figure 7:
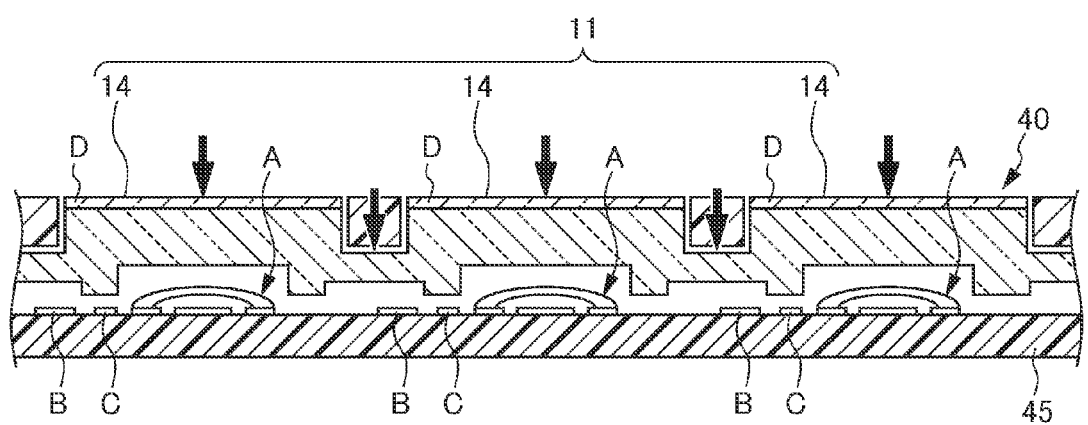
FIG. 7 is a unital view of line X-X in FIG. 1.

Here, a method for detecting when the apparatus is submerged in water will now be explained with reference to FIG. 7. FIG. 7 is a unital view of line X-X in FIG. 1.

With the cellular telephone 1, the operation unit 11 is equipped with a plurality of keys, as described above; the plurality of keys is formed on the key sheet 40. Therefore, the plurality of keys that compose the operation unit 11 are directly affected by water pressure when submerged in water. The cellular telephone 1 according to the present invention has a function for measuring water depth (water pressure) that detects submersion in water and water pressure in real-time using the detection of the pressing of keys by the plurality of key switches A each disposed to correspond to the plurality of keys, and the key sheet 40 structure, that uses an existing device configuration.

Normally, the weight when each of the plurality of keys that compose the operation unit 11 is pressed is 100-150 (g). This weight can vary depending on the portable electronic device; it is possible to be 100 (g) or lower, or 150 (g) or higher. With this embodiment, as a general guide, the weight when each of the plurality of keys that compose the operation unit 11 is pressed is 100-150 (g).

If the surface area of each key is approximately 13 (mm)× (mm)=91 (mm$^2$), water pressure at a depth of 1 m will be 91 (mm$^2$)×1000 (mm)/1000 (mm)3=91 (g); at a water depth of 2 m, it is 91×2=182 (g); at a water depth of 4 m, it is 91×4=364 (g); and at a water depth of 20 m, it is 91×20=1820 (g).

Therefore, at a water depth of 2 (m), all keys are pressed by water pressure. Because under normal use, not all keys are pressed for operation, the control unit 103 judges that a state in which all keys are pressed simultaneously is a state in which the device is submerged in water. Furthermore, the control unit 103 also judges a state in which a plurality of simultaneously pressed keys that are not ordinarily pressed simultaneously, as a state in which the apparatus is submerged in water. In this way, the cellular telephone 1 reliably detects the state of the apparatus being submerged in water without a mechanism that detects the submersion in water directly getting wet with water.

Furthermore, with the cellular telephone 1, it is possible to detect submersion in water at depths shallower than 2 (m) by using a configuration that sets key switches A and rubber thickness so that they are pressed by a pressure weaker than that of normal key operation.

<Water Depth Detection Method>

The following will now explain a water depth detection method.

As shown in FIG. 7, with the cellular telephone 1, pressure detection switches B that are different from the key switches A that detect submersion in water described above, are disposed to correspond to each of the plurality of keys that compose the operation unit 11. Also, the plurality of pressure detection switches B and the thickness of the rubber for the key sheet 40 are set to a proper combination; individual pressure detection switches B are configured to be pressed in order at each degree of water depth. With this configuration, the control unit 103 detects water depth according to the number of pressed pressure detection switches B.

Furthermore, key switches A are disposed that have different detection pressures for each of the plurality of keys that compose the operation unit 11. The key switches A and key sheet 40 rubber thickness are set to a proper combination so that each key is pressed in order at each degree of water depth.

It is also acceptable that the configuration detects water depth according to the pressure detected by the key switches A.

<Water Depth Display Method>

The following will now explain a water depth display method.

As shown in FIG. 7, a plurality of light emitting units C (for example, this can be composed of LEDs) is formed on the key sheet 40; these are configured to illuminate each key from behind. With the cellular telephone 1, the plurality of light emitting units C is used as a level meter so that water depth can be ascertained at a glance. For example, the control unit 103 controls to light one LED at a water depth of 2 m, 2 LEDs at a water depth of 4 m, and 10 LEDs at a water depth of 20 m.

Also, with a configuration to display water depth using the display 21, the backlight of the display 21 consumes approximately 50 mA of current. Also if the backlight is lit for an extended period of time, this will increase the battery load. Current consumption of one LED is approximately 2 mA which is low compared to the backlight. Also, because lighting time is extended, the user can easily check water depth by glancing at the operation unit 11 when necessary (see FIG. 6).

<Water Submersion Warning>

The following will now explain a warning method when the device is submerged in water.

Even though the device has a waterproof function, there are cases where it will be left in an environment, such as underwater, that exceeds the waterproof function. The cellular telephone 1 of the present invention has a function for recording the time the apparatus is submerged in water by detecting that the device is underwater using a water submersion detection function, and a function for detecting water temperature using a temperature sensor installed on the housing surface of the cellular telephone 1.

The cellular telephone 1 issues a predetermined warning for any of the following by using the information obtained by the function that records water submersion time and the function that detects water temperature. The warnings are issued when: 1. Water depth (water pressure) exceeded the set water depth; 2. Water submersion time exceeded the set time; and 3. Water temperature exceeded the set temperature range. (Warnings can be a light emitting operation, such as using an LED and the like, or by driving the motor 75.)

The following will now explain a specific configuration of the key sheet 40.

With the embodiment described below, the configuration of the cellular telephone 1 performs water submersion detection and water depth detection using the 12 keys of the numerical keypad (1-9, and 0), the * key and the # key formed on the key sheet 40. All keys are configured to respond to the same weight because it is necessary to give the user a sensation (clicking sensation) of having pressed a key.

As shown in FIG. 7, with the cellular telephone 1, each key disposed on the key sheet 40 is pressed by water pressure, when water pressure is applied. As described above, the patterns on the wiring board 45 are pressed and switched back using a metal dome and the like for each of the key switches A disposed to correspond to each key; a constant weight is ensured using the metal dome or the like.

The cellular telephone 1 determines that it is submerged in water when all key switches A or a plurality of key switches A that correspond to a predetermined plurality of keys are detected to be simultaneously pressed by water pressure. In other words, the plurality of key switches A have the functionality of water submersion detection switches.

Also, as shown in FIG. 7, the cellular telephone 1 is configured so that water can enter between the key sheet 40 positioned above the pressure detection switches B disposed to correspond to each key, and the front panel 2*a*; the key sheet 40 positioned above each pressure detection switches B uniformly receives water pressure.

Also, it is acceptable to configure the cellular telephone 1 to apply a key lock after it is determined to be submerged in water to prevent erroneous operation of the keys by water pressure. Also, it is acceptable to configure the cellular telephone 1 to allow operation of only specific keys when the user wants to use a function such as an underwater camera after being submerged in water.

Also, with the cellular telephone, it is acceptable to configure the key switches A that correspond to each key to be set so that each is pressed by a specific water pressure, and to be pressed at each degree water becomes deeper. For example, by setting the numerical keypad number "1" to a pressing force of 182 (g), and the numerical keypad number "2" to a pressing force of 364 (g), it is possible to ascertain weights by knowing which key was pressed; in turn it is possible to detect water depth from the weight.

Figure 8:
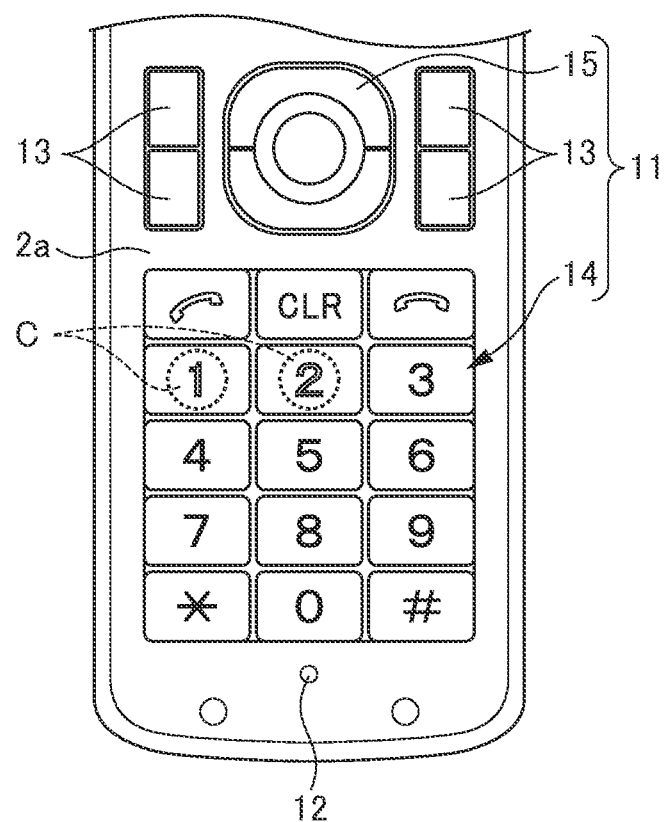
FIG. 8 is a view of one example of a display format when displaying depth using the numerical keypad.

It is also acceptable to configure the cellular telephone 1 to light the numerical keypad according to the detected water depth. For example, if the pressure detection switches B that correspond to the keys "1" and "2" are pressed at a water depth of 4 (m), the light emitting unit (LED) C disposed at the back surfaces of the keys "1" and "2" lights thereby providing a visual alarm to the user that the water depth is 4 (m). (See FIG. 8.) Furthermore, it is also acceptable to configure the cellular telephone 1 to display "water depth XX m" on the display 21 as another alarm example.

<Operation Method>

Figure 9:
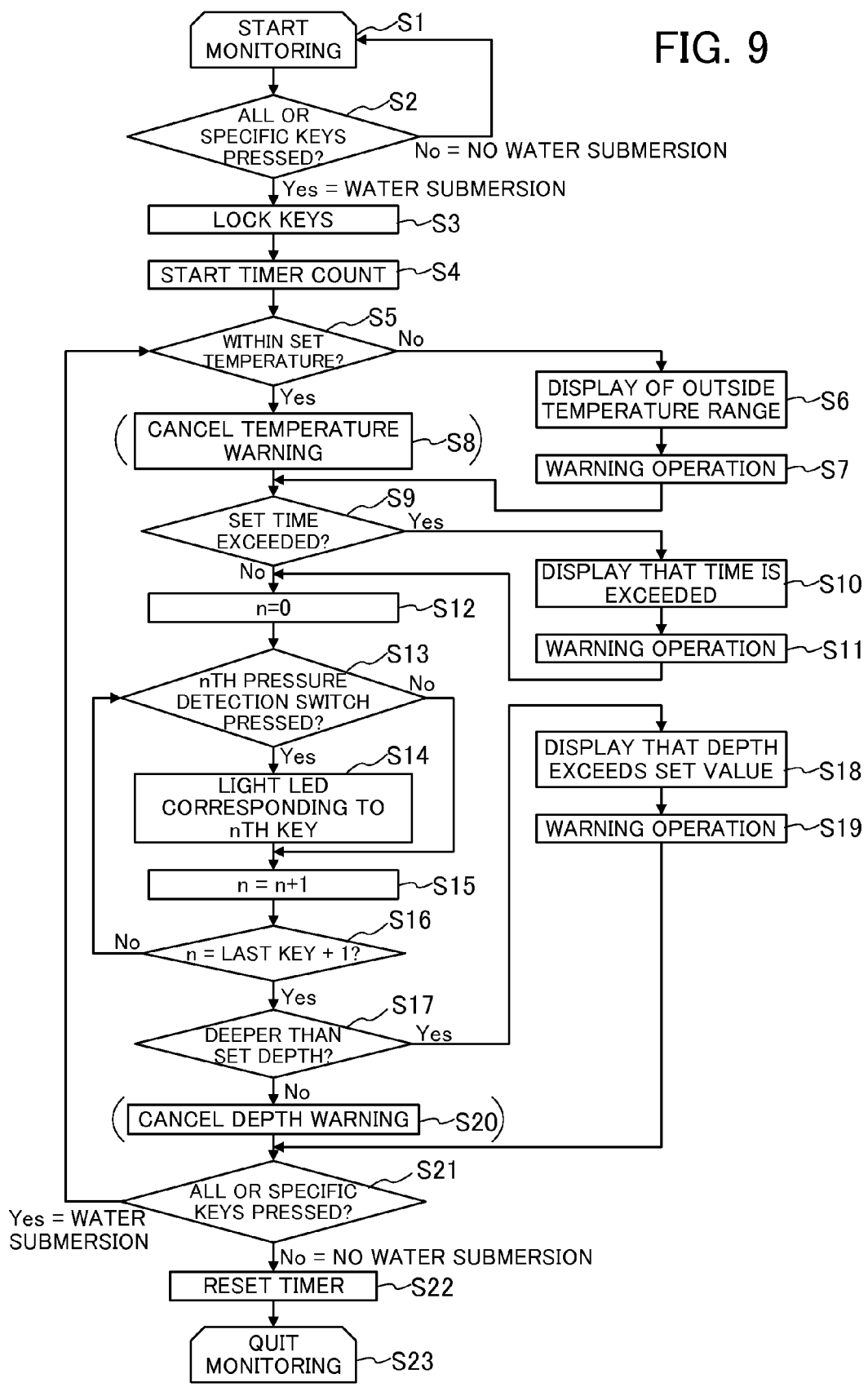
FIG. 9 is a flowchart to explain operation of the cellular telephone according to the first embodiment.

The following will now explain operations of the cellular telephone 1 with reference to the flowchart shown in FIG. 9.

At step S1, the control unit 103 starts monitoring water submersion. The control unit 103 intermittently monitors water submersion when in standby to receive data, and intermittently or continually at any time, monitors water submersion.

At step S2, the control unit 103 detects that a key has been pressed (pushing pressure). If the control unit 103 detects that all of the key switches A (or a plurality of key switches A) have been pressed simultaneously, it detects submersion in water, and advances to step S3. Also, if the control unit 103 detects that not all of the key switches A (or a specific plurality of key switches A) have been pressed simultaneously, it returns to step S1.

At step S3, when the control unit 103 detected submersion in water, it controls a key lock to prevent erroneous operation of keys erroneously being pressed by water pressure.

At step S4, the control unit 103 starts driving a timer that counts the time the device is submerged in water after it has been detected that the device is submerged in water at the process of step S3.

At step S5, the control unit 103 detects the water temperature measured by the temperature sensor to determine whether the temperature is within the preset temperature settings. If the temperature is outside of the set temperature settings (No), it advances to step S6; if the temperature is within the set temperature settings (Yes), it advances to step S8 or step S9.

At step S6, the control unit 103 displays that the temperature is outside of the set temperature range.

At step S7, the control unit 103 implements the warning operation. If the temperature returns to within the set temperature range, the control unit 103 cancels the display at step S6 and the warning operation at step S7.

At step S8, if the display at step S6 and the warning operation at step S7 are being executed, and the temperature has been confirmed to have returned to the set temperature range, the control unit 103 cancels the display at step S6 and the warning operation at step S7.

At step S9, the control unit 103 references the timer driven at the process of step S4, measures the time the device has been submerged in water, and determines whether that time has exceeded the preset time. If it is determined to be beyond the set time (Yes), it advances to step S10, and if it is determined not to be beyond the set time (No), it advances to step S12.

At step S10, the control unit 103 displays that the set time has been exceeded.

At step S11, the control unit 103 implements the warning operation.

At step S12, the control unit 103 clears to zero (n=0) the counter that counts the number n of the pressed pressure detection switches B.

At step S13, the control unit 103 determines whether the pressure detection switches B that correspond to the set nth keys were pressed. When the pressure detection switches B that correspond to the nth keys have been determined to be pressed, it advances to step S14; when the pressure detection switches B that correspond to the nth keys have been determined not to be pressed, it advances to step S15. Pressures pressed for each corresponding key are different for the pressure detection switches B. The control unit 103 measures water depth by monitoring the pressed pressure detection switches B.

At step S14, the control unit 103 lights the light emitting unit (LED) C that corresponds to nth keys. For example, the control unit 103 lights only the light emitting unit (LED) C that corresponds to the "1" key when only the pressure detection switch B that corresponds to the "1" key has been pressed.

At step S15, the control unit 103 increments (n=n+1) the pressed pressure detection switches B number n.

At step S16, the control unit 103 determines whether the pressed pressure detection switches B number n has reached a prescribed number (key number+1). If it is determined that the prescribed number has been reached (Yes), it advances to step S17; if it is determined that the prescribed number has not been reached, it returns to step S13.

At step S17, the control unit 103 determines whether the water depth is deeper than the set water depth. If it is determined that the water depth is deeper than the set water depth (Yes), it advances to step S18; if it is determined not to be deeper than the set water depth (No), it advances to step S20 or step S21.

At step S18, the control unit 103 displays that the depth is deeper that the set water depth.

At step S19, the control unit 103 implements the warning operation. Thereafter, if the water depth returns to within the set depth range, the control unit 103 cancels the display at step S18 and the warning operation at step S19.

At step S20, if the display at step S18 and the warning operation at step S19 are being executed, and the depth has been confirmed to have returned to the set depth, the control unit 103 cancels the display at step S18 and the warning operation at step S19.

At step S21, the control unit 103 implements a key pressure detection. If the control unit 103 detects that all of the keys (or a specific plurality of specific keys) have been pressed simultaneously, it continues to detect submersion in water, and returns to step S5. Also, if the control unit 103 detects that all of the key switches A (or a specific plurality of key switches A) are not being pressed simultaneously, it advances to step S22.

At step S22, the control unit 103 resets the timer driven from at the process of step S4.

At step S23, the control unit 103 quits monitoring submersion in water.

Also, it is acceptable to configure the cellular telephone 1 to allow the user to set water depth, water temperature, and time ranges, and to include a setting unit that issues a warning when the ranges have been exceeded.

A cellular telephone of a conventional configuration, detected submersion by determining whether a circuit terminal for detection formed in a circuit was wet with water. Conversely, the cellular telephone 1 of the present invention detects submersion in water by detecting a pressing state of the keys, as described above; it is not necessary, therefore, to allow water to enter the circuit, as is the case with the conventional device. This prevents the circuit from becoming wet.

Also, the cellular telephone of the conventional configuration detected water depth by converting electrical signal amounts output from a water pressure sensor into digital values that can be read by the processing unit (CPU). That required an external sensor and led to increased manufacturing costs. Conversely, the cellular telephone 1 of the present invention detects water depth without increasing manufacturing costs because it uses rubber keys that are existing components and the structure of the housing, extends key switches, and utilizes the phenomenon of water pressure acting in proportion to water depth on the housing.

Also, with the cellular telephone of the conventional configuration, the user is informed of the water depth by an LCD display or the like. Conversely, with the cellular telephone 1 of the present invention, the user is informed of the water depth by using the display as a level meter, by varying according to water depth the lighting patterns of members that light the keys (key LEDs) which are existing components. Therefore, the cellular telephone 1 enables the user to recognize water depth at a single glance, and also dramatically reduces power consumption compared displaying water depth using an LDC.

Also, with the cellular telephone 1, it is possible to display water depth for an extended period with a lower power consumption compared to an LCD which becomes extinguished after several seconds; this has the effect of enabling the user easily to confirm water depth.

Also, the cellular telephone of the conventional configuration did not have so-called diver specifications so it only assumed submersion in approximately 1 meter of water. With such a cellular telephone, in order to improve its waterproofing performance to provide specifications for divers, several problems (for example, keys will be pressed by the water pressure and cause erroneous operations) can be expected. With the cellular telephone 1 of the present invention, the configuration prevents erroneous operation of the keys by applying a key lock by determining submersion in water.

Furthermore, the cellular telephone 1 of the present invention has diver functions so when it is used beyond preset ranges (for example, water depth), the configuration gives a warning to the user that can be recognized underwater, making it possible to avoid accidents in advance.

Note that in the embodiment, the configuration allows detection of the apparatus being submerged in water regardless of whether the cellular telephone 1 is in an opened or a closed state. However, the present invention is not limited to this configuration. It is also acceptable to configure the cellular telephone so that it detects being submersion in water only when it is closed, which is when there is an extremely low possibility that the operation unit 11 will be used for normal operations. This restrains unintended execution of the second control when the plurality of keys that compose the operation unit 11 has been detected simultaneously to have an even pressure accidently, when the apparatus is being in a normal manner.

The following will now explain a second embodiment of the present invention. To simplify the explanation of the each of the following embodiments, the same symbols that were used for the same configuring elements have been omitted from the explanation. Mainly, the cellular telephone 1 of the second embodiment or later is different from the first embodiment in the control applied by the control unit.

Figure 10:
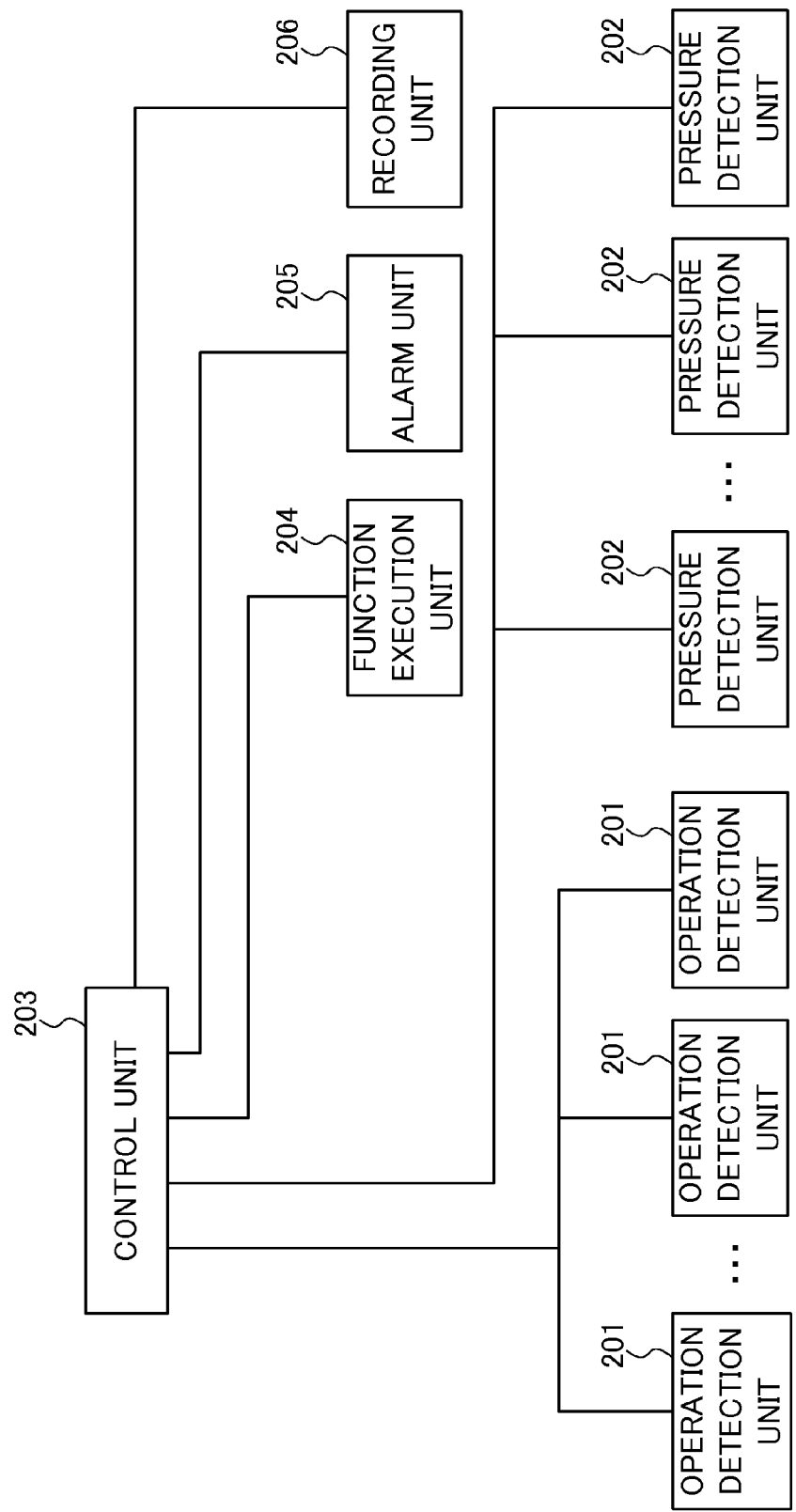
FIG. 10 is a block diagram of a configuration that achieves a diver function of the cellular telephone according to a second embodiment.

As shown in FIG. 10, the cellular telephone 1 of the second embodiment is equipped with operation detection units 201, and a control unit 203. The operation detection units 201 detect pressure of a pressing operation. The control unit 203 implements a first control (for example, a control implemented by the detection of pressure other than water pressure) when pressure is detected by the operation detection units 201. The control unit 203 implements a second control (for example, a control implemented when water pressure is detected) that is different from the first control when a pressure higher than a predetermined value (for example, a water pressure value when the cellular telephone is at a depth of 5 meters of water) is detected by the operation detection units 201 longer than a predetermined amount of time (for example, 10 seconds).

Detection of water pressure by the operation detection units 201 and the control unit 203 will now be explained. Each of the operation detection units 201 corresponds to a plurality of key switches A (see FIG. 7) disposed to correspond to each of the plurality of keys that compose the operation unit 11. Specifically, a plurality of operation detection units 201 is disposed. Furthermore, the control unit 203 corresponds to the CPU 71.

When the cellular telephone 1 is used in a normal situation (such as in a location other than underwater, as when used on land), the plurality of keys that compose the operation unit 11 are operated in sequence by a user. Specifically, predetermined keys are almost never pressed continually for an extended period of time. However, if the cellular telephone 1 is used in a special manner (for example, underwater), it is assumed that there is a high probability that the operation detection units 201 will detect a predetermined pressure longer than a predetermined amount of time.

However, even if the operation detection units 201 are pressed by a predetermined pressure, if the pressure detection time is not continued for a predetermined amount time (for example, 10 seconds), there is a low possibility that the apparatus is underwater, so the control unit 203 (CPU 71) determines the cellular telephone is being used normally and implements the first control. Furthermore, if the pressure detection time continues for a predetermined amount of time (for example, 10 seconds), the control unit 203 determines that there is a high possibility that the apparatus is being used in a special manner, and implements the second control.

The first control is implemented when pressure other than water pressure is detected. This control (control for conversations and for sending and receiving mail messages) relates to normal cellular telephone usage. The second control is implemented when water pressure is detected. This control (control for emitting light such as for the LED as a warning, or to turn the power off and the like) relates to special cellular telephone usage.

In this way, the cellular telephone 1 of the second embodiment easily determines whether pressure detected by the operation detection units 201 is caused by user operation, or by water pressure. Therefore, this reduces the number of components, and makes it possible to implement a proper control according to the status of the apparatus and to improve convenience of the cellular telephone 1.

Furthermore, even if the operation detection units 201 accidentally detect a predetermined pressure, the second control is implemented after waiting a predetermined amount time, so the possibility of erroneous implementation of the second control is reduced and convenience is improved.

Also, a plurality of the control units 201 is disposed, and it is acceptable to configure the control unit 203 to implement the second control when a pressure higher than a predetermined value is detected longer than a predetermined amount of time by the plurality of operation detection units 201.

When the cellular telephone 1 is used in a special situation (for example, used underwater), all of the plurality of keys that compose the operation unit 11 are pressed simultaneously with a constant pressure by water pressure that corresponds to water depth. Specifically, when underwater, the plurality of operation detection units 201 simultaneously detects pressure higher than a predetermined value caused by water pressure.

Therefore, when a pressure higher than a predetermined value is detected simultaneously by the plurality of the operation detection units 201 (a plurality of key switches A) longer than a predetermined amount of time, the control unit 203 implements the second control. By implementing such a control, possibility of erroneous implementation of the second control is reduced, the precision of water pressure detection is improved and convenience of the cellular telephone 1 is improved.

Also, it is acceptable to configure the control unit 203 to vary the second control according to the length of time pressure higher than a predetermined value is detected by the plurality of operation detection units 201.

For example, if the time a predetermined pressure is detected by the plurality of operation detection units 201 is one minute, the control unit 203 controls to emit light such as an LED as a second control; if the time is 10 minutes, the control unit 203 controls to vibrate the cellular telephone 1 using a motor 75 in addition to the control to emit light such as the LED as a second control. By implementing such a control, it is possible to properly notify the user of the status underwater, and to avoid damaging the cellular telephone 1.

Also, for example, if the time that a predetermined pressure is detected by the operation detection units 201 is one minute, the control unit 203 shifts to a sleep mode by controlling the power circuit; if the time is 10 minutes, the control unit 203 controls the power circuit to turn off the power. By implementing such a control, it is possible to avoid damaging the cellular telephone 1 that can occur by changes in the status underwater, and to conserve power.

In this way, the time that a predetermined pressure is detected by the operation detection units 201 can be considered to be the amount of time the cellular telephone is underwater. Therefore, by varying the second control according to an amount of time, it is possible to further improve convenience of the cellular telephone 1 underwater.

Also, it is acceptable to configure the control unit 203 to vary the second control according to pressure detected by the plurality of operation detection units 201.

For example, if the pressure detected by the operation detection units 201 is below a given threshold value (a weak pressure), the control unit 203 controls to emit light such as an LED; if the pressure is above a given threshold value (a strong pressure), the control unit 203 controls to vibrate the cellular telephone 1 using a motor 75 in addition to controlling to emit light of an LED or the like. By implementing such a control, it is possible to properly notify the user of changes in the water pressure, and to avoid damaging the cellular telephone 1.

Also, for example, if pressure detected by the operation detection units 201 is below a given threshold value (a weak pressure), the control unit 203 shifts to a sleep mode by controlling the power circuit; if the pressure is higher than a given threshold value (a strong pressure), the control unit 203 controls the power circuit to turn off the power. By implementing such a control, it is possible to avoid damaging the cellular telephone 1 that can occur by changes in water pressure, and to conserve power.

In this way, pressure detected by the operation detection units 201 is considered to increase in proportion to water depth. Therefore, by varying the second control according to pressure, it is possible to further improve convenience of the cellular telephone 1 underwater.

Also, as shown in FIG. 10, the cellular telephone 1 is further equipped with a plurality of pressure detection units 202 disposed adjacent to each of the plurality of operation detection units 201 to detect varied pressure respectively. It is acceptable to configure the control unit 203 to vary the second control according to pressure detected by the plurality of operation detection units 201 or to pressure detected by the plurality of pressure detection units 202.

The plurality of pressure detection units 202 corresponds to a plurality of pressure detection switches B (see FIG. 7) disposed adjacent to each of the plurality of key switches A. The plurality of pressure detection units 202 detects pressure sequentially from pressure detection units 202 with low detected pressures corresponding to water depth. For example, if pressure is detected by one pressure detection unit 202 of the plurality of pressure detection units 202, the control unit 203 controls to emit light of one LED of a plurality of LEDs; if pressure is detected by two pressure detection units 202 of the plurality of pressure detection units 202, the control unit 203 controls to emit light of two LEDs of the plurality of LEDs.

In this way, the number of pressure detection units 202 that detect pressure is considered to increase in proportion to water depth. Therefore, by varying the second control according to pressure, it is possible to further improve the convenience of the cellular telephone 1 underwater.

Also, as shown in FIG. 10, it is acceptable to configure the cellular telephone 1 to have the function execution unit 204 that executes predetermined functions. In such a configuration, the control unit 203 restrains execution of a function as a second control when pressure higher than a predetermined value is detected by the operation detection units 201 continually a predetermined amount of time, in a state where a predetermined function is executed by the function execution unit 204.

For example, when a function that is difficult to use underwater (particularly, a function that involves emitting audio (excluding when using a headphone), because sound does not travel easily through the medium of water) is executed, execution of that function would be meaningless if the cellular telephone 1 is underwater, and would wastefully consume power.

For that reason, the cellular telephone 1 conserves power by restraining that function using the second control when it is in such an environment.

Furthermore, as shown in FIG. 10, it is also acceptable to configure the cellular telephone 1 to have an alarm unit 205. With such a configuration, the control unit 203 issues an alarm using the alarm unit 205 as a second control when pressure higher than a predetermined value is detected by the operation detection units 201 continually a predetermined amount of time.

For example, if pressure higher than a predetermined value is detected by the operation detection units 201 continually a predetermined amount of time, the cellular telephone 1 emits light using the LED or a backlight of the display 21 as the alarm unit 205, or drives the motor 75 as the alarm unit 205.

With such a configuration, the cellular telephone 1 issues a predetermined alarm when a predetermined amount of time passes while the cellular telephone is in a state where it reached water depth beyond a given level to avoid cellular telephone 1 damage and to improve the convenience of the cellular telephone 1.

Also, it is acceptable to configure the control unit 203 to implement a power restraining operation as a second control when pressure higher than a predetermined value is detected by the operation detection units 201 longer than a predetermined amount of time.

With such a configuration, the cellular telephone 1 restrains power (for example, the power is turned off, or the cellular telephone enters a sleep mode) when a predetermined amount of time passes while the cellular telephone is in a state where it reached water depth beyond a given level to avoid cellular telephone 1 damage and to conserve power.

Also, as shown in FIG. 10, it is acceptable to configure the cellular telephone 1 to have a recording unit 206. With such a configuration, when pressure higher than a predetermined value is detected by the operation detection units 201 longer than a predetermined amount of time, the control unit 203 records that instance in the recording unit 206.

For example, if the cellular telephone 1 specification guarantees use in water up to 10 meters deep, the predetermined value is set at 10 meters. In such a case, if water pressure is detected that exceeds 10 m continually a predetermined amount of time, that usage that is outside of the specifications is recorded in the recording unit 206. For that reason, it is possible easily to determine whether the cellular telephone 1 has experienced a normal malfunction or a malfunction caused by being used outside of normal specifications by referencing data saved in the recording unit 206, and can be a lead to finding the cause of the malfunction.

<Water Submersion Detection Method>

Here, a method for detecting when the cellular telephone 1 according to the second embodiment is submerged in water will now be explained with reference to FIG. 7. With the second embodiment, predetermined keys are not continually pressed for normal use, so the control unit 203 determines that a state in which predetermined keys are pressed by a pressure higher than a predetermined value continually for a predetermined amount of time to be a state in which the cellular telephone 1 is submerged in water.

It is acceptable to configure the control unit 203 to determine that the state in which all keys are pressed by a pressure higher than a predetermined value continually for a predetermined amount of time as the state in which the cellular telephone is submerged in water. Also, it is acceptable to determine the state in which a plurality of keys normally not pressed simultaneously are pressed by a pressure higher than a predetermined value continually for a predetermined amount of time as the state in which the cellular telephone is submerged in water.

In this way, the cellular telephone 1 reliably detects the state of the cellular telephone being submerged in water without a mechanism that detects submersion in water get wet directly by water.

The cellular telephone 1 of the second embodiment determines that it is submerged in water when predetermined key switches A, for example all key switches A or a plurality of key switches A that correspond to a determined plurality of keys, are detected to be pressed simultaneously by a predetermined water pressure continually for a predetermined amount of time. In other words, the plurality of key switches A has the functionality of water submersion detection switches.

It is acceptable to configure the cellular telephone 1 to determine that it is submerged in water when a state is detected in which one key switch A was pressed by a predetermined water pressure continually for a predetermined amount of time.

<Operation Method>

Figure 11:
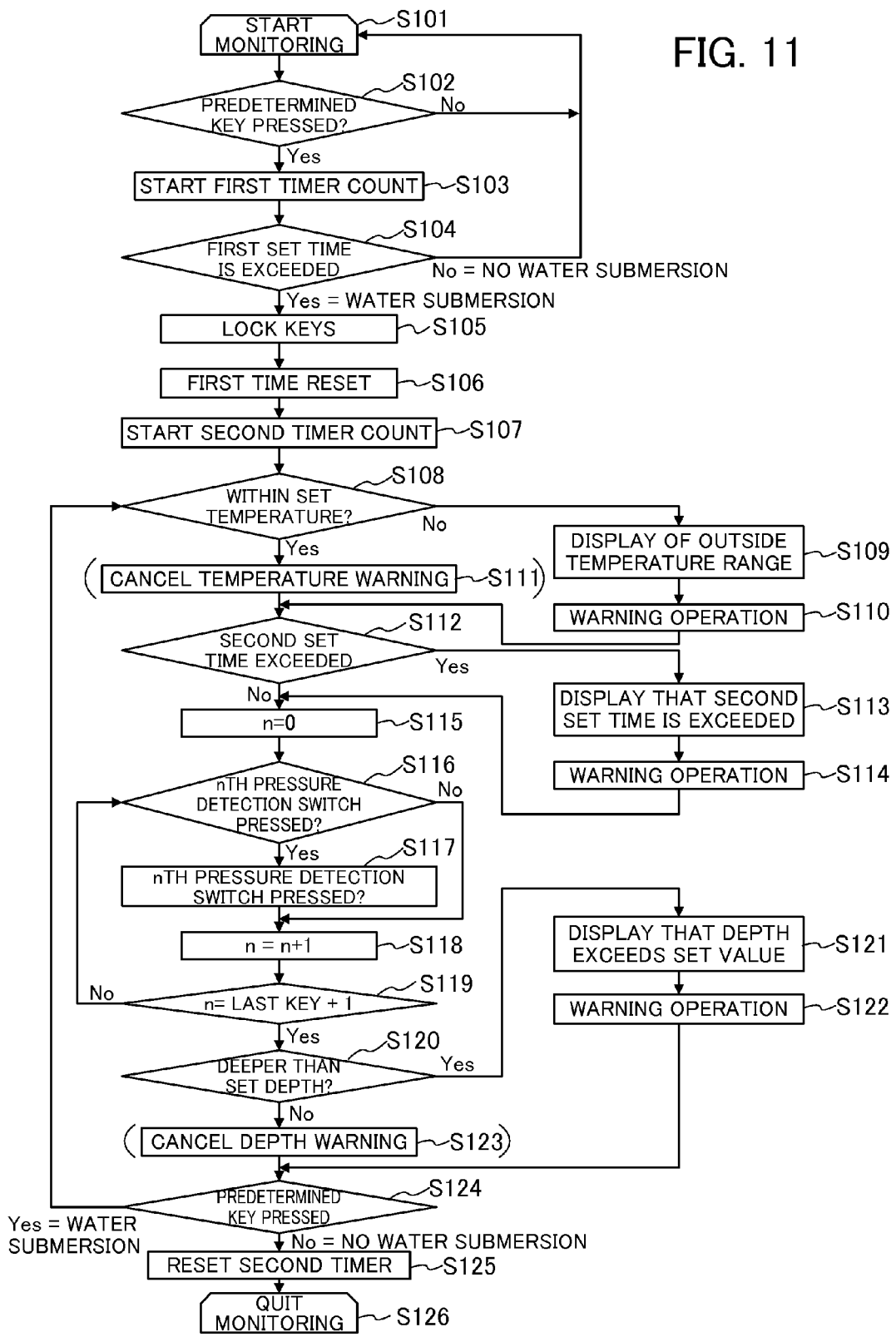
FIG. 11 is a flowchart to explain operation of the cellular telephone according to the second embodiment.

The following will now explain operations of the cellular telephone 1 of the second embodiment with reference to the flowchart shown in FIG. 11.

At step S101, the control unit 203 starts monitoring water submersion. The control unit 203 intermittently monitors water submersion when in standby to receive data, and intermittently or continually at any time monitors water submersion.

At step S102, the control unit 203 detects that a key has been pressed (pressing pressure). If the control unit 203 detects that all of the key switches A (or a specific plurality of key switches A) have been pressed simultaneously, or detects that one specific key switch A has been pressed, it starts driving a first timer to count key switch A pressing time, and advances to step S103. Also, if the control unit 103 detects that not all of the key switches A (or a specific plurality of key switches A) have been pressed simultaneously, or that one specific key switch A has not been pressed, it returns to step S101.

At step S103, the control unit 203 starts driving the first timer that counts key switch A pressing time, after it detected the pressing of the predetermined key switch A in the process of step S102.

At step S104, the control unit 203 references the first timer driven in the process of step S103, and measures key switch A pressing time to determine whether a first set time that is preset was exceeded. If it is determined that the first set time is exceeded (Yes), it detects submersion in water and advances to step S105. If it is determined that the first set time is not exceeded (No), it returns to step S101.

At step S105, when the control unit 203 detected submersion in water, it controls a key lock to prevent erroneous operation of keys pressed by water pressure.

At step S106, the control unit 203 resets the first timer driven in the process of step S103.

At step S107, the control unit 203 starts driving a second timer that counts the time of submersion in water after it detects submersion in water in the process of step S105.

At step S108, the control unit 203 detects the temperature of the water measured by the temperature sensor to determine whether the temperature is within the preset temperature range. If the temperature is outside of the set temperature range (No), it advances to step S109; if the temperature is within the set temperature range (Yes), it advances to step S111 or step S112.

At step S109, the control unit 203 displays that the temperature is outside of the set temperature range.

At step S110, the control unit 203 implements the warning operation. Later, if the temperature returns to within the set temperature range, the control unit 203 cancels the display at step S109 and the warning operation at step S110.

At step S111, if the display at step S109 and the warning operation at step S110 are being executed, and the temperature is confirmed to have returned to within the set temperature range, the control unit 203 cancels the display at step S109 and the warning operation at step S110.

At step S112, the control unit 203 references the second timer driven in the process of step S107, and measures the time of submersion in water to determine whether it exceeds the preset second set time. If the second set time is determined to be exceeded (Yes), it advances to step S113, and if the second set time is determined not to be exceeded (No), it advances to step S115.

At step S113, the control unit 203 displays that the second set time was exceeded.

At step S114, the control unit 203 implements the warning operation.

At step S115, the control unit 203 clears to zero (n=0) the counter that counts the number n of the pressed pressure detection switches B.

At step S116, the control unit 203 determines whether pressure detection switches B that correspond to the set nth key, were pressed. If was determined that the pressure detection switches B that correspond to the nth keys were pressed, it advances to step S117; when it was determined that the pressure detection switches B that correspond to the nth keys were not pressed, it advances to step S118. Pressures pressed on each corresponding key are different for the pressure detection switches B. The control unit 203 measures water depth by monitoring the pressed pressure detection switches B.

At step S117, the control unit 203 controls to light the light emitting unit (LED) C that corresponds to the nth key. For example, the control unit 203 lights only the light emitting unit (LED) C that corresponds to the "1" key when only the pressure detection switch B that corresponds to the "1" key has been pressed.

At step S118, the control unit 203 increments by one (n=n+1) the pressed pressure detection switch B number n.

At step S119, the control unit 203 determines whether the pressed pressure detection switch B number n has reached a prescribed number (key number+1). If it is determined that the prescribed number has been reached (Yes), it advances to step S120, and if it is determined that the prescribed number has not been reached, it returns to step S116.

At step S120, the control unit 203 determines whether the water depth is deeper than the set water depth. If it is determined that the water depth is deeper than the set water depth (Yes), it advances to step S121, and if it is determined not to be deeper than the set water depth (No), it advances to step S123 or step S124.

At step S121, the control unit 203 displays that the water depth is deeper than the set water depth.

At step S122, the control unit 203 implements the warning operation. If the water depth returns to within the set depth range, the control unit 203 cancels the display at step S121 and the warning operation at step S122.

At step S123, if the display at step S121, and the warning operation at step S122 are being executed, and the depth has been confirmed to have returned to the set water depth, the control unit 203 cancels the display at step S121 and the warning operation at step S122.

At step S124, the control unit 203 implements key pressing detection. If the control unit 203 detects that all of the key switches A (or a specific plurality of key switches A) have been pressed simultaneously, or that one specific key switch A has been pressed, it continues to detect submersion in water, and returns to step S108. Also, if the control unit 203 detects that not all of the key switches A (or a specific plurality of key switches A) have been pressed simultaneously, or that one specific key switch A has not been pressed, it returns to step S125.

At step S125, the control unit 203 resets the second timer driven in the process of step S107.

At step S126, the control unit 203 quits monitoring submersion in water.

The following will now explain a third embodiment of the present invention.

The cellular telephone 1 of the third embodiment has a function for detecting water pressure as a load. This cellular telephone 1 restrains erroneous operations that can occur by the operation unit 11 being pressed by water pressure underwater. A configuration and operations using this function of the cellular telephone 1 will now be explained in detail below.

Figure 12:
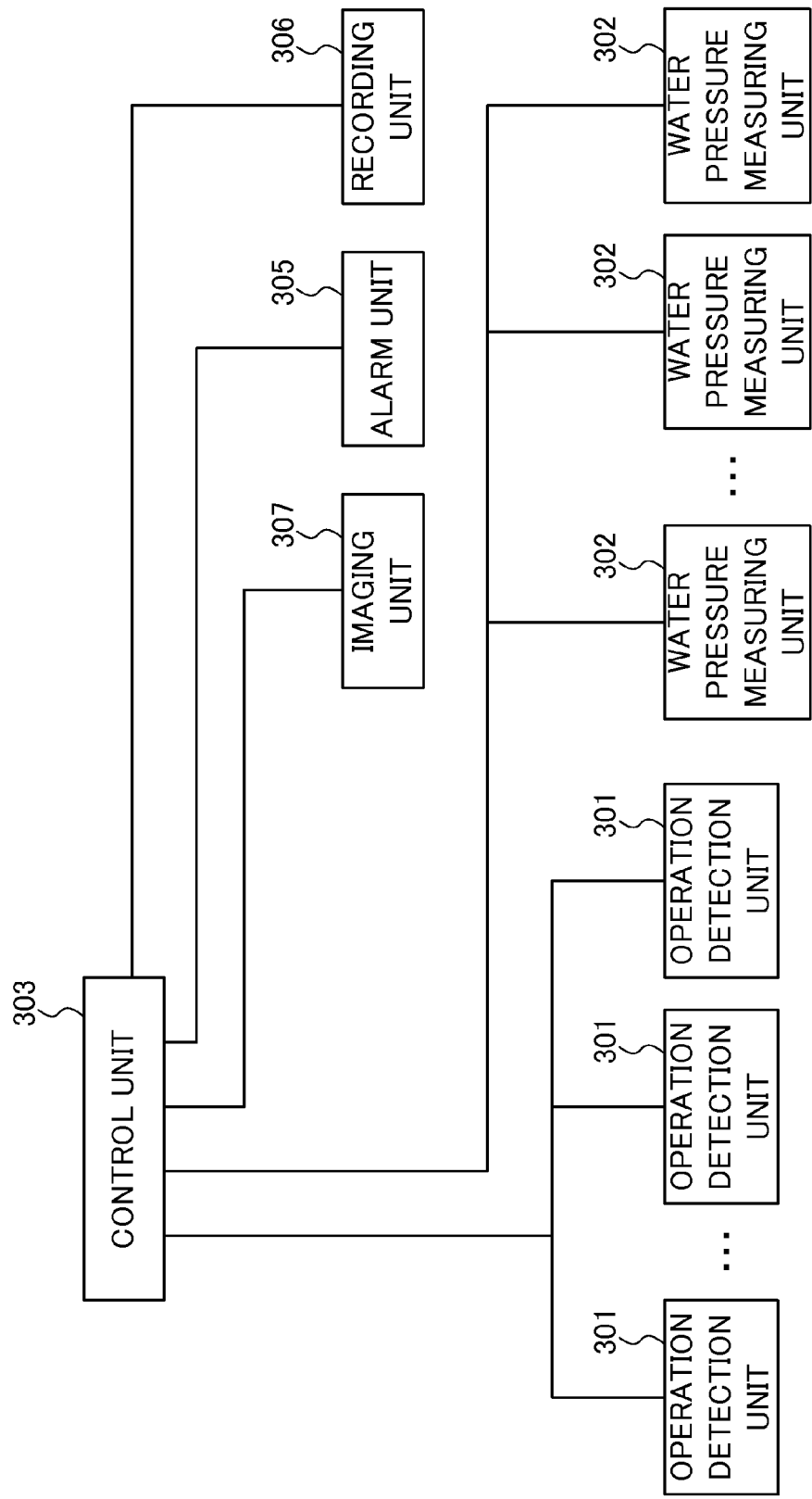
FIG. 12 is a block diagram of a configuration that achieves a diver function of the cellular telephone according to a third embodiment.

As shown in FIG. 12, the cellular telephone 1 of the third embodiment is equipped with a plurality of operation detection units 301, a plurality of water pressure measuring units 302 and a control unit 303. The plurality of operation detection units 301 detects a pressing operation on the operation unit 11. The plurality of water pressure measuring units 302 measure water pressure applied on the cellular telephone 1. The control unit 303 implements a predetermined operation control (for example, a control for conversations, control for sending and receiving mail messages, and control for capturing images using the camera) when a pressing operation is detected by at least one of the plurality of operation detection units 301. Furthermore, the control unit 303 restrains control of a predetermined operation (for example, locking a plurality of keys that compose the operation unit 11) when water pressure higher than a predetermined value is measures by at least one of the plurality of water pressure measuring units 302.

Each of the plurality of the operation detection units 301 corresponds to a plurality of key switches A (see FIG. 7) disposed to correspond to each of the plurality of keys that compose the operation unit 11. The plurality of water pressure measuring units 302 corresponds to a plurality of pressure detection switches B (see FIG. 7) disposed adjacent to each of the plurality of key switches A. Furthermore, the control unit 303 corresponds to the CPU 71.

When the cellular telephone 1 is used in a normal situation (such as in a location other than underwater, as when used on land), each of the plurality of keys that compose the operation unit 11 is operated in sequence by a user; the control unit 303 controls a predetermined operation according to key operations.

In contrast, when the cellular telephone 1 is used in a special situation (such as underwater), all of the plurality of keys that compose the operation unit 11 are simultaneously pressed by a predetermined pressure by water pressure that corresponds to water depth. For that reason, keys are pressed regardless of whether the user is not operating the operation unit 11, causing the cellular telephone 1 to operate erroneously.

For that reason, when the water pressure measuring units 302 (pressure detection switches B) measure water pressure higher than a predetermined value (for example, a water pressure value when the cellular telephone 1 is at depth of 5 m) the control unit 303 (CPU 71) determines that the cellular telephone 1 is submerged in water and restrains control of a predetermined operation that is performed when a pressing operation is detected by the operation detection units 301. The control of a predetermined operation is a control that is implemented when pressure other than water pressure is detected. This control (control for conversations, control for sending and receiving mail messages and control for capturing images using the camera) relates to normal cellular telephone usage.

In this way, with the cellular telephone 1, when the cellular telephone 1 is determined to be submerged in water, the control unit 303 restrains control of a predetermined operation that is performed when a pressing operation is detected by the operation detection units 301, so it is possible to restrain erroneous operations of the cellular telephone 1 when it is underwater.

With this embodiment of the present invention, it was explained that the plurality of operation detection units 301 correspond to the plurality of key switches A. However, the present invention is not to be construed to be limited thereto. It is also acceptable to adopt another configuration as long as it is possible to detect the pressing operation on the operation unit 11. Furthermore, it was explained that the plurality of water pressure measuring units 302 correspond to the plurality of pressure detection switches B. However, the present invention is not to be construed to be limited thereto. It is acceptable to adopt another configuration as long as it is possible to measure water pressure.

It is also acceptable to have one operation detection unit 301 and one water pressure measuring unit 302.

Also, it is also acceptable to configure the operation detection units 301 to detect the pressing operation by a pressing operation being performed by a pressure of a value higher than a predetermined value.

If the cellular telephone 1 has this kind of configuration, the control unit 303 judges that the cellular telephone 1 is submerged in water before it has reached a water depth where the operation detection units 301 (key switches A) are pressed by water pressure. Therefore, it is possible to restrain control of a predetermined operation (for example, applying a key lock) before the operation detection units 301 are pressed by water pressure, further strengthening restraining of erroneous operations of the cellular telephone 1.

It is acceptable to set a water pressure value (the predetermined value) that is the standard for determining whether the cellular telephone 1 is submerged in water to be lower than a value of a pressure for the operation detection units 301 to detect the pressing operation, or to set the water pressure value (predetermined value) that is the standard for determining the cellular telephone 1 is submerged in water to a value that is the same as the value of pressure for the operation detection units 301 to detect the pressing operation.

Also, as shown in FIG. 12, it is acceptable to configure the cellular telephone 1 to have an alarm unit 305. With such a configuration, the control unit 303 issues a predetermined alarm using the alarm unit 305 when water pressure higher than a predetermined value is measured by the water pressure measuring units 302.

For example, if pressure higher than a predetermined value is measured by the water pressure measuring units 302, the cellular telephone 1 emits light with the LED or a backlight of the display 21 as the alarm unit 305, or drives the motor 75 as the alarm unit 305.

With such a configuration, the cellular telephone 1 issues the predetermined alarm if water depth beyond a given level is reached, to avoid cellular telephone 1 damage and to improve convenience of the cellular telephone 1. This also improves the possibility of predicting erroneous user operation of the cellular telephone 1.

It is also acceptable to configure the operation detection units 301 to have a first section and a second section.

In such a configuration, when water pressure higher than a predetermined value is measured by the water pressure measuring units 302, the control unit 303 restrains control of a predetermined operation when the first section detects the pressing operation, and permits control of a predetermined operation when the second section detects the pressing operation.

For example, if water pressure higher than a predetermined value is measured by the water pressure measuring units 302, the cellular telephone 1 restrains operation of an application that executes a conversation function and locks a key used by the conversation function. For that reason, even if a key switch A disposed to correspond to the key used by the conversation function, which is the first section, is pressed, the conversation function will not be executed.

Also, in such a case, the cellular telephone 1 permits operation of the application that executes the image capture function and does not lock a key used by the image capture function. For that reason, even if a key switch A disposed to correspond to a key used by the image capture function, which is the second section, is pressed, the image capture function will be executable.

With such a configuration, when underwater, the cellular telephone 1 implements restraining erroneous operations (erroneous operation of the conversation function which is a function that is not used underwater, for example) by the first section, and permits operation by the second section (such as an operation that uses the image capture function which is a function that is used underwater). Therefore, it is possible to execute a predetermined function underwater.

It is acceptable to configure the cellular telephone 1 for the second section to detect the pressing operation when a pressing operation is performed by a pressure of a value higher than the first section.

For example, the cellular telephone 1 sets the pressing detection pressure of key switches A disposed to correspond to the keys used by the image capture function, which is the second section, to be higher than the pressing detection pressure of key switches A disposed to correspond to keys used in the conversation function, which is the first section.

With such a configuration, it will be difficult for the second section (the key switches A used by the image capture function) to be pressed by water pressure when the cellular telephone 1 is underwater. Therefore, there is reduced concern that an erroneous operation will occur by the second section being pressed by water pressure while the cellular telephone 1 is underwater.

Furthermore, as shown in FIG. 12, it is acceptable to configure the cellular telephone 1 to have an imaging unit 307. With such a configuration, when a pressing operation is detected by the second section (a key switch A that corresponds to a key used by the image capture function) in the operation detection units 301, the control unit 303 captures an image using the imaging unit 307 as the predetermined operation.

The imaging unit 307 corresponds to the camera 33 and the light 34.

With such a configuration, it is possible to execute the image capture function by operating the second section whose operation is permitted underwater, so the cellular telephone 1 can capture images underwater.

It is also acceptable to configure the cellular telephone 1 for the control unit 303 to implement a power restraining operation as a predetermined operation when a pressing operation is detected by the first section.

For example, set a key switch A that corresponds to a key used for power control (control to turn the power on or off) in the first section on the cellular telephone 1. This configuration makes it possible to restrain power control even a pressing operation is detected by the first section when a water pressure higher than a predetermined value is measured by the water pressure measuring units 302 on the cellular telephone 1. Therefore, the cellular telephone 1 is able to avoid unintended power control (control to turn the power on or off).

Also, it is acceptable to configure the cellular telephone 1 to have a plurality of operation detection units 301. With such a configuration, the control unit 303 restrains control of a predetermined operation when even pressure is simultaneously detected by the plurality of operation detection units 301.

When the cellular telephone 1 is underwater, it is presumed with a high probability that an even pressure will be detected by the operation detection units 301. For that reason, when even pressure is detected simultaneously by the plurality of operation detection units 301, there is a high possibility that the cellular telephone 1 is underwater, so cellular telephone 1 restrains control of a predetermined operation.

With such a configuration, it is possible to determine whether the cellular telephone 1 is submerged in water, using the operation detection units 301, in addition to determining it is submerged in water, using the water pressure measuring units 302, so detection precision is improved underwater and a restraining effect of erroneous operation is further strengthened.

It is acceptable to configure the cellular telephone 1 to have a housing. With such a configuration, it is acceptable to configure the plurality of operation detection units 301 to have a third section disposed on the first surface of a housing, and a fourth section disposed on the second surface of a housing.

If the plurality of operation detection units 301 is disposed on one surface, for example if all of the plurality of operation detection units 301 are composed by the side keys 30, there could be instances where even pressure is simultaneously applied to the side keys 30 such as when the cellular telephone 1 is held in a pocket and the like and erroneously restrains control of a predetermined operation.

For that reason, with the cellular telephone 1, the plurality of operation detection units 301 is composed of key switches A as the third section disposed to correspond to the operation unit 11 disposed on a surface of the front panel 2*a* as the first surface of the operation-unit side housing unit 2, which is a housing, and key switches, not shown, as the section unit disposed to correspond to the side key 30 disposed on a side surface as the second surface of the operation-unit side housing unit 2.

With such a configuration, the third and the fourth sections are disposed on different surfaces of the housing, so the possibility of erroneously restraining control of a predetermined operation is reduced.

Furthermore, as shown in FIG. 12, it is acceptable to configure the cellular telephone 1 to have a recording unit 306. With such a configuration, when water pressure higher than a predetermined value is measured by the water pressure measuring units 302, the control unit 303 records that measurement in the recording unit 306.

For example, if the cellular telephone 1 specification guarantees use in water up to 10 meters deep, the predetermined value is set at 10 meters. In such a case, if water pressure is detected to exceed 10 m, that usage that is outside of the specifications is recorded in the recording unit 306. For that reason, it is possible to determine whether the cellular telephone 1 has experienced a normal malfunction or a malfunction caused by being used outside of normal specifications by referencing data saved in the recording unit 306, and can lead to finding the cause of the malfunction.

<Water Submersion Detection Method>

Here, a method for detecting when the cellular telephone 1 of a third embodiment is submerged in water will now be explained. As described above, with an ordinary cellular telephone, all keys are pressed by water pressure at a water depth of 2 (m). For that reason, with the third embodiment, at least one of the plurality of pressure detection switches B is set to be pressed by water pressure at a water depth of less than 2 m. With this configuration, the control unit 303 restrains control of the predetermined operation even if the key is pressed by water pressure at a water depth of 2 m.

In this way, the cellular telephone 1 restrains erroneous operations underwater. Also, it is possible to reliably detect the state of being submerged in water without the mechanism that detects submersion in water becoming wet directly by water.

It is acceptable to set the value of pressure at which the pressure detection switches B detect pressing to be lower than a value of pressure at which key switches A detect the pressing operation, or to set the value of pressure at which pressure detection switches B detect pressing to the same value as the value of pressure at which key switches A detect the pressing operation.

In this way, the cellular telephone 1 of the third embodiment determines submersion in water when a predetermined pressure detection switch B (for example, a pressure detection switch B that detects the smallest pressure) of the plurality of pressure detection switches B detects pressing by water pressure.

The cellular telephone 1 implements a key lock to restrain erroneous input of keys by water pressure after submersion in water has been detected.

Also, it is acceptable to configure the cellular telephone 1 to allow operation of only specific keys when the user wants to use a predetermined function (such as the underwater camera function) after being submerged in water.

<Water Depth Detection Method>

A method for detecting water depth with the cellular telephone 1 of the third embodiment will now be explained. As shown in FIG. 7, the cellular telephone 1 is configured such as the pressure detection switches B are disposed to correspond to each of the keys of the operation unit 11, the plurality of the pressure detection switches B and the thickness of the key sheet 40 rubber are set to a proper combination; and individual pressure detection switches B are pressed sequentially according to the depth of water. With this configuration, the control unit 303 detects water depth according to the pressed pressure detection switches B.

Key switches A are disposed that have different detection pressures for each of the plurality of keys of the operation unit 11. It is acceptable to set the key switches A and key sheet 40 rubber thickness to a proper combination so that each key is pressed sequentially according to each degree of water depth. Specifically, it is acceptable for the key switches A to have the functionality of the water pressure measuring units 302.

<Operation Method>

Figure 13:
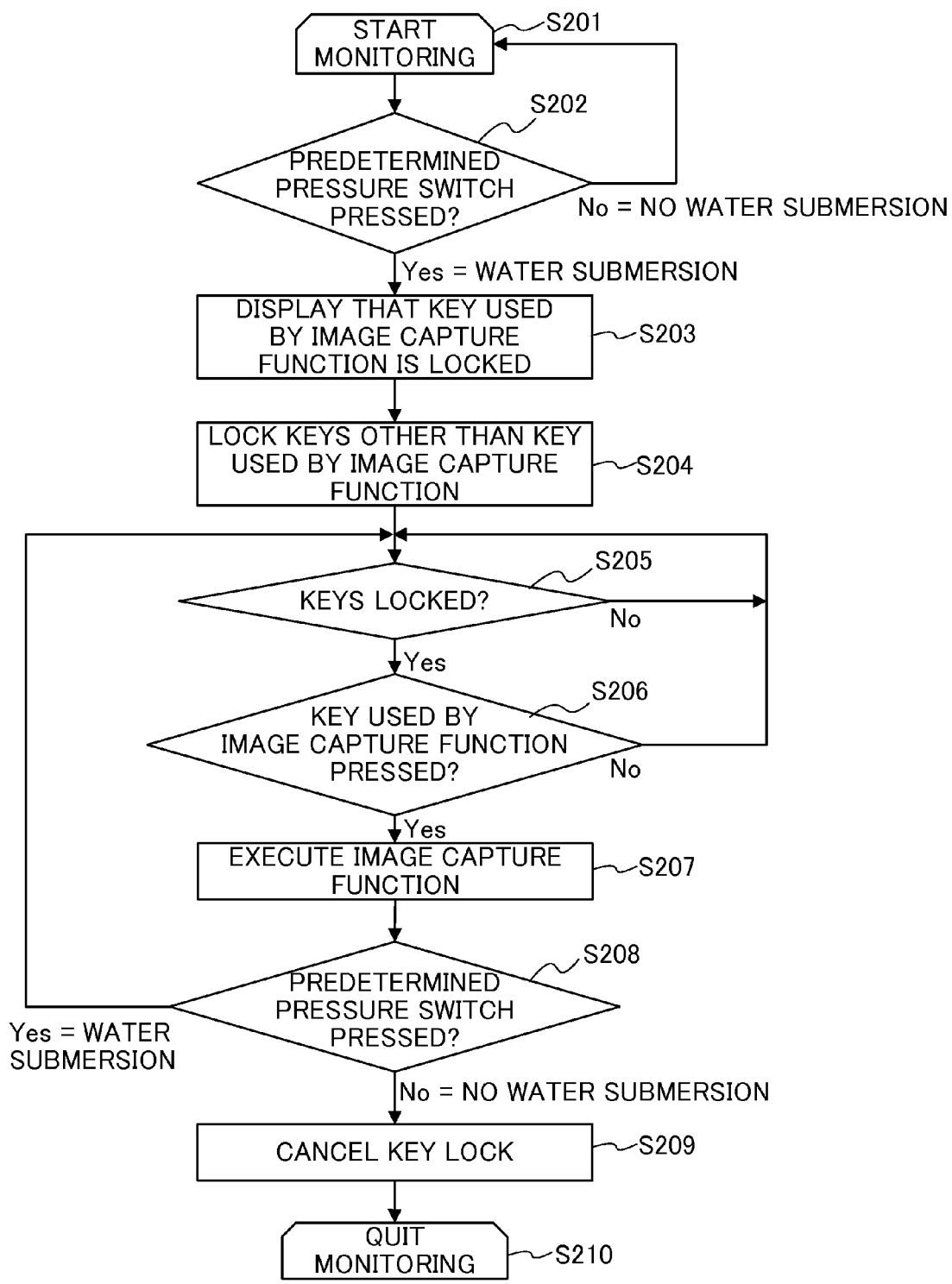
FIG. 13 is a flowchart to explain operation of the cellular telephone according to the third embodiment.

The following will now explain operations of the cellular telephone 1 with reference to the flowchart shown in FIG. 13.

At step S201, the control unit 303 starts monitoring water submersion. The control unit 303 intermittently monitors water submersion when in standby to receive data, and intermittently or continually at any time monitors water submersion.

At step S202, the control unit 303 implements pressing detection of the pressure detection switches B. When the control unit 303 detected that a predetermined pressure detection switch B that detects a preset, predetermined pressure has been pressed, it detects submersion in water, and advances to step S203. Also, if it detected that the predetermined pressure detection switch B is not pressed, it returns to step S201.

At step S203, the control unit 303 displays that a key is locked, excluding a key used to execute the image capture function.

At step S204, when the control unit 303 detected submersion in water, it controls a key lock (for example, a key used to control power), excluding a key used to execute the image capture function, to prevent erroneous operation caused by water pressure pressing a key.

At step S205, the control unit 303 implements key pressing detection. When the control unit 303 detected that a key is pressed, it advances to step S206. Also, if it is detected that a key has not been pressed, it returns to step S205 again.

At step S206, the control unit 303 determines whether the pressed key is the key used to execute the image capture function. If the pressed key is the key used to execute the image capture function (Yes), it advances to step S207; if the pressed key is a different key to the key used to execute the image capture function (No), it returns to step S205.

At step S207, the control unit 303 starts the image capture function. Then, when the key used to execute the image capture function is pressed, the image capturing unit 307 captures an image.

At step S208, the control unit 303 implements pressing detection of the pressure detection switches B. When the control unit 303 detected that predetermined pressure detection switches B that detect a preset, predetermined pressure have been pressed, it continues detecting submersion in water, and returns to step S205. Also, if it detects that the predetermined pressure detection switches B have not been pressed, it advances to step S209.

At step S209, the control unit 303 cancels the display at step S203, and unlocks a key, excluding the key used to execute the image capture function driven in the process of step S205.

At step S210, the control unit 303 quits monitoring submersion in water.

A cellular telephone with the conventional configuration detected submersion in water by determining whether circuit terminals used for detection formed in a circuit had become wet with water. Conversely, the cellular telephone 1 according to the third embodiment does not require allowing water to enter the circuit, as is the case with the conventional apparatus, which prevents getting the circuit wet with water.

The following will now explain a fourth embodiment of the present invention.

The cellular telephone 1 according to the fourth embodiment has a function for detecting water pressure as a load. This cellular telephone 1 determines a pressing operation of a user on land, and a pressing operation by water pressure underwater to implement a predetermined control that is unique to each operation. A configuration and operations of this function of the cellular telephone 1 will now be explained.

Figure 14:
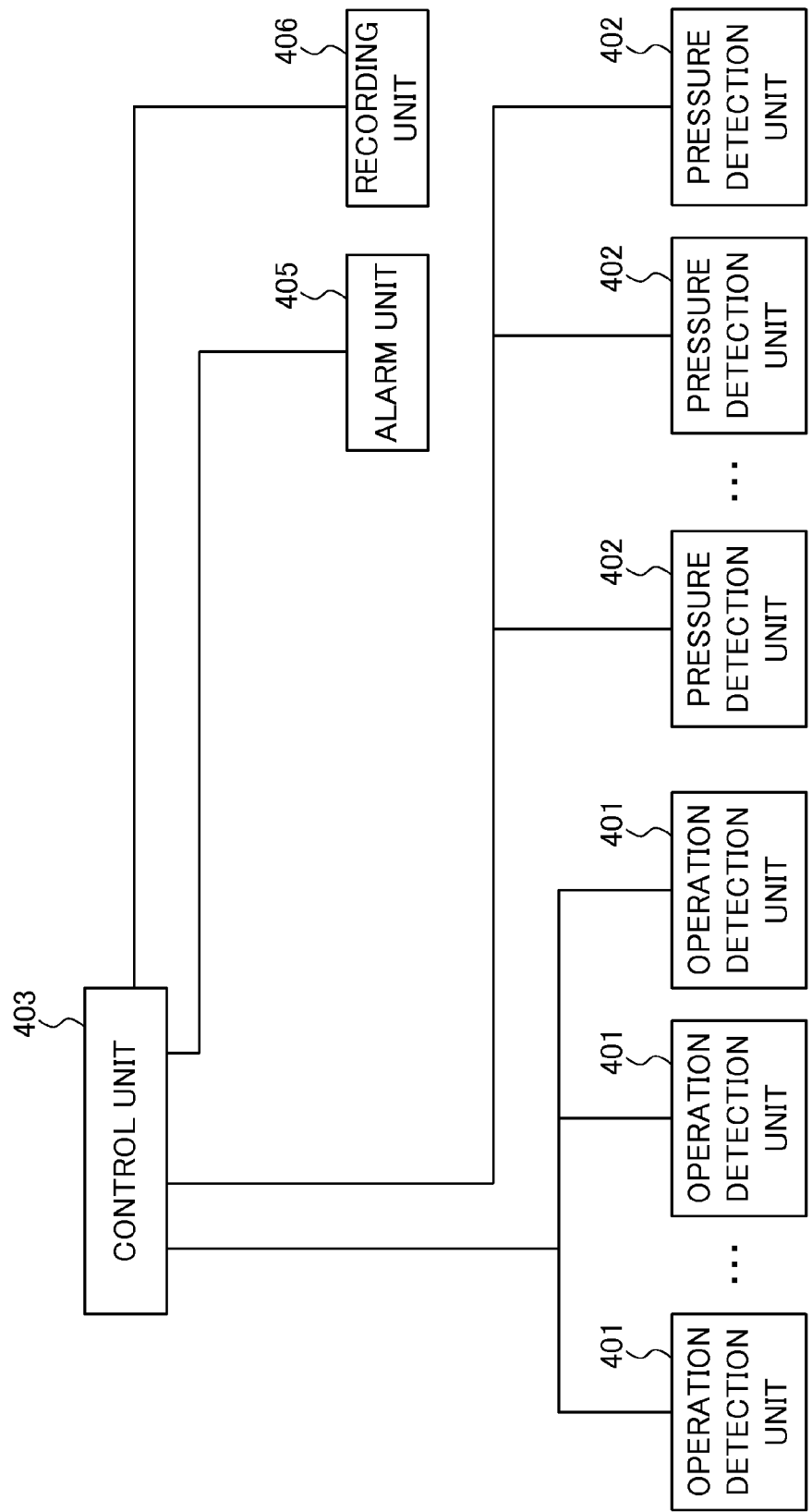
FIG. 14 is a block diagram of a configuration that achieves a diver function of the cellular telephone according to a fourth embodiment.

As shown in FIG. 14, the cellular telephone 1 of the fourth embodiment is equipped with a plurality of operation detection units 401 as a first detection unit, a plurality of pressure detection units 402 as a second detection unit, a control unit 403, an alarm unit 405, and a recording unit 406.

Each of the plurality of the operation detection units 401 corresponds to a plurality of key switches A (see FIG. 7) disposed to correspond to each of the plurality of keys that compose the operation unit 11, to detect the pressed state of the operation unit 11. Each of the plurality of the pressure detection units 402 is equivalent to the plurality of pressure detection switches B (see FIG. 7) that correspond to operation unit 11, disposed adjacent to each of the plurality of key switches A, to detect the pressing force when the operation unit 11 is pressed. The pressure detection units 402 are disposed in the operation-unit side housing unit 2 to correspond to the operation unit 11 in this way to detect pressure using the pressing on the operation unit 11 so it is not necessary to provide separate means for detecting water pressure which favorably reduces costs.

The control unit 403 corresponds to the CPU 71. The control unit 403 implements a first control (for example, control implemented when a pressing operation by a user is detected on land) when pressure is detected by at least one of the plurality of operation detection units 401. The control unit 403 implements a second control that is different from the first control when pressure higher than a predetermined value is detected by at least one of the plurality of pressure detection units 402.

The first control is a control implemented when a pressure other than water pressure is detected. This control relates to normal cellular telephone usage, such as control for conversations, control for sending and receiving mail messages, or control for capturing images using the camera and the like. The second control is a control implemented according to detected water pressure. For example, this control relates to special usages, such as control for an alarm for a detected water pressure, control for emitting light such as for the LED as a warning, or control to turn the power off and the like.

When the cellular telephone 1 is used in a normal situation (such as in a location other than underwater, as when used on land), each of the plurality of keys that compose the operation unit 11 is operated in sequence by a user; the control unit 403 implements the first control according to key operation.

Conversely, when the cellular telephone 1 is used in a special situation (such as underwater), all of the plurality of keys that compose the operation unit 11 are simultaneously pressed by water pressure that corresponds to water depth with a predetermined pressure. Specifically, keys are pressed on the operation unit 11 despite a user not operating the operation unit 11 (the pressure detection units 402 are configured to detect this pressing force).

Therefore, the control unit 403 determines whether the plurality of operation detection units 401 (all keys, a predetermined number of keys, or a predetermined position thereof) has been pressed simultaneously; if it determines that they have been pressed simultaneously, it determines that the cellular telephone is being used in a special manner (underwater) and suppresses the first control implemented when the pressing operation is detected by the operation detection units 401. Specifically, it is acceptable to have a control that locks the plurality of keys that compose the operation unit 11. It is also acceptable to have a control that restrains execution of a function that is difficult to use underwater (particularly, a function that involves emitting audio (excluding when using a headphone), because sound is not communicated easily under water). This suppresses wasteful power consumption and conserves power. Conversely, if it is determined that the plurality of operation detection units 401 is not being pressed simultaneously, it is determined that the cellular telephone 1 is being used normally and implements the first control. As a method for determining whether the cellular telephone is underwater, it is acceptable to adopt another method (for example, means for detecting water directly, or means for detecting being underwater based on the short-circuit status between a plurality of terminals).

In this way, the cellular telephone 1 easily determines whether the pressing detected by the operation detection units 401 was a user operation or was caused by water pressure, so this reduces the number of components, and makes it possible to implement a proper control according to the status of the cellular telephone, and further improves convenience.

Furthermore, with the cellular telephone 1, the control unit 403 restrains the first control implemented when a pressing operation is detected by the operation detection units 401, when it detects that the cellular telephone 1 is submerged in water, and implements the second control, so the proper control is implemented that corresponds to the status of the cellular telephone (whether it is on land or underwater) and convenience is improved.

Also, the control unit 403 is configured to vary the second control according to the degree of pressure detected by the operation detection units 401.

For example, if the pressure detected by the plurality of pressure detection units 402 is below a given threshold value (a weak pressure), the control unit 403 controls to emit light such as an LED; if the pressure is above a given threshold value (a strong pressure), the control unit 403 controls to vibrate the cellular telephone 1 using a motor 75 in addition to controls to emit light such as the LED. By implementing such a control, it is possible to properly notify the user of changes in the water pressure, and to avoid damaging the cellular telephone 1.

Also, for example, if pressure detected by the plurality of pressure detection units 402 is below a given threshold value (a weak pressure), the control unit 403 shifts to a sleep mode by controlling the power circuit. If the pressure is higher than a given threshold value (a strong pressure), the control unit 403 controls the power circuit to turn off the power. By implementing such a control, it is possible to avoid damaging the cellular telephone 1 that can occur by changes in water pressure, and to conserve power.

In this way, it is thought that pressure detected by the plurality of pressure detection units 402 increases in proportion to water depth. For that reason, by varying the second control according to pressure, it is possible to further improve convenience of the cellular telephone 1 underwater.

The control unit 403 implements a water depth alarm as the second control. Specifically, when pressure is detected by the pressure detection units 402, the control unit 403 deduces water depth based on the detected pressure and the first information (an association of force and water depth) recorded in the recording unit 406 and implements the second control to inform the result of the deduced water depth using the alarm unit 405.

At this time, the alarm unit 405 corresponds to the light emitting unit C (LED), display 21 and the motor 75 to inform water depth deduced by the control unit 403 with a predetermined format (for example lighting an LED or backlight of the display 21, or driving the motor 75). Also, the recording unit 406 corresponds to the memory 72 and records the first information that associates the force of pressing caused by water pressure and water depth.

As described above, in the cellular telephone 1, a plurality of pressure detection units 402 (pressure detection switches B in FIG. 7) that detects different pressures of each is disposed adjacent to each of the plurality of operation detection units 401. Also, the plurality of pressure detection units 402 detects pressure sequentially from pressure detection units 402 with low detected pressures corresponding to water depth.

In other words, the control unit 403 monitors whether pressure is detected by any of the pressure detection units 402, and detects the highest detected pressure of that detected sequentially from the lowest detected pressure, as the water pressure at that point. Also, the control unit 403 references the association of water pressure recorded in the recording unit 406 and water depth to determine water depth.

Next, the control unit 403 references the association of the water depth recorded in the recording unit 406 and each key of the operation unit 11 (numerical keypad) to control to emit light of the light emitting unit C (LED) that radiates light on the key associated with that water depth.

In this way, the number of pressure detection units 402 that detect pressure is thought to increases in proportion to water depth. Therefore, by informing the user of water depth using an LED that corresponds to the detected pressure, it is possible to avoid cellular telephone 1 damage and to improve the convenience of the cellular telephone 1 underwater.

In this embodiment of the present invention, it was explained that the plurality of operation detection units 401 corresponds to the plurality of key switches A. However, the present invention is not to be construed to be limited thereto. It is also acceptable to adopt another configuration as long as it is possible to detect the pressing operation on the operation unit 11. Also, it was explained that the plurality of pressure detection units 402 correspond to the plurality of pressure detection switches B. However, the present invention is not to be construed to be limited thereto. It is acceptable to adopt another configuration as long as it is possible to detect water pressure. It is also acceptable to have one operation detection unit 401 and one pressure detection unit 402.

Also, it is acceptable to configure the control unit 403 to restrain the first control and to implement the second control when the pressing operation is detected simultaneously by the plurality of operation detection units 401 longer than a predetermined amount of time.

When the cellular telephone 1 is underwater, it is presumed with a high probability that the operation detection units 401 simultaneously detect the pressing operation longer than a predetermined amount of time. Therefore, even the plurality of operation detection units 401 is simultaneously pressed, if the pressure detection time is not continued for a given amount of time (for example, 10 seconds), the cellular telephone 1 will not implement the second control based on the pressure detection units 402 because there is a low possibility that the cellular telephone is underwater. If the pressure detection time continues for a given amount of time (for example, 10 second), there is a high possibility that the cellular telephone is underwater, so the first control is restrained and the second control is implemented.

Therefore, even if the plurality of operation detection units 401 simultaneously detected a pressing operation by accident, the possibility that the first control will be restrained and the second control will be erroneously implemented is reduced, and convenience is improved.

Also, it is acceptable to configure the control unit 403 to vary the second control according to the length of submersion time in water that is detected.

For example, if the time that pressing is simultaneously detected by the plurality of operation detection units 401 is one minute, the control unit 403 controls to emit light such as an LED as a second control; if the time is 10 minutes, the control unit 403 controls to vibrate using the motor 75 in addition to controlling to emit light such as the LED as a second control. By implementing such a control, it is possible to properly notify the user of the status underwater, and to favorably avoid cellular telephone 1 damage.

Also, for example, if the time that pressing is simultaneously detected by the operation detection units 403 is one minute, the control unit 403 shifts to a sleep mode by controlling the power circuit; if the time is 10 minutes, it controls the power circuit to turn off the power. By implementing such a control, it is possible to avoid cellular telephone 1 damage that occurs by changes in the status underwater, and to conserve power.

In this way, the time that pressing is simultaneously detected by the plurality of operation detection units 401 can be considered to be the time that the cellular telephone 1 is underwater. For that reason, it is possible to further improve convenience underwater by varying the second control according to detection time.

Also, when pressure higher than a predetermined value is detected by the pressure detection units 402, the control unit 403 records that detection in the recording unit 406. For example, if the cellular telephone 1 specification guarantees use in water up to 10 meters deep, the predetermined value is set at 10 meters. In such a case, if water pressure is detected to exceed 10 m, that usage that is outside of the specifications is recorded in the recording unit 406. For that reason, it is possible to determine whether the cellular telephone 1 has experienced a normal malfunction or a malfunction caused by being used outside of the normal specifications by referencing data saved in the recording unit 406, and can be a lead to finding the cause of the malfunction.

<Water Submersion Detection Method>

Here, a method for detecting when the cellular telephone 1 of the fourth embodiment is submerged in water will now be explained.

With the fourth embodiment, not all keys are pressed for operation under normal usage, so the control unit 403 determines that a state in which all keys have been pressed simultaneously is a state in which the cellular telephone is submerged in water. Furthermore, the control unit 403 can also determine the state where a plurality of keys being pressed simultaneously that are normally not pressed simultaneously as the state where the apparatus is submerged in water. In this way, the cellular telephone 1 accurately detects the state of the apparatus being submerged in water without a mechanism to detect the submersion in water direct touching water.

In this way, the cellular telephone 1 restrains erroneous operations by the first control underwater, and implements the second control that is specialized for use underwater. Also, it is possible reliably to detect the submerged state without the mechanism that detects the submersion in water becoming wet directly with water.

If the pressure detection switches B are disposed in positions that can only be pressed by water pressure (for example, as shown in FIG. 7, between each key that composes the operation unit 11), the control unit 403 can determine that the cellular telephone 1 is submerged in water when the pressure detection switches B detect water pressure higher than a predetermined value (for example, water pressure value when the cellular telephone 1 is at a water depth of 5 m).

At that time, at least one of the plurality of pressure detection switches B is set to be pressed by water pressure at a water depth less than 2 m. With this, the control unit 403 restrains the first control and implements the second control before a key is pressed by water pressure at a depth of 2 m.

In this way, the cellular telephone 1 of the fourth embodiment determines that it is submerged in water when all key switches A or a plurality of key switches A that correspond to a determined plurality of keys are detected simultaneously to be pressed by water pressure. In other words, the plurality of key switches A have the functionality of water immersion detection switches.

The cellular telephone 1 implements a key lock to restrain erroneous input of a key by water pressure, after it has been determined to be submerged in water. Also, it is acceptable to configure the cellular telephone 1 to allow the operation of only specific keys when the user wants to use a predetermined function (such as the underwater camera function) after being submerged in water.

<Water Depth Detection Method>

The following will now explain a water depth detection method.

As shown in FIG. 7, the cellular telephone 1, is configured such that pressure detection switches B are disposed to correspond to each of the keys of the operation unit 11, and the plurality of the pressure detection switches B and the key sheet 40 rubber thickness are set to a proper combination, and the pressure detection switches B are pressed sequentially by receiving pressure higher than pressures (a predetermined force) each being different depending on the water depth. With such a configuration, the control unit 403 ascertains the value of the detected pressure according to the pressed pressure detection switches B, so it is possible to detect water depth by associating and referencing that ascertained pressure, and the first information (an association of water pressure and water depth) recorded in the recording unit 406.

With the cellular telephone 1, key switches A and pressure detection switches B are established separately, but the present invention is not to be construed to be limited thereto. For example, it is acceptable to dispose key switches A that have different detection pressures for each of the keys of the operation unit 11, and set the key switches A and key sheet 40 rubber thickness to a proper combination so that each individual key is pressed sequentially according to each water depth. In other words, it is acceptable to configure the key switches A to have the functionality of the pressure detection units 402.

<Operation Method>

Figure 15:
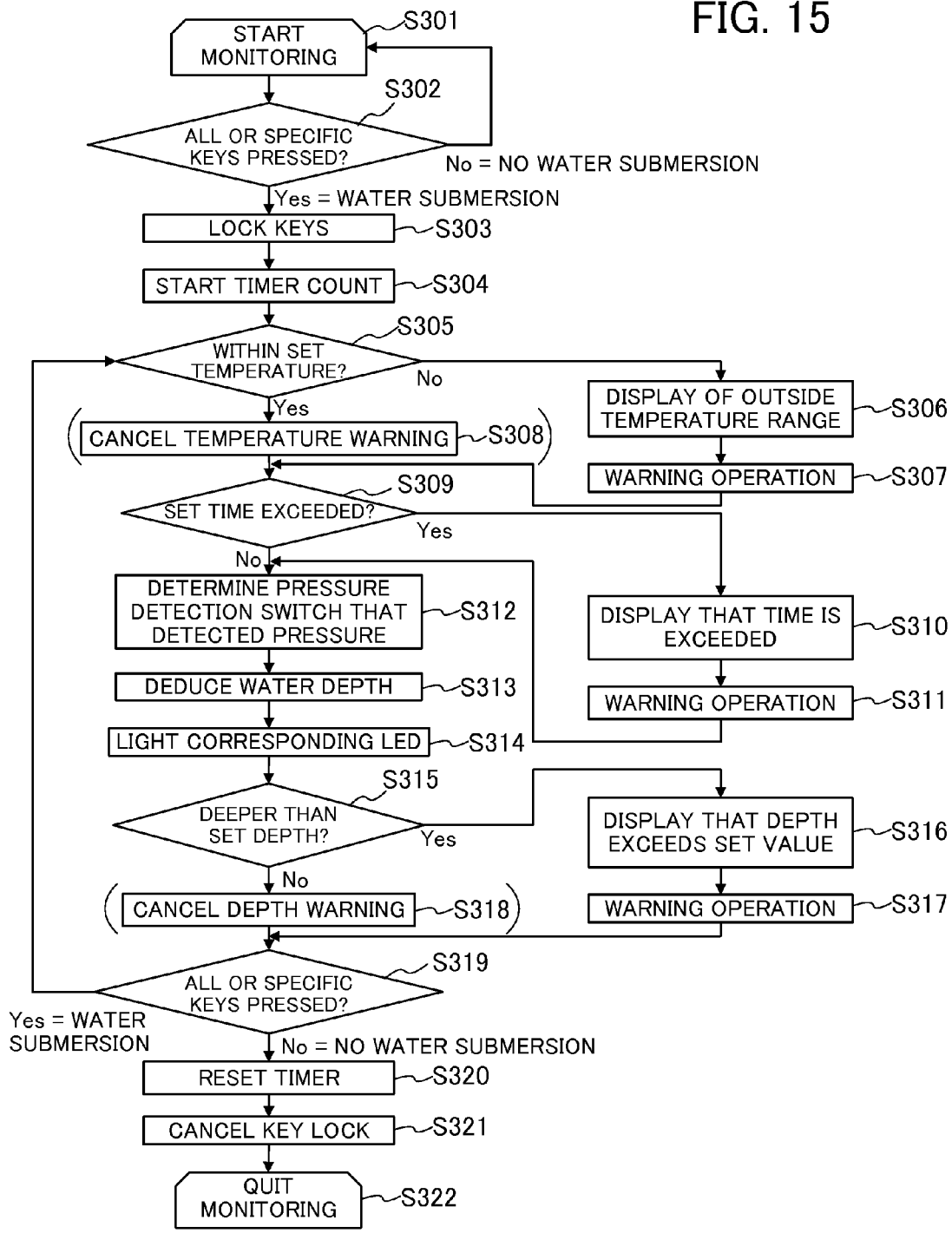
FIG. 15 is a flowchart to explain operation of the cellular telephone according to the fourth embodiment.

The following will now explain the operations of the cellular telephone 1 of the fourth embodiment with reference to the flowchart shown in FIG. 15.

At step S301, the control unit 403 starts monitoring water submersion. The control unit 403 intermittently monitors water submersion when in standby to receive data, and intermittently or continually at any time monitors water submersion. If the main antenna 51 is configured to intermittently receive signals from a base station, not shown, when it is in a standby mode, it is acceptable for the main antenna 51 to monitor water submersion while intermittently receiving data. By doing so, it is possible to monitor water submersion by effectively utilizing the power consumed when receiving signals by the main antenna 51.

At step S302, the control unit 403 implements key pressing (pressing pressure) detection. If the control unit 403 detects that all of the key switches A (or a specific plurality of key switches A) have been pressed simultaneously (Yes), it detects submersion in water, and advances to step S303. Also, if detected that not all of the key switches A (or a specific plurality of key switches A) have been pressed simultaneously (No), it returns to step S301.

At step S303, when the control unit 403 detected submersion in water, it controls a key lock to prevent erroneous key operation caused by water pressure.

At step S304, the control unit 403 starts driving a timer that counts the time the apparatus is submerged in water after it has detected the cellular telephone is submerged in water in the process of step S303.

At step S305, the control unit 403 detects the water temperature measured by a temperature sensor to determine whether it is at the preset temperature. If the temperature is outside of the set temperature range (No), it advances to step S306; if the temperature is within the set temperature range (Yes), it advances to step S308 or step 309.

At step S306, the control unit 403 displays that the temperature is outside of the set temperature range.

At step S307, the control unit 403 implements the warning operation. Thereafter, if the temperature returns to within the set temperature range, the control unit 403 cancels the display at step S306 and the warning operation at step S307.

At step S308, if the display at step S306 and the warning operation at step S307 are being executed and the temperature has been confirmed to have returned to the set temperature range, the control unit 403 cancels the display at step S306 and the warning operation at step S307.

At step S309, the control unit 403 references the timer driven in the process of step S304, measures the submersion time in water, and determines whether that time has exceeded the preset time. If is determined that the set time has been exceeded (Yes), it advances to step S310, and if it is determined that the set time is not exceeded (No), it advances to step S312.

At step S310, the control unit 403 displays that the set time has been exceeded.

At step S311, the control unit 403 implements the warning operation.

At step S312, the control unit 403 determines whether pressing was detected by any of the pressure detection switches B. The pressures detected by the detection switches B are different, so determination results vary according to the depth of water in which the cellular telephone 1 is submerged.

At step S313, the control unit 403 determines the pressure pressing the operation unit 11 based on the determination results in the process of step S312. Also, the control unit 403 references the association of pressure and water depth recorded in the recording unit 406 to deduce the depth of water in which the cellular telephone 1 is submerged.

At step S314, the control unit 403 references the association of water depth and each key of the operation unit 11 recorded in the recording unit 406, based on the water depth deduced in the process of step S313, to control to light the light emitting unit (LED) C that illuminates the corresponding key.

At step S315, the control unit 403 determines whether the water depth is deeper than the set water depth. If it is determined that the water depth is deeper than the set water depth (Yes), it advances to step 316, and if it is determined not to be deeper than the set water depth (No), it advances to step S318 or step S319.

At step S316, the control unit 403 displays that the water depth is deeper than the set water depth.

At step S317, the control unit 403 implements the warning operation. Thereafter, if the water depth returns to within the set depth range, the control unit 403 cancels the display at step S316 and the warning operation at step S317.

At step S318, if the display at step S316 and the warning operation at step S317 are being executed, and the depth has been confirmed to have returned to the set depth range, the control unit 403 cancels the display at step S316 and the warning operation at step S317.

At step S319, the control unit 403 implements key pressing detection. If the control unit 403 detects that all of the key switches A (or a specific plurality of key switches A) have been pressed simultaneously (Yes), it continues to detect the submersion in water, and returns to step S305. Also, if the control unit 403 detects that all of the key switches A (or a specific plurality of key switches A) are not being pressed simultaneously (No), it advances to step S320.

At step S320, the control unit 403 resets the timer driven in the process of step S304.

At step S321, the control unit 403 cancels the key lock controlled in the process of step S303.

At step S322, the control unit 403 quits monitoring submersion in water.

Also, it is acceptable to configure the cellular telephone 1 to allow the user to set water depth, water temperature, and time ranges in advance, and to include a setting unit that issues a warning when a range has been exceeded.

A cellular telephone of a conventional configuration detected submersion in water by determining whether a circuit terminal used for detection formed in a circuit was wet with water. Conversely, the cellular telephone 1 according to the fourth embodiment detects submersion in water by detecting a pressing state of the keys, as described above; it is not necessary to allow water to enter into the circuit, as is the case with the conventional apparatus, so this prevents the circuit from becoming wet with water.

The following will now explain a fifth embodiment of the present invention.

The cellular telephone 1 of the fifth embodiment has a function that detects water pressure as a load. However, with the cellular telephone 1, it is also possible properly to determine whether the load is caused by water pressure or another pressure (such as human-induced pressure). A configuration and operations of this function of the cellular telephone 1 will now be explained.

Figure 16:
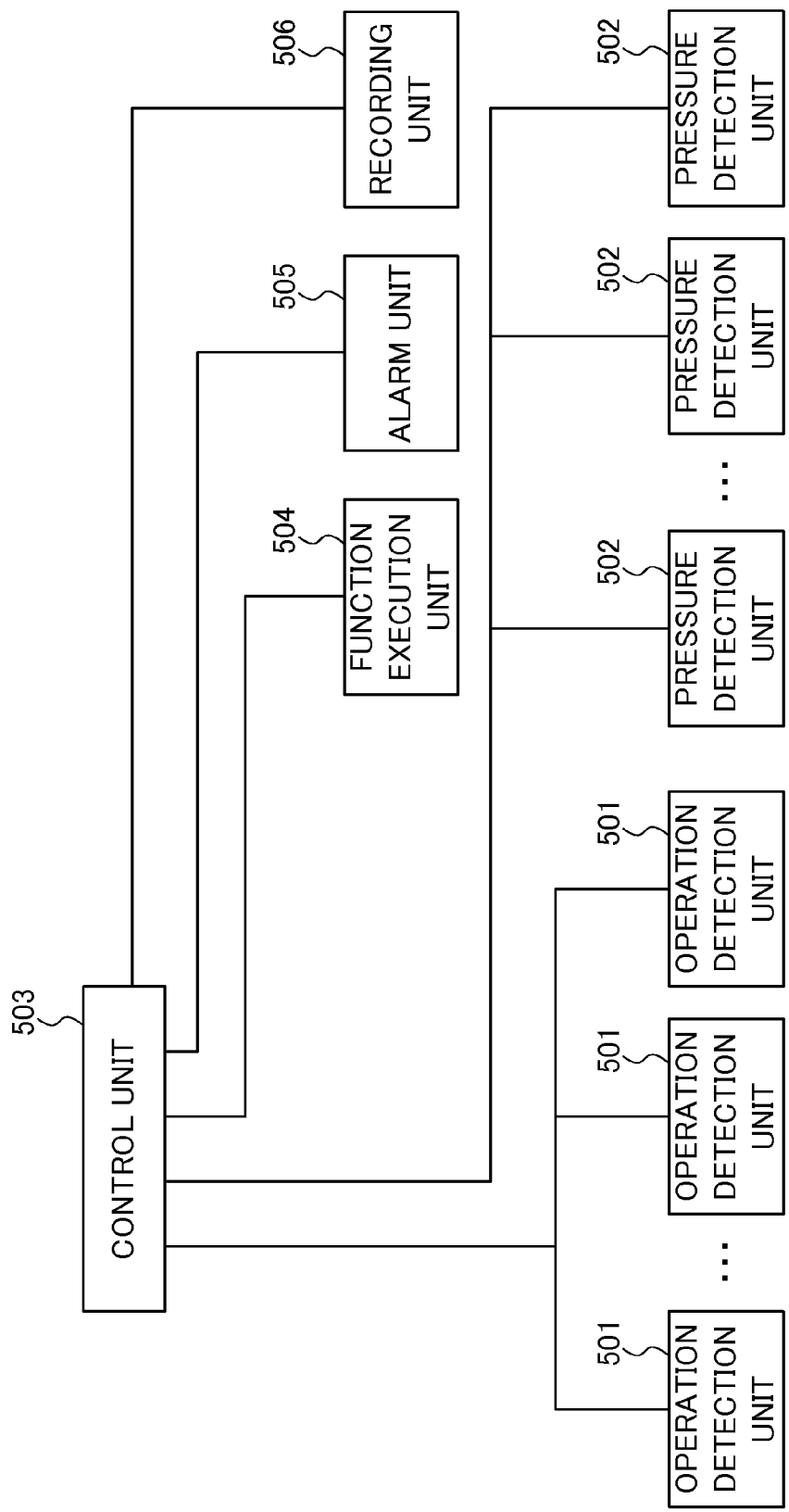
FIG. 16 is a block diagram of a configuration that achieves a diver function of the cellular telephone according to a fifth embodiment.

As shown in FIG. 16, the cellular telephone 1 is equipped with a plurality of operation detection units 501, and a control unit 503. The plurality of operation detection units 501 detects pressure of a pressing operation. The control unit 503 implements a first control (for example, a control implemented by pressure other than water pressure being detected) when pressing is detected by at least one of the plurality of operation detection units 501 when the cellular telephone 1 is in an opened state. The control unit 503 implements a second control (for example, a control implemented by water pressure being detected) that is different from the first control when pressing is detected by at least one of the plurality of operation detection units 501 when the cellular telephone 1 is in a closed state.

Detection of water pressure by the operation detection units 501 and the control unit 503 will now be explained. Each of the plurality of the operation detection units 501 corresponds to a plurality of key switches A (see FIG. 7) disposed to correspond to each of the plurality of keys that compose the operation unit 11; the control unit 503 corresponds to the CPU 71.

Normally, the plurality of keys that compose the operation unit 11 is operated when the folding-type cellular telephone 1 is in an opened state, and is not pressed when the cellular telephone 1 is in a closed state.

Conversely, if the cellular telephone 1 is used underwater, the plurality of keys that compose the operation unit 11 is pressed by water pressure even when the cellular telephone 1 is in a closed state. In other words, when underwater, even if the cellular telephone 1 is in a closed state, water enters the surface of the operation unit 11 from the gap that communicates with the outside, formed between the operation-unit side housing unit 2 and the display-unit side housing unit 3, so the operation unit 11 is pressed by water pressure that corresponds to the water depth.

Therefore, the control unit 503 (CPU 71) determines whether the plurality of operation detection units 501 (plurality of key switches A) is pressed with the cellular telephone 1 in an opened state or in a closed state. If it is determined that the cellular telephone 1 is in an opened state, it determines that usage is normal and implements the first control. Also, if the control unit 503 determines that the cellular telephone 1 was pressed in a closed state, it determines that the cellular telephone 1 is underwater and implements the second control.

The first control is a control implemented when pressure other than water pressure is detected. This control (control for conversations, and control for sending and receiving mail messages) relates to normal cellular telephone usage. The second control is a control implemented when water pressure is detected. This control (control for emitting light such as for the LED as a warning, or to turn the power off and the like) relates to special cellular telephone usage.

In this way, the cellular telephone 1 easily determines whether the pressure detected by the operation detection units 501 was caused by user operation or by water pressure, so this reduces the number of components, and makes it possible to implement a proper control according to the status of the cellular telephone, and improves convenience.

With this embodiment, it was explained that the plurality of operation detection units 501 corresponds to the plurality of key switches A. However, the present invention is not to be construed to be limited thereto. It is also acceptable to adopt another configuration as long as it is possible to detect water pressure.

It is also acceptable to have one operation detection unit 501.

Also, it is acceptable to have a plurality of operation detection units 501, and for the control unit 503 to implement the second control when an even pressure is simultaneously detected by the plurality of operation detection units 501 for a given amount of time.

When the cellular telephone 1 is used in a special situation (for example, being used underwater), all of the plurality of keys that compose the operation unit 11 are pressed simultaneously by an even pressure by water pressure that corresponds to water depth. Therefore, the cellular telephone 1 implements the second control when the plurality of operation detection units 501 is simultaneously pressed by an even pressure, and implements the first control when it is not pressed. When the cellular telephone 1 is underwater, it is presumed with a high probability that the operation detection units 501 detect an even pressure simultaneously longer than a predetermined amount of time.

Therefore, even if the plurality of operation detection units 501 is simultaneously pressed with a constant pressure, if the pressure detection time is not continued for a given amount of time (for example, 10 seconds), the cellular telephone 1 will not implement the second control because there is a low possibility that the cellular telephone is underwater. If the pressure detection time continues for a given amount of time (for example, 10 seconds), there is a high possibility that the cellular telephone is underwater, so the second control will be implemented.

Therefore, even if the plurality of operation detection units 501 has simultaneously detected an even pressure by accident, when the cellular telephone 1 is closed, the possibility that the cellular telephone 1 will erroneously implement the second control is reduced, and convenience is improved.

Also, it is acceptable to configure the control unit 503 to vary the second control according to a length of time an even pressure is simultaneously detected by the plurality of operation detection units 501.

For example, if the time an even pressure is detected simultaneously by the operation detection units 501 is one minute, the control unit 503 controls to emit light such as an LED as the second control; if the time is 10 minutes, the control unit 503 controls to vibrate the cellular telephone 1 using a motor 75 in addition to controls to emit light such as the LED as the second control. By implementing such a control, it is possible to properly notify the user of the status underwater, and to favorably avoid damaging the cellular telephone 1.

Also, for example, if the time that an even pressure is detected simultaneously by the plurality of operation detection units 501 is one minute, the control unit 503 shifts to a sleep mode by controlling the power circuit; if the time is 10 minutes, it controls the power circuit to turn off the power. By implementing such a control, it is possible to avoid damaging the cellular telephone 1 that can occur by changes in the status underwater, and to conserve power.

In this way, the time that an even pressure is detected simultaneously by the plurality of operation detection units 501 can be considered to be the time that the cellular telephone is underwater, so by varying the second control according to detection time, it is possible to further improve convenience of the cellular telephone 1 underwater.

Also, it is acceptable to configure the control unit 503 to vary the second control according to the degree of pressure detected by the operation detection units 501.

For example, if the pressure detected by the operation detection units 501 is below a given threshold value (a weak pressure), the control unit 503 controls to emit light such as an LED; if the pressure is higher than a given threshold value (a strong pressure), the control unit 503 controls to vibrate the cellular telephone 1 using a motor 75 in addition to controlling to emit light such as the LED. By implementing such a control, it is possible to properly notify the user of changes in the water pressure, and to avoid damaging the cellular telephone 1.

Also, for example, if the pressure detected by the operation detection units 501 is below a given threshold value (a weak pressure), the control unit 503 shifts to a sleep mode by controlling the power circuit; if the pressure is higher than a given threshold value (a strong pressure), the control unit 503 controls the power circuit to turn off the power. By implementing such a control, it is possible to avoid damaging the cellular telephone 1 that can occur by changes in water pressure, and to conserve power.

In this way, the pressure detected by the operation detection units 501 is thought to increase in proportion to water depth, so by varying the second control according to pressure, it is possible to further improve convenience of the cellular telephone 1 underwater.

Also, the cellular telephone is further equipped with a plurality of pressure detection units 502 disposed adjacent to each of the plurality of operation detection units 501 to detect different pressures of each; and it is acceptable to configure the control unit 503 to vary the second control according to pressure detected by the plurality of operation detection units 501 or to the pressure detected by the plurality of pressure detection units 502.

The plurality of pressure detection units 502 corresponds to a plurality of pressure detection switches B (see FIG. 7) disposed adjacent to each of the plurality of key switches A. The plurality of pressure detection units 502 (pressure detection switches B) is configured to be pressed by different pressures; the pressure detection units 502 detect pressure pressed sequentially from low detection pressures corresponding to water depth.

For example, if pressure is detected by one pressure detection unit 502 (pressure detection switches B) of the plurality of pressure detection units 502 (pressure detection switches B), the control unit 503 controls to emit light of one LED of a plurality of LEDs; if pressure is detected by two pressure detection units 502 of the plurality of pressure detection units 502, the control unit 503 controls to emit two LEDs of the plurality of LEDs.

In this way, the number of pressure detection units 502 that detect pressure can be considered to increase in proportion to water depth. Therefore, by varying the second control (for example, varying the number of LEDs to emit light) according to pressure, it is possible to further improve the convenience of the cellular telephone 1 underwater.

Also, as shown in FIG. 16, it is acceptable to configure the cellular telephone 1 to have a function execution unit 504 that executes predetermined functions. With such a configuration, the control unit 503 restrains execution of a function as a second control when pressure is detected by the operation detection units 501, in a state where a predetermined function is executed by the function execution unit 504, when the cellular telephone 1 is in a closed state.

For example, when a function that is difficult to use underwater (particularly, a function that involves emitting audio (excluding when using a headphone), because sound does not travel easily through the medium of water) is executed when the cellular telephone 1 is in a closed state, execution of that function would be meaningless if the cellular telephone 1 is underwater and that would wastefully consume power.

For that reason, the cellular telephone 1 conserves power by restraining that function using the second control when the cellular telephone is in such an environment.

Furthermore, as shown in FIG. 16, it is acceptable to configure the cellular telephone 1 to have an alarm unit 505. With such a configuration, the control unit 503 issues an alarm using the alarm unit 505 as a second control when pressure is detected by the operation detection units 501 when the cellular telephone 1 is in a closed state.

For example, if pressure is detected by the operation detection units 501 when the cellular telephone 1 is in a closed state, the control unit 503 emits light with the LED or a backlight of the display 21 as the alarm unit 503, or drives the motor 75 as the alarm unit 505.

With such a configuration, the cellular telephone 1 implements a predetermined alarm (for example a warning using LED light) if water depth beyond a given level is reached to avoid cellular telephone 1 damage and to improve convenience.

Also, as shown in FIG. 16, it is acceptable to configure the cellular telephone 1 to have a recording unit 506 that records corresponding information associating pressure and water depth. With such a configuration, when pressure is detected by the operation detection units 501 while the cellular telephone 1 is in a closed state, the control unit 503 deduces water depth based on the pressure related to pressing, and corresponding information recorded in the recording unit 506, and controls to notify the user of the result of the deduced water depth using the alarm unit 505, as the second control.

For example, the cellular telephone 1 deduces water depth based on pressure related to pressing detected by the operation detection units 501 and corresponding information recorded in the memory 72 as the recording unit 506, and displays the deduced water depth using the display 21 as the alarm unit 505.

With such a configuration, the cellular telephone 1 informs the user of the deduced water depth using the alarm unit 505 so the user is able easily to recognize water depth which improves the convenience of cellular telephone 1.

Also, it is acceptable to configure the control unit 503 to implement a power restraining operation as the second control.

With such a configuration, the cellular telephone 1 restrains power (for example, the power is turned off) when water depth beyond a given level is reached to avoid cellular telephone 1 damage and to conserve power.

<Water Submersion Detection Method>

Here, a method for detecting when the cellular telephone 1 of the fifth embodiment is submerged in water will now be explained.

The cellular telephone 1 of the fifth embodiment is configured to move between an open and a closed state. When the cellular telephone 1 is in a closed state, the operation unit 11 is covered by the display-unit side housing unit 3, but even when it is in a closed state, a gap that communicates with the outside is formed between the operation-unit side housing portion 2 and the display-unit side housing unit 3. Therefore, even when the cellular telephone 1 is in a closed state, the operation unit 11 is configured to be directly affected by water pressure when submerged in water.

The cellular telephone 1 of the fifth embodiment has a function for measuring water depth (water pressure) that detects submersion in water and water pressure in real-time using the closed and opened status of the cellular telephone 1, pressing detection with the plurality of key switches A each disposed to correspond to a plurality of keys, and the key sheet 40 structure, using an existing apparatus configuration.

With the fifth embodiment, the control unit 503 determines a state where the operation detection units 501 detected a predetermined pressure as a water-submerged state, when the cellular telephone 1 is in a closed state and the possibility that the operation unit 11 is operated is extremely low in a normal usage state. This restrains execution of the second control if the operation unit 11 was operated in a normal usage state (when the cellular telephone 1 is in an opened state). In this way, the cellular telephone 1 reliably detects the state of the cellular telephone being submerged in water without the mechanism that detects submersion in water becoming wet directly by water.

Furthermore, the control unit 503 also determines the state in which a plurality of operation detection units 501 is simultaneously pressed when the cellular telephone 1 is in a closed state as a submerged state.

In this way, the cellular telephone 1 of the fifth embodiment determines it is submerged in water when it is detected that predetermined key switches A are pressed by water pressure, when in a closed state. In other words, the plurality of key switches A have the functionality of water submersion detection switches.

<Operation Method>

Figure 17:
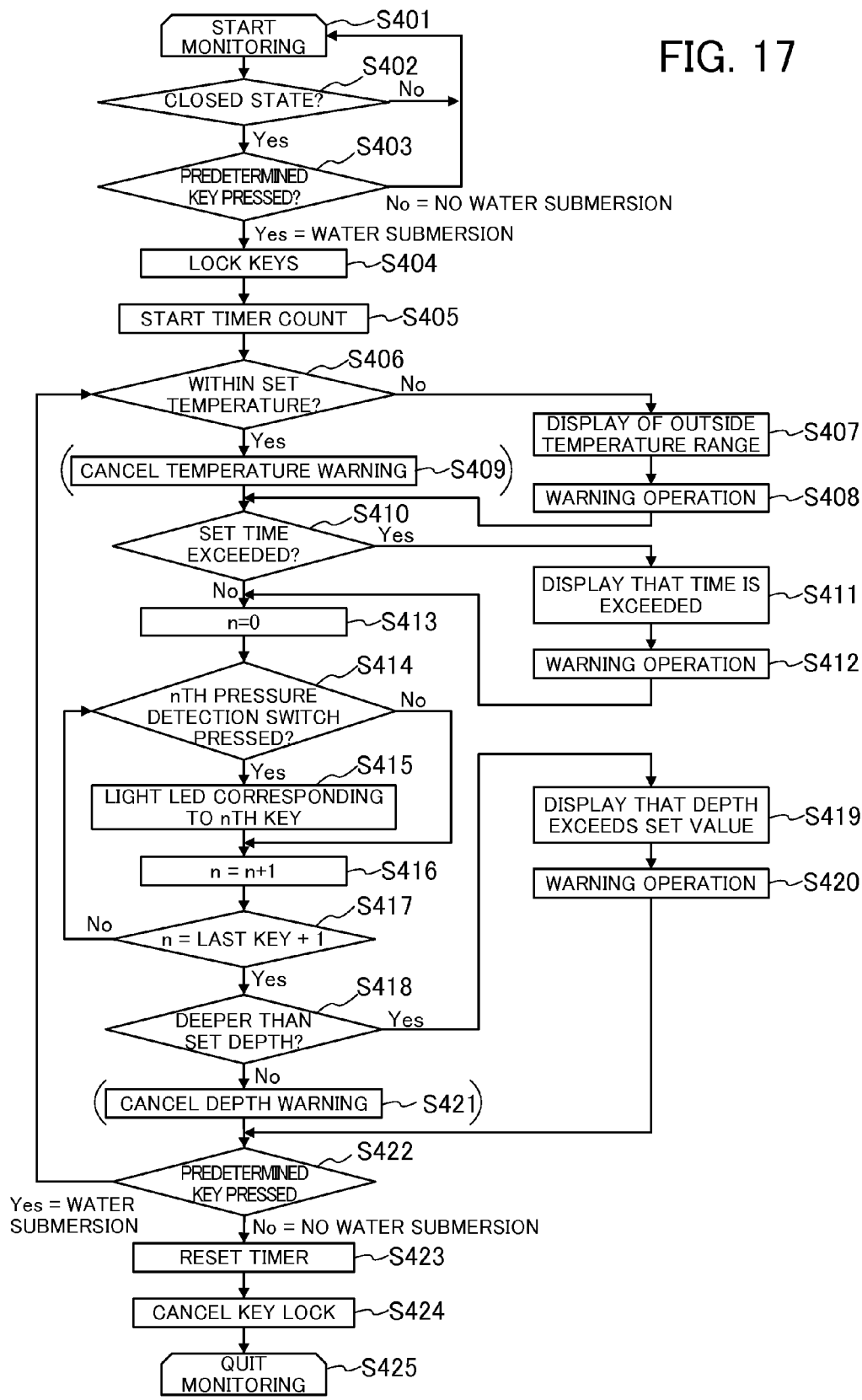
FIG. 17 is a flowchart to explain operation of the cellular telephone according to the fifth embodiment.

The following will now explain operations of the cellular telephone 1 of the fifth embodiment with reference to the flowchart shown in FIG. 17.

At step S401, the control unit 503 starts monitoring water submersion. The control unit 503 intermittently monitors water submersion when in standby to receive data, and intermittently or continually at any time monitors water submersion.

If the main antenna 51 is configured to intermittently receive signals from a base station, not shown, when in a standby mode, it is acceptable for the main antenna 51 to monitor water submersion while intermittently receiving data. By doing so, it is possible to monitor water submersion by effectively utilizing the power consumed by receiving signals by the main antenna 51.

At step S402, the control unit 503 detects the open or closed state of the cellular telephone 1. When the control unit 503 detected that the cellular telephone 1 is in a closed state, it advances to step S403. Also, when the cellular telephone 1 is detected to be in an opened state, the control unit 503 returns to step S401.

At step S403, the control unit 503 implements key pressing (pressing pressure) detection. If the control unit 503 detected that predetermined key switches A have been pressed, it detects submersion in water, and advances to step S404. Also, if it detects that predetermined key switches A have not been pressed, it returns to step S401.

At step S404, when the control unit 503 detected submersion in water, it controls a key lock to prevent erroneous operation of keys pressed by water pressure.

At step S405, the control unit 503 starts driving a timer that counts the time submerged in water after detecting that the cellular telephone is submerged in water in the process of step S403.

At step S406, the control unit 503 detects water temperature measured by the temperature sensor to determine whether the temperature is within the preset temperature range. If the temperature is outside of the set temperature range (No), it advances to step S407; if the temperature is within the set temperature range (Yes), it advances to step S408 or step 410.

At step S407, the control unit 503 displays that the temperature is outside of the set temperature range.

At step S408, the control unit 503 implements the warning operation. Thereafter, if the temperature returns to within the set temperature range, the control unit 503 cancels the display at step S407 and the warning operation at step S408.

At step S409, if the display at step S407 and the warning operation at step S408 are being executed and the temperature has been confirmed to have returned to within the set temperature range, the control unit 503 cancels the display at step S407 and the warning operation at step S408.

At step S410, the control unit 503 references the timer driven in the process of step S405, measures the time submerged in water, and determines whether that time has exceeded the preset time. If it is determined that the set time is exceeded (Yes), it advances to step S411; if the set time is determined not to be exceeded (No), it advances to step S413.

At step S411, the control unit 503 displays that the set time has been exceeded.

At step S412, the control unit 503 implements the warning operation.

At step S413, the control unit 503 clears to zero (n=0) the counter that counts the number n of the pressed pressure detection switches B.

At step S414, the control unit 503 determines whether the pressure detection switches B that correspond to the set nth key was pressed. When the pressure detection switch B that corresponds to the nth key has been determined to be pressed, it advances to step S415; when the pressure detection switch B that corresponds to the nth key has been determined not to be pressed, it advances to step S416. Pressures pressed on each corresponding key are different for the pressure detection switches B. The control unit 503 measures water depth by monitoring the pressed pressure detection switches B.

At step S415, the control unit 503 controls to light the light emitting unit (LED) C that corresponds to the nth key. For example, the control unit 503 lights only the light emitting unit (LED) C that corresponds to the "1" key when only the pressure detection switch B that corresponds to the "1" key has been pressed.

At step S416, the control unit 503 increments by one (n=n+1) the pressed pressure detection switch B number n.

At step S417, the control unit 503 determines whether the pressed pressure detection switch B number n has reached a prescribed number (key number+1). If it is determined that the prescribed number has been reached (Yes), it advances to step S418, and if it is determined that the prescribed number has not been reached, it returns to step S414.

At step S418, the control unit 503 determines whether the water depth is deeper than the set water depth. If it is determined that the water depth is deeper than the set water depth (Yes), it advances to step 419, and if it is determined not to be deeper than the set water depth (No), it advances to step S421 or step S422.

At step S419, the control unit 503 displays that the water depth is deeper than the set water depth.

At step S420, the control unit 503 implements the warning operation. Thereafter, if the water depth returns to within the set water depth, the control unit 503 cancels the display at step S419 and the warning operation at step S420.

At step S421, if the display at step S419 and the warning operation at step S420 are being executed, and the depth has been confirmed to have returned to the set water depth, the control unit 503 cancels the display at step S419 and the warning operation at step S420.

At step S422, the control unit 503 implements key pressing detection. If the control unit 503 detected that a predetermined key has been pressed, it continues to detect the submersion in water, and returns to step S406. Also, if it detected that a predetermined key switch A has not been pressed, it advances to step S423.

At step S423, the control unit 503 resets the timer driven in the process of step S405.

At step S424, the control unit 503 cancels the key lock controlled in the process of step S404.

At step S425, the control unit 503 quits monitoring submersion in water.

Also, it is acceptable to configure the cellular telephone 1 to allow the user to set water depth, water temperature, and time ranges, and to include a setting unit that issues a warning when the ranges have been exceeded.

A cellular telephone of a conventional configuration detected submersion in water by determining whether circuit terminals used for detection formed in a circuit were wet with water. Conversely, the cellular telephone 1 according to the fifth embodiment detects submersion in water by detecting the opened and closed states of the cellular telephone 1, and a pressing state of the keys, as described above; it is not necessary to allow water to enter into the circuit, as is the case with the conventional cellular telephone, so this prevents the circuit from becoming wet with water.

Furthermore, the cellular telephone 1 of the present invention includes a diver function so when it is used beyond preset ranges (for example, water depth), the configuration gives a warning to the user that can be recognized underwater, making it possible to restrain accidents in advance.

It not only gives a warning, but if a preset range is exceeded, the cellular telephone is configured to record that instance in the recording unit 506. With this, usage outside of the standard range is recorded in the recording unit 506, so it is possible easily to determine whether the cellular telephone 1 has experienced a normal malfunction or a malfunction caused by being used outside of standards by referencing data saved in the recording unit 506, and can be a lead to finding the cause of the malfunction.

The following will now explain a sixth embodiment of the present invention.

The cellular telephone 1 of the sixth embodiment has a function that detects water pressure as a load. However, with the cellular telephone 1, it is also possible reliably to determine whether the load is caused by water pressure or another pressure (such as human-induced pressure). A configuration and operations of this function of the cellular telephone 1 will now be explained.

Figure 18:
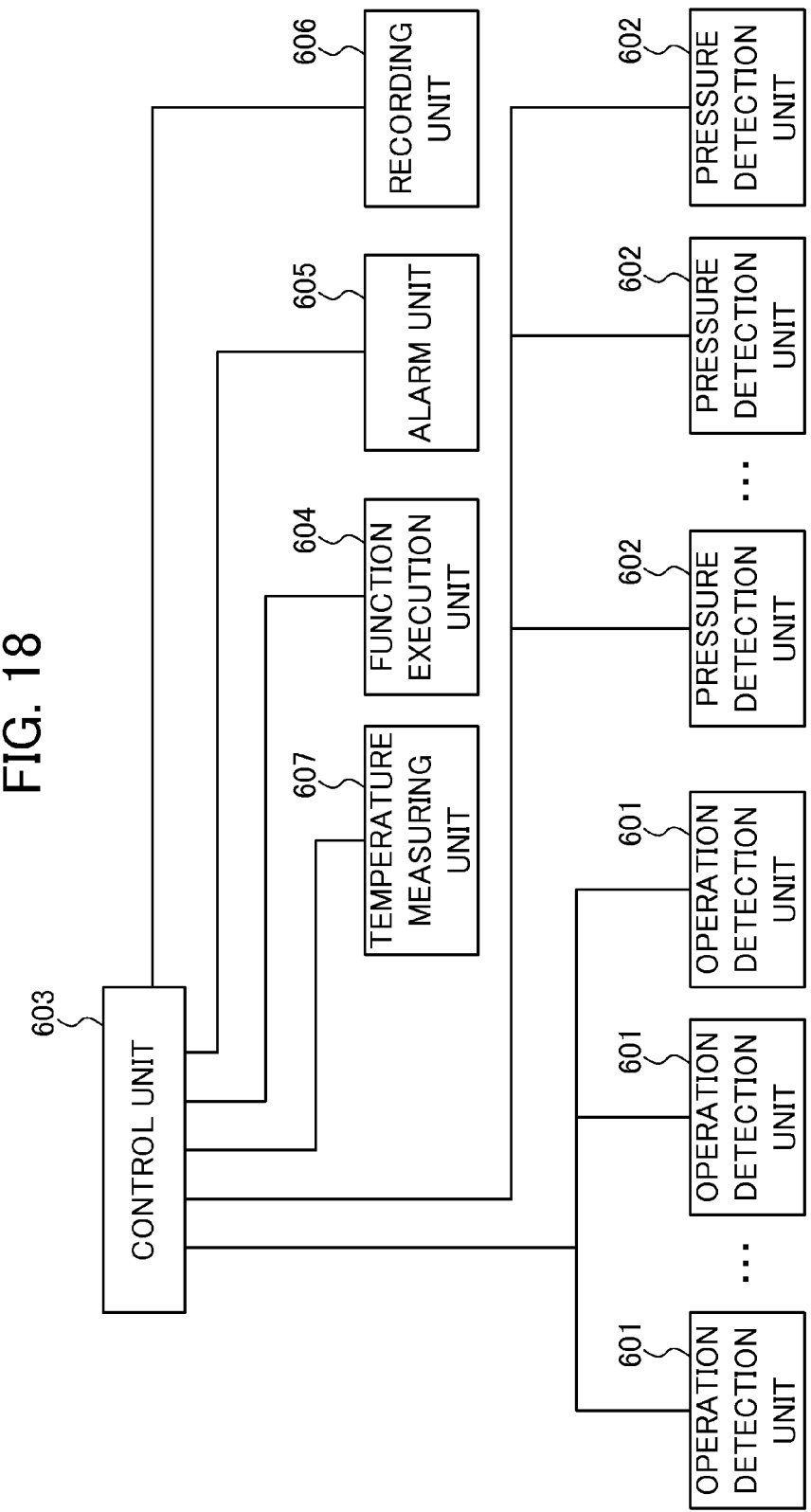
FIG. 18 is a block diagram of a configuration that achieves a diver function of the cellular telephone according to a sixth embodiment.

As shown in FIG. 18, the cellular telephone 1 of the sixth embodiment is equipped with operation detection units 601, a temperature measuring unit 607, and a control unit 603. The operation detection units 601 detect pressure of a pressing operation on the operation unit 11. The temperature measuring unit 607 measures the temperature of the operation unit 11. The control unit 603 implements a first control (for example, a control implemented by the detection of pressure other than water pressure) when pressure is detected by the operation detection units 601. The control unit 603 implements a second control (for example, a control implemented when water pressure is detected) that is different from the first control when pressure detected by the operation detection units 601 is higher than a predetermined value (for example, a water pressure value when the cellular telephone is at a depth of 5 meters of water), and temperature measured by the temperature measuring unit 607 is at a predetermined temperature range (for example, a temperature range 30° C. or lower and 45° C. or higher, which are temperatures that are not considered to be generated by the human body).

Figure 19:
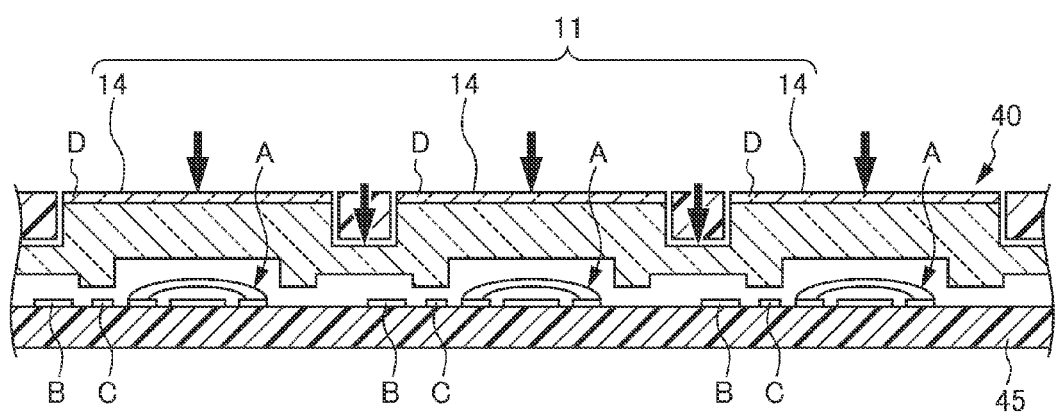
FIG. 19 is a unital view of the X-X line in FIG. 1 in the cellular telephone according to the sixth embodiment.

Here, water pressure detection using the operation detection units 601, temperature measuring unit 607 and the control unit 603 will now be explained with reference to FIGS. 18 and 19. FIG. 19 is a unital view of the X-X line in FIG. 1 in the cellular telephone 1 of the sixth embodiment. In the sixth embodiment, the operation detection units 601 correspond to a plurality of key switches A disposed to correspond to each of the plurality of keys that compose the operation unit 11. Specifically, a plurality of operation detection units 601 is disposed. The temperature measuring unit 607 corresponds to a temperature sensor D equipped with at least one of the plurality of keys that compose the operation unit 11. Also, the control unit 603 corresponds to the CPU 71.

When the cellular telephone 1 is used in a normal situation (such as in a location other than underwater (such as on land)), each of the plurality of keys that composes the operation unit 11 is operated in sequence by a user. Here, the temperature measuring unit 607 (temperature sensor D) disposed on keys touched by a user's finger detects temperatures near the user's body temperature because the user's finger touches keys that the user presses.

Conversely, when the cellular telephone 1 is used in a special situation (such as underwater), the plurality of keys that composes the operation unit 11 is pressed by water pressure, so the temperature measuring unit 607 (temperature sensor D) that detects the temperature of the operation unit 11 detects temperatures near the water temperature.

However, even if the operation detection units 601 are pressed by a predetermined pressure, if the temperature detected by the temperature measuring unit 607 is at a temperature outside a predetermined range (for example, 30-45° C. which is near the temperature of the human body), the control unit 603 (CPU 71) determines the cellular telephone is being used normally and implements the first control because there is a high possibility that the pressure was caused by user operation. Also, if the temperature detected by the temperature measuring unit 607 is in a predetermined range (for example, 30° C. or lower and 45° C. or higher than which are temperatures that are not considered to be generated by the human body), there is a low possibility that the pressure was caused by user operation, so the control unit 603 determines the cellular telephone 1 is being used in a special manner and implements the second control.

The first control is a control implemented when pressure other than water pressure is detected. This control (control for conversations, or control for sending and receiving mail messages and the like) is related to normal cellular telephone usage. The second control is implemented when water pressure is detected. This control (control for emitting light such as for the LED as a warning, or to turn the power off and the like) is related to special cellular telephone usage.

In this way, the cellular telephone 1 easily determines whether the pressure detected by the operation detection units 601 was caused by user operation or by water pressure, so this reduces the number of components, and makes it possible to implement the proper control according to the status of the cellular telephone, and improves convenience.

Also, even if the plurality of operation detection units 601 detected a predetermined pressure by accident, possibility that the cellular telephone will erroneously implement the second control is reduced and convenience is improved.

With this embodiment, it was explained that the operation detection units 601 correspond to the plurality of key switches A. However, the present invention is not to be construed to be limited thereto. It is also acceptable to adopt another configuration as long as it is possible to detect water pressure.

Also, it is acceptable to configure the cellular telephone to dispose a plurality of operation detection units 601 and for the control unit 603 to implement a second control that is different from the first control, when pressure detected simultaneously by the plurality of the operation detection units 601 is higher than a predetermined value, and the temperature measured by the temperature measuring unit 607 is at a predetermined temperature range.

When the cellular telephone 1 is used in a special situation (for example, used underwater), all of the plurality of keys of the operation unit 11 are pressed simultaneously with a constant pressure by water pressure that corresponds to water depth. Specifically, when underwater, the plurality of operation detection units 601 simultaneously detects pressure higher than a predetermined value caused by water pressure.

Therefore, if the pressure detected simultaneously by the plurality of operation detection units 601 (plurality of key switches A) is higher than a predetermined value, and the temperature measured by the temperature measuring unit 607 is at the predetermined temperature range, the control unit 603 implements the second control. By implementing such a control, possibility of erroneous implementation of the second control is reduced, the precision of water pressure detection is improved and convenience of the cellular telephone 1 is improved.

With the cellular telephone 1, it is acceptable to configure the plurality of operation detection units 601 to include a first section disposed on the first surface of the housing, and a second section disposed on the second surface of the housing.

If the plurality of operation detection units 601 is disposed on one surface, for example if the plurality of operation detection units 601 is composed by key switches disposed to correspond to the side keys 30, there could be cases where an even pressure is simultaneously applied to the side keys 30 such as when the cellular telephone 1 is held in a pocket and the like. This can erroneous implement the second control.

For that reason, with the cellular telephone 1, the plurality of operation detection units 601 is composed of key switches A disposed to correspond to the operation unit 11 disposed on a surface of the front panel 2a as the first surface of the operation-unit side housing unit 2, which is a housing, and a key switch, not shown, disposed to correspond to the side keys 30 disposed on a side surface as the second surface of the operation-unit side housing unit 2.

With such a configuration, possibility that the second control will be erroneously implemented is reduced because the first and second sections are disposed on different housing surfaces.

Also, it is acceptable to configure the control unit 603 to implement the second control when a pressure is detected by the operation detection units 601 longer than a predetermined amount of time.

When the cellular telephone 1 is underwater, it is assumed with a high probability that an even pressure will be detected simultaneously longer than a predetermined amount of time by the operation detection units 601. However, even if the plurality of operation detection units 601 is simultaneously pressed by a constant pressure, if the pressure detection time is not continued for a given amount of time (for example, 10 seconds), the cellular telephone 1 will not implement the second control because there is a low possibility that the cellular telephone is underwater. If the pressure detection time continues for a given amount of time (for example, 10 seconds), there is a high possibility that the cellular telephone is underwater, so the second control will be implemented.

Therefore, even if the plurality of operation detection units 601 has simultaneously detected an even pressure by accident, possibility that the cellular telephone will erroneously implement the second control is reduced, and convenience is improved.

Also, it is acceptable to configure the control unit 603 to vary the second control according to a length of time pressure higher than a predetermined value is detected by the operation detection units 601.

For example, if the time a pressure higher than a predetermined value is detected simultaneously by the plurality of operation detection units 601, or the time a pressure higher than a predetermined value is detected by one operation detection unit 601 is one minute, the control unit 603 controls to emit light such as an LED as the second control; if the time is 10 minutes, the control unit 603 controls to vibrate the cellular telephone using the motor 75 in addition to controlling to emit light such as the LED as a second control. By implementing such controls, it is possible to properly notify the user of the status underwater, and to suitably avoid cellular telephone 1 damage.

Also, for example, if the time that a pressure higher than a predetermined value is detected simultaneously by the plurality of operation detection units 601, or the time a pressure higher than a predetermined value is detected by one of the operation detection units 601 is one minute, the control unit 603 shifts to a sleep mode by controlling the power circuit; if the time is 10 minutes, it controls the power circuit to turn off the power. By implementing such controls, it is possible to avoid cellular telephone 1 damage that can occur by changes in the status underwater, and to conserve power.

In this way, it is possible to consider the time that an even pressure is detected simultaneously by the operation detection units 601, or the time a pressure higher than a predetermined value is detected by one operation detection unit 601 as the time that the cellular telephone is underwater, so by varying the second control according to the detection time, it is possible to further improve cellular telephone 1 convenience underwater.

Also, it is acceptable to configure the control unit 603 to vary the second control according to pressure detected by the operation detection units 601.

For example, if the pressure detected by the operation detection units 601 is below a given threshold value (a weak pressure), the control unit 603 controls to emit light such as an LED or the like; if the pressure is higher than a given threshold value (a strong pressure), the control unit 603 controls to vibrate the cellular telephone 1 using a motor 75 in addition to controlling to emit light of an LED or the like. By implementing such a control, it is possible to properly notify the user of changes in the water pressure, and to avoid cellular telephone 1 damage.

Also, for example, if pressure detected by the operation detection units 601 is below a given threshold value (a weak pressure), the control unit 603 shifts to a sleep mode by controlling the power circuit; if the pressure is higher than a given threshold value (a strong pressure), the control unit 603 controls the power circuit to turn off the power. By implementing such a control, it is possible to avoid cellular telephone 1 damage that can occur by changes in water pressure, and to conserve power.

In this way, it is considered that pressure detected by the operation detection units 601 increases in proportion to water depth. For that reason, by varying the second control according to pressure, it is possible to further improve convenience of the cellular telephone 1 underwater.

Also, the cellular telephone 1 is further equipped with a plurality of pressure detection units 602 disposed adjacent to each of the plurality of operation detection units 601 to detect varied pressure of each; the control unit 603 can be configured to vary the second control according to pressure detected by the plurality of operation detection units 601 or to pressure detected by the plurality of pressure detection units 602.

The plurality of pressure detection units 602 corresponds to a plurality of pressure detection switches B (see FIG. 7) disposed adjacent to each of the plurality of key switches A. The plurality of pressure detection units 602 detects pressure sequentially from pressure detection units 602 with low detected pressures that correspond to water depth. For example, if pressure is detected by one pressure detection unit 602 of the plurality of pressure detection units 602, the control unit 603 controls to emit light of one LED of a plurality of LEDs; if pressure is detected by two pressure detection units 602 of the plurality of pressure detection units 602, the control unit 603 controls to emit light of two LEDs of the plurality of LEDs.

In this way, the number of pressure detection units 602 that detects pressure is considered to increase in proportion to water depth. Therefore, by varying the second control according to pressure, it is possible to further improve cellular telephone 1 convenience underwater.

Also, as shown in FIG. 18, it is acceptable to configure the cellular telephone 1 to have a function execution unit 604 that executes predetermined functions. With such a configuration, the control unit 603 restrains execution of a function as a second control when a pressure detected by the operation detection units 601 is higher than a predetermined value when a predetermined function is being executed by the function execution unit 604, and the temperature measured by the temperature measuring unit 607 is at a predetermined temperature range.

For example, when a function that is difficult to use underwater (particularly, a function that involves emitting audio (excluding when using a headphone), because sound does not travel easily through the medium of water) is executed, execution of that function would be meaningless if the cellular telephone 1 is submerged in water, and would wastefully consume power.

For that reason, the cellular telephone 1 conserves power consumption by restraining that function using the second control when the cellular telephone 1 is in such an environment.

Furthermore, as shown in FIG. 18, it is acceptable to configure the cellular telephone 1 to have an alarm unit 605. With such a configuration, the control unit 603 issues an alarm using the alarm unit 605 as the second control when pressure detected by the operation detection units 601 is higher than a predetermined value and temperature measured by the temperature measuring unit 607 is at a predetermined temperature range.

For example, if pressure higher than a predetermined value is detected by the operation detection units 601, and a temperature of the predetermined range is measured by the temperature measuring unit 607, the cellular telephone 1 emits light using the LED or a backlight of the display 21 as the alarm unit 605, or drives the motor 75 as the alarm unit 605.

With such a configuration, the cellular telephone 1 issues the predetermined alarm if water depth beyond a given level is reached, to avoid cellular telephone 1 damage and to improve cellular telephone 1 convenience.

Also, it is acceptable to configure the control unit 603 to restrain the power as the second control when pressure detected by the operation detection units 601 is higher than a predetermined value and the temperature measured by the temperature measuring unit 607 is at a predetermined temperature range.

With such a configuration, the cellular telephone 1 restrains power (for example, the power is turned off, or the cellular telephone starts a sleep mode) when water depth beyond a given level is reached to avoid cellular telephone 1 damage and to conserve power.

Furthermore, as shown in FIG. 18, it is acceptable to configure the cellular telephone 1 to have a recording unit 606. With such a configuration, when pressure higher than a predetermined value is detected by the operation detection units 601, and the temperature of the predetermined range is measured by the temperature measuring unit 607, the control unit 603 records the detected and measured instances in the recording unit 606.

For example, if the cellular telephone 1 specification guarantees use in water up to 10 meters deep, the predetermined value is set to 10 meters. In such a case, if water pressure is detected to exceed 10 m and the temperature of the predetermined range is measured, that usage that is outside of the specifications is recorded in the recording unit 606. For that reason, it is possible easily to determine whether the cellular telephone 1 has experienced a normal malfunction or a malfunction caused by being used outside of the normal specifications by referencing data saved in the recording unit 606, and can be a lead to finding the cause of the malfunction.

<Water Submersion Detection Method>

Here, a method for detecting when the cellular telephone 1 of the sixth embodiment is submerged in water will now be explained.

With the cellular telephone 1, the operation unit 11 is equipped with a plurality of keys, as described above; the operation unit 11 is formed on the key sheet 40. Therefore, the operation unit 11 will be directly affected by water pressure when submerged in water. The cellular telephone 1 of the present invention has a function for measuring water depth (water pressure) that detects submersion in water and water pressure in real-time using key pressure detection by the plurality of key switches A each disposed to correspond to the plurality of keys, the key sheet 40 structure, and a temperature sensor D equipped with at least one key of the plurality of keys, in an existing device configuration.

As described above, normally, all keys of the cellular telephone 1 are pressed by water pressure at a water depth of 2 (m). Also, in this state, the temperature sensor D equipped on a pressed key measures the temperature near the water temperature.

Then, under normal use, because the temperature sensor D equipped on a pressed key measures the temperature near the user's body temperature, the control unit 603 determines that the states in which a predetermined key is pressed by a pressure higher than predetermined value and the temperature of the predetermined key is at a predetermined temperature range (for example, 30° C. and lower or 45° C. and higher which are temperatures that are not considered to be generated by the human body) as submerged states.

It is acceptable to configure the control unit 603 to determine that the state in which all keys are pressed by a pressure higher than a predetermined value and a temperature of all keys to be at a predetermined temperature range as the state in which the cellular telephone 1 is submerged in water. Also, it is acceptable to determine the states in which a plurality of keys normally not pressed simultaneously are pressed simultaneously by a pressure higher than a predetermined value, and the temperature of the plurality of keys is at a predetermined temperature range as the state in which the cellular telephone 1 is submerged in water.

In this way, the cellular telephone 1 reliably detects the state of the cellular telephone 1 being submerged in water without the mechanism that detects submersion in water becoming wet directly by water.

As shown in FIG. 19, with the cellular telephone 1 of the sixth embodiment, each of the keys equipped on the key sheet 40 is pressed by this water pressure, when water pressure is applied. As described above, the patterns on the wiring board 45 are pressed and switched back using a metal dome and the like for each of the key switches A disposed to correspond to each key; a constant weight is ensured using the metal dome or the like.

Also, the temperature sensor D equipped on at least one key of the plurality of keys measures the temperature of the pressed key.

The cellular telephone 1 determines that it is submerged in water when predetermined key switches A, for example all key switches A or a plurality of key switches A that correspond to a determined plurality of keys are detected to be pressed simultaneously by a predetermined water pressure and the temperature measured by the temperature sensor D is detected to be at a predetermined temperature range. In other words, the plurality of key switches A have the functionality of water submersion detection switches.

It is acceptable to configure the cellular telephone 1 to determine that it is submerged in water when one key switch A was pressed by a pressure higher than a predetermined value and a state in which the temperature measured by the temperature sensor D is at a predetermined temperature range is detected.

<Water Submersion Warning>

The following will now explain a warning method when the cellular telephone 1 is submerged in water.

Even though the cellular telephone has a waterproof function, there are cases where it will be left in an environment, such as underwater, that exceeds the waterproof function. The cellular telephone 1 of the present invention has a function for recording water submersion time that detects being under water using the water submersion detection function, and a function that detects water temperature when the cellular telephone is submerged in water, equipping the temperature sensor D on the operation unit 11.

The cellular telephone 1 issues a predetermined warning for any of the following by using the information obtained by the function that records water submersion time and the function that detects water temperature. The warnings are issued when: 1. Water depth (water pressure) exceeded the set water depth; 2. Water submersion time exceeded the set time; and 3. Water temperature exceeded the set temperature range. (Warnings can be a light emitting operation such as using the LED, or by driving the motor.)

<Operation Method>

Figure 20:
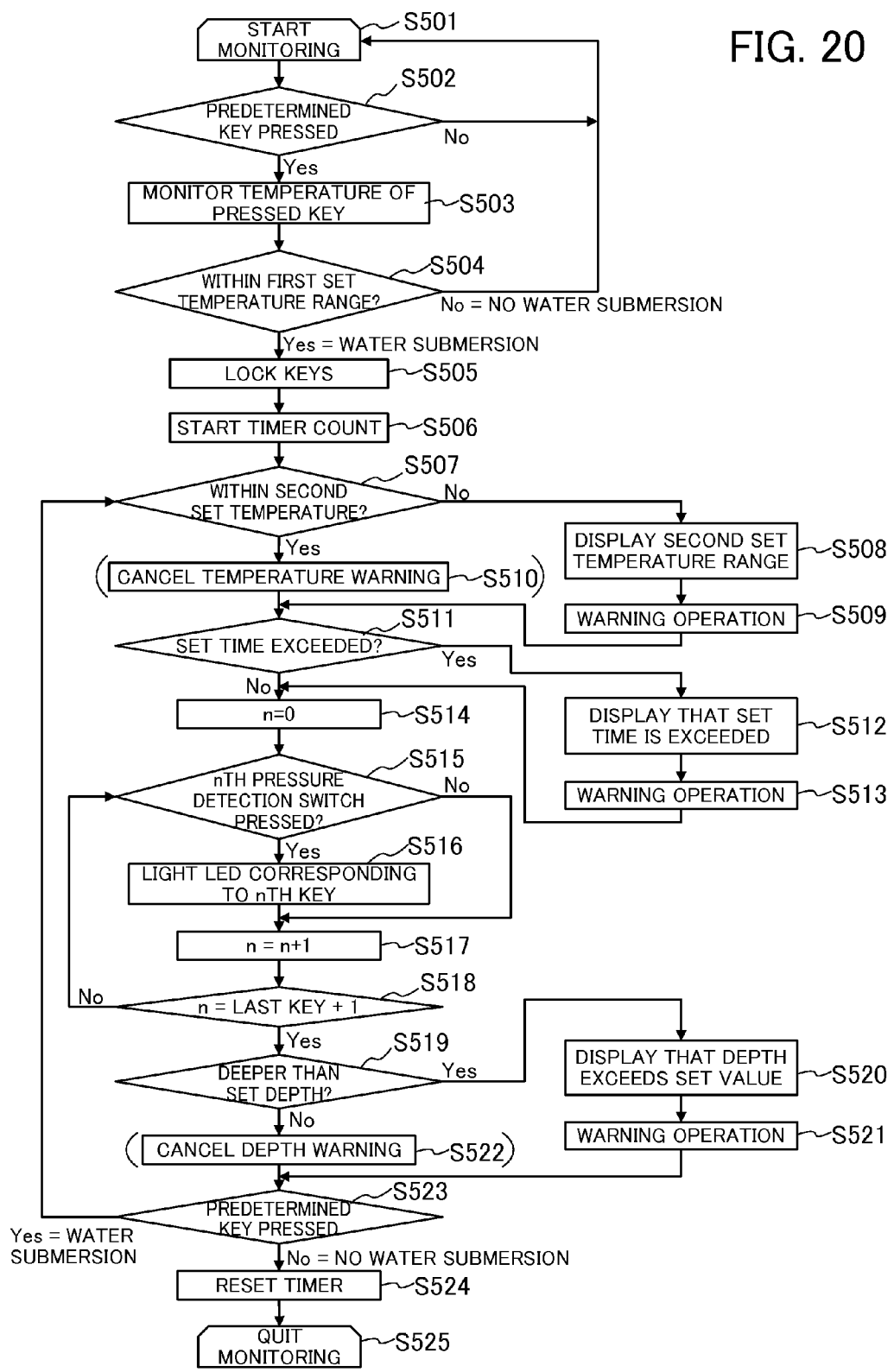
FIG. 20 is a flowchart to explain operation of the cellular telephone according to the sixth embodiment.

The following will now explain operations of the cellular telephone 1 of the sixth embodiment with reference to the flowchart shown in FIG. 20.

At step S501, the control unit 603 starts monitoring water submersion. The control unit 603 intermittently monitors water submersion when in standby to receive data, and intermittently or continually at any time monitors water submersion.

At step S502, the control unit 603 implements key pressing (pressing pressure) detection. If the control unit 603 detects that all of the key switches A (or a specific plurality of key switches A) have been pressed simultaneously, or that one specific key switch A has been pressed, it continues to measure the temperature of the pressed key and advances to step S503. Also, if the control unit 603 detects that not all of the key switches A (or a specific plurality of key switches A) have been pressed simultaneously, or that one specific key switch A has not been pressed, it returns to step S501.

At step S503, the control unit 603 measures the temperature of the pressed key using the temperature sensor D.

At step S504, the control unit 603 determines whether the temperature of the key measured in the process of step S503 is within a preset first set temperature range. If it is determined that the temperature of the key is within the first set temperature range (Yes), it detects submersion in water and advances to step S505. If it is determined that the temperature of the key is outside of the first set temperature range (No), it returns to step S501.

At step S505, when the control unit 603 detected submersion in water, it controls a key lock to prevent erroneous operation of keys pressed by water pressure.

At step S506, the control unit 603 starts driving a timer that counts the time the cellular telephone is submerged in water after detecting that it is submerged in water in the process of step S505.

At step S507, the control unit 603 detects the temperature of the water measured by the temperature sensor D to determine whether the temperature is in the preset second set temperature range. If the temperature is outside of the second set temperature range (No), it advances to step S508; if the temperature is within the set temperature range (Yes), it advances to step S510 or step S511.

At step S508, the control unit 603 displays that the temperature is outside of the second set temperature range.

At step S509, the control unit 603 implements the warning operation. Thereafter, if the temperature returns to within the second set temperature range, the control unit 603 cancels the display at step S508 and the warning operation at step S509.

At step S510, if the display at step S508 and the warning operation at step S509 are being executed, and the temperature is confirmed to have returned to within the second set temperature range, the control unit 603 cancels the display at step S508 and the warning operation at step S509.

At step S511, the control unit 603 references the timer driven in the process of step S506, measures the submersion time in water, and determines whether that time has exceeded the preset time. If is determined that the set time has been exceeded (Yes), it advances to step S512, and if it is determined that the set time is not exceeded (No), it advances to step S514.

At step S512, the control unit 603 displays that the set time has been exceeded.

At step S513, the control unit 603 implements the warning operation.

At step S114, the control unit 603 clears to zero (n=0) the counter that counts the number n of the pressed pressure detection switches B.

At step S515, the control unit 603 determines whether pressure detection switches B that correspond to the set nth key, were pressed. If it is determined that the pressure detection switches B that correspond to the nth keys were pressed, it advances to step S516; if it is determined that the pressure detection switches B that correspond to the nth keys were not pressed, it advances to step S517. Pressures pressed on each corresponding key are different for the pressure detection switches B. The control unit 603 measures water depth by monitoring the pressed pressure detection switches B.

At step S516, the control unit 603 controls to light the light emitting unit (LED) C that corresponds to the nth key. For example, the control unit 603 lights only the light emitting unit (LED) C that corresponds to the "1" key when only the pressure detection switch B that corresponds to the "1" key has been pressed.

At step S517, the control unit 603 increments by one (n=n+1) the pressed pressure detection switch B number n.

At step S518, the control unit 603 determines whether the pressed pressure detection switch B number n has reached a prescribed number (key number+1). If it is determined that the prescribed number has been reached (Yes), it advances to step S519, and if it is determined that the prescribed number has not been reached, it returns to step S515.

At step S519, the control unit 603 determines whether the water is deeper than the set water depth. If it is determined that the water depth is deeper than the set water depth (Yes), it advances to step S20, and if it is determined not to be deeper than the set water depth (No), it advances to step S522 or step S523.

At step S520, the control unit 603 displays that the water depth is deeper than the set water depth.

At step S521, the control unit 603 implements the warning operation. Thereafter, if the water depth returns to within the set depth range, the control unit 603 cancels the display at step S520 and the warning operation at step S521.

At step S522, if the display at step S520, and the warning operation at step S521 are being executed, and the depth has been confirmed to have returned to within the set water depth range, the control unit 603 cancels the display at step S520 and the warning operation at step S521.

At step S523, the control unit 603 implements key pressure detection. If the control unit 603 detects that all of the key switches A (or a specific plurality of key switches A) have been pressed simultaneously, or that one specific key switch A has been pressed, it continues to detect submersion in water, and returns to step S507. Also, if the control unit 603 detects that not all of the key switches A (or a specific plurality of key switches A) have been pressed simultaneously, or that one specific key switch A has not been pressed, it advances to step S524.

At step S524, the control unit 603 resets the timer driven in the process of step S506.

At step S525, the control unit 603 quits monitoring submersion in water.

Also, it is acceptable to configure the cellular telephone 1 to allow the user to set water depth, water temperature, and time ranges, and to include a setting unit that issues a warning when the ranges have been exceeded.

A cellular telephone of a conventional configuration detected submersion in water by determining whether circuit terminals used for detection formed in a circuit were wet with water. Conversely, the cellular telephone 1 according to the sixth embodiment detects submersion in water by detecting a pressing state of the keys, as described above; it is not necessary to allow water to enter into the circuit, as is the case with the conventional apparatus, so this prevents the circuit from becoming wet with water.

The following will now explain a seventh embodiment of the present invention.

The cellular telephone 1 of the seventh embodiment has a function for detecting water pressure as a load. This cellular telephone 1 detects water depth without establishing a separate water pressure sensor. A configuration and operations of this function of the cellular telephone 1 will now be explained.

Figure 21:
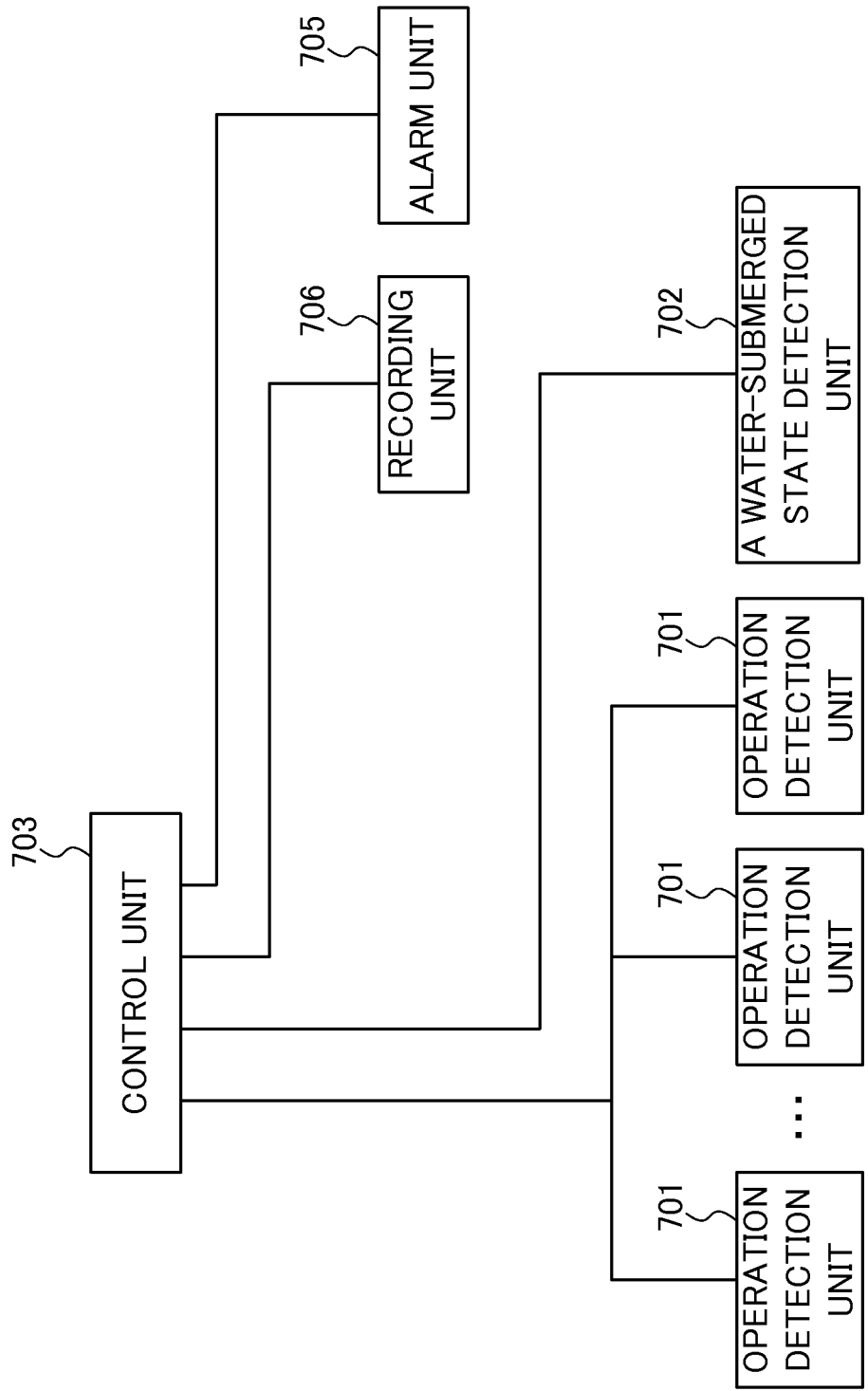
FIG. 21 is a block diagram of a configuration that achieves a diver function of the cellular telephone according to a seventh embodiment.

As shown in FIG. 21, the cellular telephone 1 of the seventh embodiment is equipped with operation detection units 701, a water submersion detection unit 702, a recording unit 706, an alarm unit 705 and a control unit 703.

The operation detection units 701 detect pressure of a pressing operation at a predetermined pressing force on the operation unit 11. The water submersion detection unit 702 detects that the cellular telephone 1 is wet with water. The water submersion detection unit 702 is composed of two terminals, not shown, exposed on the surface of the operation-unit side housing unit 2, and detects water by continuity being established between the two terminals causing them to short circuit. The recording unit 706 records a first information that associates pressing force and water depth.

The control unit 703 implements a first control (for example, a control for conversations, control for sending and receiving mail messages, and control for capturing images using the camera) that corresponds to a pressing operation when the pressing operation is detected by the operation detection units 701. Also, when the pressing operation is detected by the operation detection units 701 in a state where submersion in water is detected by the water submersion detection unit 702, the control unit 703 deduces water depth based on the pressing force of the pressing operation and the first information and implements a second control to inform the user of the result of the deduced water depth using the alarm unit 705.

At this time, the alarm unit 705 informs the user using a predetermined format (for example lighting an LED or backlight of the display 21, or driving the motor 75) of the water depth deduced by the control unit 703.

Figure 22:
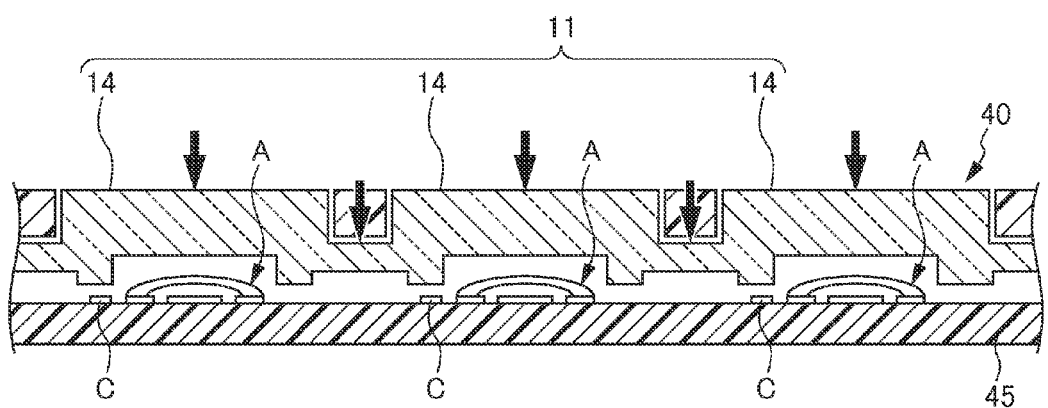
FIG. 22 is a unital view of the X-X line in FIG. 1 in the cellular telephone according to the seventh embodiment.

The following will now explain water pressure detection. The operation detection units 701 correspond to a plurality of key switches A (see FIG. 22) disposed to correspond to each of the plurality of keys that compose the operation unit 11.

The water submersion detection unit 702 corresponds to a water submersion detection unit that is equipped with two terminals, not shown, (for example, a charged terminal that can connects to an external terminal, and a connecting connector) disposed on the operation-unit side housing unit 2. More specifically, the water submersion detection unit 702 detects a short-circuit state based on the resistance value between the two terminals. The state in which the terminals are short-circuited is considered to be a state where the cellular telephone 1 is submerged in water.

The control unit 706 corresponds to the memory 72. The alarm unit 705 corresponds to the light emitting unit C (LED) (see FIG. 22), the display 21 and the motor 75. The control unit 703 corresponds to the CPU 71.

It is acceptable for the water submersion detection unit 702 to use a sensor that directly detects water or a method that determines the pressed status of the key switches A (for example, a state in which pressure on a plurality of key switches A is detected simultaneously).

When the cellular telephone 1 is used in a normal situation (such as in a location other than underwater, (such as when used on land)), any key of the plurality of keys that compose the operation unit 11 is pressed and operated by a user when the water submersion detection unit 702 is not detecting submersion in water. In this state, the control unit 703 implements the first control according to the key pressing operation when the operation detection units 701 (key switches A) detect a pressing operation.

Conversely, when the cellular telephone 1 is used underwater, a plurality of keys is pressed by a predetermined pressing force by water pressure, and the operation detection units 701 (key switches A) are pressed by a predetermined pressing force. Also, continuity between the two terminals is established by water which short-circuits the two terminals, and the water submersion detection unit 702 detects the submerged state of the cellular telephone 1. For that reason, if the operation detection units 701 detected the pressing operation when the water submersion detection unit 702 detected the submerged state, the control unit 703 determines that the pressing operation pressure (when the cellular telephone is used underwater) was caused by water pressure, and implements the second control.

The second control deduces the water depth of the location where the cellular telephone 1 is positioned based on the pressing force of the pressing operation detected by the operation detection units 701, and the first information recorded in the recording unit 706, and uses the alarm unit 705 to warn the user of the deduced water depth result.

In this way, with the cellular telephone 1, the control unit 703 deduces water depth using the operation detection units 701 when it is determined that the cellular telephone 1 is being used underwater. Therefore, because it is not necessary to provide the cellular telephone 1 with a separate water pressure sensor, it is possible to detect water depth without increasing manufacturing cost.

In this embodiment of the present invention, it was explained that the operation detection units 701 correspond to the plurality of key switches A. However, the present invention is not to be construed to be limited thereto. It is also acceptable to adopt another configuration as long as it is possible to detect the pressing operation on the operation unit 11. It is also acceptable to have one operation detection unit 701.

Also, it is acceptable to configure the operation detection units 701 to have a first operation detection unit that detects the pressing operation of a first pressing force (for example water pressure when at a depth of 2 m), and a second operation detection unit that detects the pressing operation of a second pressing force (for example, water pressure when at a depth of 4 m).

With such a configuration, if the pressing operation is detected by the first operation detection unit when a submerged state is detected by the water submersion detection unit 702, the control unit 703 deduces water depth based on the first pressing force detected by the first operation detection unit and the first information, and if the pressing operation is detected by the second operation detection unit, the control unit 703 deduces water depth based on the second pressing force detected by the second operation detection unit and the first information.

With such a configuration, the cellular telephone 1 has the first operation detection unit and the second operation detection unit that detect pressing operations with different pressing forces, so water depth is more precisely deduced.

With this embodiment of the present invention, the operation detection units 701 were composed to have the first operation detection unit and the second operation detection unit, but the present invention is not to be construed to limited thereto. It is acceptable to configure the operation detection units 701 to have three or more operation detection units that each detects pressing operations with three or more different pressing forces.

Also, it is acceptable to configure the control unit 703 to restrain the first control when implementing the second control.

For example, if submersion in water is detected by the water submersion detection unit 702, the cellular telephone 1 restrains operation of an application that executes a conversation function or a mailing function, and locks a plurality of keys. For that reason, even if key switches A disposed to correspond to the plurality of keys are pressed by water pressure, the conversation function or mailing function will not be executed.

With such a configuration, the cellular telephone 1 restrains erroneous operations that can be caused by the plurality of keys being pressed by water pressure underwater.

It is acceptable to configure the alarm unit 705 to have the light emitting unit C that radiates light. With such a configuration, the control unit 703 issues a warning of the deduced water depth result by radiating light using the light emitting unit C.

For example, with the cellular telephone 1, the plurality of keys is composed of optically transparent members, and the alarm unit 705 is composed to include the light emitting unit C (LED) that is disposed to correspond to the operation detection units 701. Also, if the pressing operation is detected by the operation detection units 701 in a state where submersion in water is detected by the water submersion detection unit 702, the control unit 703 deduces water depth based on the pressing force detected by the operation detection units 701, and radiates light toward the operation detection units 701 by radiating light of the light emitting units C (LED) disposed to correspond to the operation detection units 701 that detected the pressing operation.

With such a configuration, the light radiated from the light emitting unit C (LED) toward the operation detection units 701 (key switches A) reaches the outside by permeating the key disposed to overlap the operation detection units 701 (key switches A). With this configuration, light radiated from the light emitting unit C (LED) passes through the keys corresponding to the operation detection units 701 (key switches A) that detected the pressing operation and is visible to the user, so the user is visually warned of the deduced water depth.

Also, it is acceptable to configure the cellular telephone 1 to have a numerical keypad (of the 14 input operation keys, keys assigned the numbers 1-9, and 0) composed of a plurality of keys, and for the operation detection units 701 to be able to detect the pressing operations of each of the plurality of keys that composes the numerical keypad, and for the light emitting unit C (LED) to be able to radiate light onto each of the plurality of keys that compose the numerical keypad.

With such a configuration, the recording unit 706 records the second information that associates water depth and numbers assigned to each of the plurality of keys that compose the numerical keypad, and the control unit 703 deduces the numbers that correspond to the deduced water depth based on the water depth deduced based on pressing force detected by the operation detection units 701 and the first information, and the second information, and radiates light onto the key assigned the deduced number, using the light emitting unit C.

For example, the operation detection units 701 are composed of a plurality of key switches A disposed to correspond to each key on the numerical keypad, and the light emitting unit C is composed of a plurality of LEDs disposed to correspond to each of these plurality of key switches A.

Also, if the pressing operation is detected by the operation detection units 701 in a state where submersion in water is detected by the water submersion detection unit 702, the control unit 703 deduces water depth based on the pressing force detected by the operation detection units 701, and radiates light from the light emitting unit C onto the keys assigned numbers that correspond to the deduced water depth.

With such a configuration, the cellular telephone 1 radiates light from the light emitting unit C to light a key assigned numbers that is associated with the deduced water depth, so the user can check the lighted key and easily recognize the depth of the water.

It is acceptable to configure the recording unit 706 to record a water depth reference value and a key assigned with the number 1 of the plurality of keys that compose the numerical keypad, and to record a value obtained by multiplying the water depth reference number with a natural number and a key assigned the natural number of the plurality of keys that compose the numerical keypad, the obtained value and assigned key being associated to each other.

For example, with the cellular telephone 1, if the water depth reference value is set to 2 m, the recording unit 706 records water depth of 2 m and the 1 key as the second information. Also, it records water depth of 4 m and the 2 key, water depth of 6 m and the 3 key and the like up to a water depth of 18 m and the 9 key.

With such a configuration, the cellular telephone 1 shows the water depth with the deduced value obtained by multiplying the number of the key to light by radiating light from the light emitting unit C with the water depth reference value so the user can check the lit numerical keypad 14, more easily ascertaining the water depth.

<Water Submersion Detection Method>

Here, a method for detecting when the cellular telephone 1 of the seventh embodiment is submerged in water will now be explained.

The cellular telephone 1 of the seventh embodiment is equipped with a water submersion detection unit having two terminals exposed on the surface of the operation-unit side housing unit 2. The water submersion detection unit detects water by water adhering to the surface of the operation-unit side housing unit 2 thereby establishing continuity between the two terminals and causing them to short-circuit.

<Water Depth Detection Method>

The following will now explain a water depth detection method.

With the cellular telephone 1, the operation unit 11 is equipped with a plurality of keys; the plurality of keys that compose the operation unit 11 is disposed on the key sheet 40. Therefore, the operation unit 11 will be directly affected by water pressure when submerged in water.

As shown in FIG. 7, with the cellular telephone 1, key switches A are disposed to correspond to each of the plurality of keys that compose operation unit 11, and the plurality of key switches A and the key sheet 40 rubber thickness are set to a proper combination so that individual key switches A are pressed sequentially according to predetermined pressure (at each depth of water).

In other words, the cellular telephone 1 of the present invention has a function for measuring water depth (water pressure) that detects water pressure in real-time using the water submersion detection unit 702 and the plurality of key switches A, in an existing device configuration.

This enables the cellular telephone 1 to detect water depth without establishing a separate water pressure sensor.

In this way, the cellular telephone 1 of the seventh embodiment determines if it is submerged in water when it has detected that water has established continuity between and short-circuited the two terminals that compose the water submersion detection unit.

The cellular telephone 1 implements a key lock to restrain erroneous input of a key by water pressure, after it has been determined to be submerged in water.

Here, if the surface area of each key is approximately 13 (mm)×7 (mm)=91 (mm$^2$), water pressure at a depth of 1 m will be 91 (mm$^2$)×1000 (mm)/1000 (mm)3=91 (g); at a water depth of 2 m, it is 91×2=182 (g); at a water depth of 4 m, it is 91×4=364 (g); and at a water depth of 20 m, it is 91×20=1820 (g).

The recording unit 706 records the first information that associates such pressing force (weight) and water depth.

Therefore, by setting the key switch A pressed by the numerical keypad number "1" to a pressing force of 182 (g), and the key switch A pressed by the numerical keypad number "2" to a pressing force of 364 (g), it is possible to ascertain the pressing force (weight) by knowing which key was pressed, and to detect water depth from the pressing force.

Also, it is acceptable to configure the cellular telephone 1 to allow the operation of only specific keys when the user wants to use a function (such as the underwater camera function) after being submerged in water.

<Operation Method>

Figure 23:
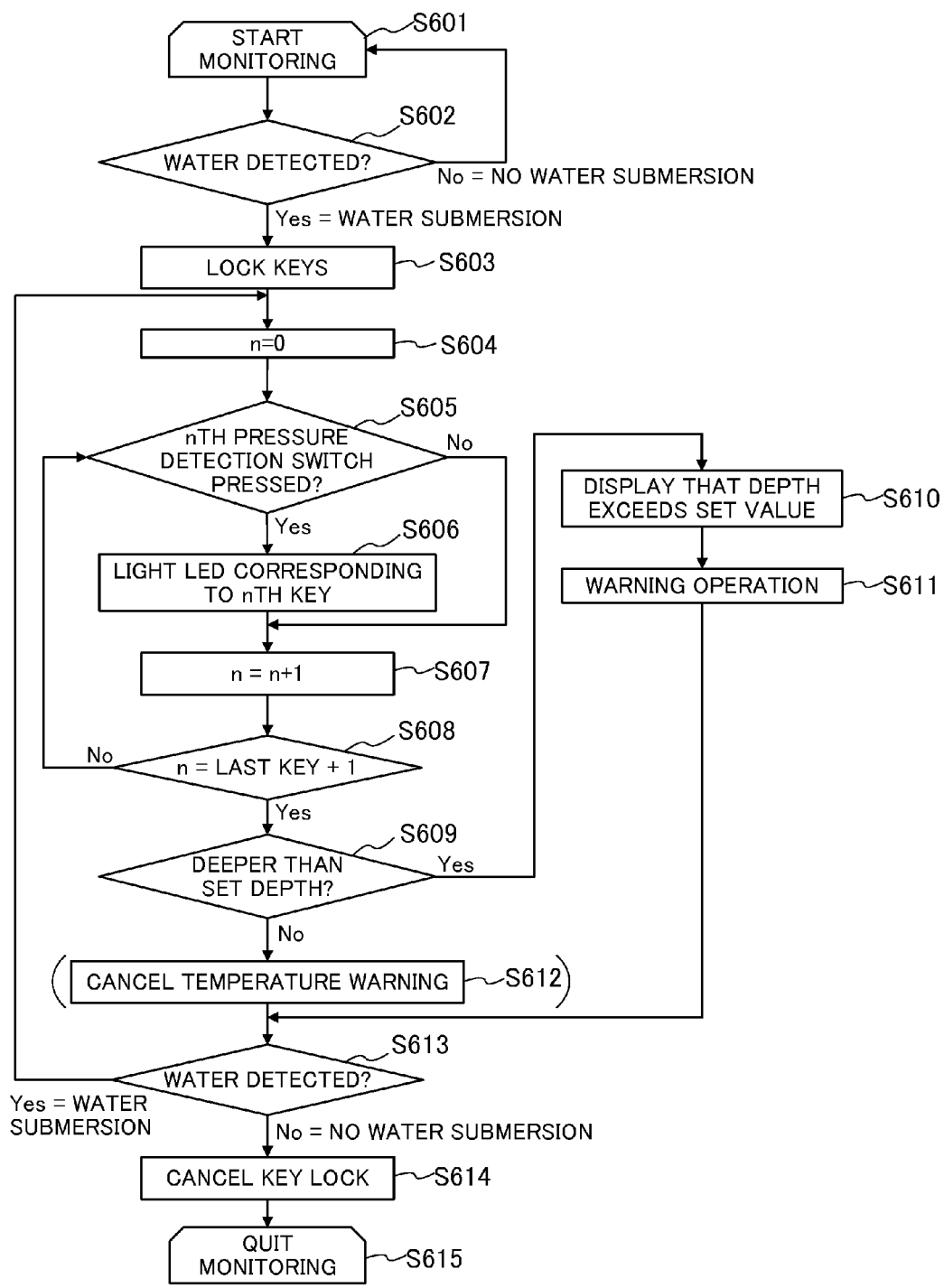
FIG. 23 is a flowchart to explain operation of the cellular telephone according to the seventh embodiment.

The following will now explain operations of the cellular telephone 1 of the seventh embodiment with reference to the flowchart shown in FIG. 23.

At step S601, the control unit 703 starts monitoring water submersion. The control unit 703 intermittently monitors water submersion when in standby to receive data, and intermittently or continually at any time monitors water submersion.

If the main antenna 51 is configured to intermittently receive signals from a base station, not shown, when it is in a standby mode, it is acceptable for the main antenna 51 to monitor water submersion while intermittently receiving data. By doing so, it is possible to monitor water submersion by effectively utilizing the power consumed by receiving signals by the main antenna 51.

At step S602, the control unit 703 implements water submersion detection using the water submersion detection unit. If the control unit 703 detected that the two terminals of the water submersion detection unit have established continuity and have short-circuited, it detects submersion in water, and advances to step S603. Also, if it detected that the two terminals of the water submersion detection unit do not have continuity, it returns to step S601.

At step S603, when the control unit 703 detected submersion in water, it controls a key lock to restrain erroneous operation of keys pressed by water pressure.

At step S604, the control unit 703 clears to zero (n=0) the counter that counts the number n of the pressed key switches A.

At step S605, the control unit 703 determines whether the key switch A that corresponds to the set nth key was pressed. If was determined that the key switch A that corresponds to the nth keys was pressed, it advances to step S606; when it was determined that the key switch A that corresponds to the nth key was not pressed, it advances to step S607. The pressure (pressing force) pressed on each key is different for each key switch A. Therefore, the control unit 703 detects the pressing force on the key switches A by monitoring the pressed key switches A and deduces water depth based on the detected pressing force and the first information recorded in the recording unit 706.

At step S606, the control unit 703 lights the light emitting unit (LED) C that corresponds to the nth key. For example, the control unit 703 lights only the light emitting unit (LED) C that corresponds to the "1" key when only the key switch A that corresponds to the "1" key has been pressed.

At step S607, the control unit 703 increments by one (n=n+1) the pressed key switches A number n.

At step S608, the control unit 703 determines whether the pressed key switch A number n has reached a prescribed number (key number+1). If it is determined that the prescribed number has been reached (Yes), it advances to step S609, and if it is determined that the prescribed number has not been reached, it returns to step S605.

At step S609, the control unit 703 determines whether the water is deeper than the set water depth. If it is determined that the water depth is deeper than the set water depth (Yes), it advances to step 610, and if it is determined not to be deeper than the set water depth (No), it advances to step S612 or step S613.

At step S610, the control unit 703 displays that the water depth is deeper than the set water depth. Also, if the water depth exceeds a set value, it is acceptable to record that instance in the recording unit 706 as a log, although this is not shown. With this, usage outside of the standard range is recorded in the recording unit 706, so it is possible easily to determine whether the cellular telephone 1 has experienced a normal malfunction or a malfunction caused by being used outside of standards by referencing data saved in the recording unit 706, and can be a lead to finding the cause of the malfunction. In such a case, it is acceptable to turn off the power to prevent cellular telephone damage.

At step S611, the control unit 703 implements the warning operation. Thereafter, if the water depth returns to within the set depth range, the control unit 703 cancels the display at step S610 and the warning operation at step S611.

At step S612, if the display at step S610, and the warning operation at step S611 are being executed, and the depth has been confirmed to have returned to within the set water depth, the control unit 703 cancels the display at step S610 and the warning operation at step S611.

At step S613, the control unit 703 implements water submersion detection using the water submersion detection unit. If the control unit 703 detected that the two terminals of the water submersion detection unit have established continuity and have short-circuited, it continues to detect submersion in water, and returns to step S604. Also, if it detected that the two terminals of the water submersion detection unit do not have continuity, it advances to step S614.

At step S614, the control unit 703 cancels control of the key lock started in the process of step S603.

At step S615, the control unit 703 quits monitoring submersion in water.

Also, it is acceptable to configure the cellular telephone 1 to allow the user to set the range of water depth, and to include a setting unit that issues a warning when the range has been exceeded.

The invention claimed is:

1. A portable electronic apparatus comprising:
a first housing having an operation unit and an operation detection unit that detects pressing on the operation unit;
a second housing coupled to the first housing and movable between an opened state exposing the operation unit and a closed state covering the operation unit forming a gap with the first housing linking to the outside;
a control unit that implements a first control that corresponds to pressure when pressure is detected by the operation detection unit in the opened state, and a second control when pressing is detected by the operation detection unit in the closed state;
a plurality of operation detection units, wherein the control unit implements the second control when an even pressure is detected simultaneously by the plurality of operation detection units;
an alarm unit, wherein the control unit issues an alarm as the second control, using the alarm unit; and
a recording unit that records information that associates pressure and water depth, wherein the control unit deduces water depth based on pressure of pressing and the corresponding information recorded in the recording unit, and issues an alarm of the deduced water depth result using the alarm unit as the second control, when pressure is detected by the operation detection unit when the apparatus is in the closed state.

2. The portable electronic apparatus according to claim 1, wherein the control unit implements the second control when an even pressure is detected simultaneously by the plurality of operation detection units for a given amount of time.

3. The portable electronic apparatus according to claim 1, wherein the control unit varies the second control according to a length of time an even pressure is detected simultaneously by the plurality of operation detection units.

4. The portable electronic apparatus according to claim 1, wherein the control unit varies the second control according to a value of pressure detected by the operation detection unit.

5. The portable electronic apparatus according to claim 1, further comprising a plurality of pressure detection units disposed adjacent to each of the plurality of operation detection units to detect varied pressures of each, wherein the control unit varies the second control according to a pressure detected by the plurality of operation detection units, or to a pressure detected by the pressure detection units.

6. The portable electronic apparatus according to claim 1, further comprising a function execution unit that executes a predetermined function, wherein the control unit restrains execution of the function as the second control when a pressure is detected by the operation detection units when a predetermined function is being executed by the function execution unit, when the apparatus is in the closed state.

7. The portable electronic apparatus according to claim 1, wherein the control unit performs a power restraining operation as the second control.

* * * * *

UNITED STATES PATENT AND TRADEMARK OFFICE
CERTIFICATE OF CORRECTION

PATENT NO. : 8,489,141 B2
APPLICATION NO. : 13/001486
DATED : July 16, 2013
INVENTOR(S) : Kensaku Tanaka and Takashi Ito It is certified that error appears in the above-identified patent and that said Letters Patent is hereby corrected as shown below:

IN THE SPECIFICATION:

Column 2, line 3
Now reads: "(2) With the present invention,"
Should read: --(3) With the present invention,--

Column 5, line 38
Now reads: "key that correspond to each other"
Should read: --keys that correspond to each other--

Column 11, line 46
Now reads: "key holes 16 is formed"
Should read: --key holes 16 are formed--

Column 12, line 20
Now reads: "a audio input"
Should read: --an audio input--

Column 12, line 24
Now reads: "a image processing"
Should read: --an image processing--

Column 12, line 32
Now reads: "driving in the ocean"
Should read: --diving in the ocean--

Signed and Sealed this
Fifteenth Day of October, 2013

Teresa Stanek Rea
*Deputy Director of the United States Patent and Trademark Office*

CERTIFICATE OF CORRECTION (continued)
U.S. Pat. No. 8,489,141 B2

IN THE CLAIMS:

Column 21, line 9
Now reads: "being submersion in water"
Should read: --being submerged in water--

Column 21, line 18
Now reads: "of the each of the"
Should read: --of each of the--

Column 24, line 13
Now reads: "continually a predetermined"
Should read: --continually for a predetermined--

Column 24, line 16
Now reads: "continually a predetermined"
Should read: --continually for a predetermined--

Column 26, line 31
Now reads: "If was determined that"
Should read: --If it was determined that--

Column 26, line 31
Now reads: "reached, it"
Should read: --eached (NO), it--

Column 27, line 41
Now reads: "is measures by"
Should read: --is measured by--

Column 35, line 23
Now reads: "to increases in proportion"
Should read: --to increase in proportion--

Column 35, line 57
Now reads: "10 second),"
Should read: --10 seconds),--

Column 36, line 51
Now reads: "in water direct touching"
Should read: --in water directly touching--

Column 38, line 16
Now reads: "step 309."
Should read: --step S309.--

CERTIFICATE OF CORRECTION (continued)
U.S. Pat. No. 8,489,141 B2

IN THE CLAIMS:

Column 38, line 31
Now reads: "If is determined"
Should read: --If it is determined--

Column 38, line 59
Now reads: "step 316, and"
Should read: --step S316 and--

Column 44, line 38
Now reads: "step 410."
Should read: --step S410.--

Column 45, line 19
Now reads: "been reached, it"
Should read: --been reached (NO), it--